US012125073B2

(12) United States Patent
Dion et al.

(10) Patent No.: US 12,125,073 B2
(45) Date of Patent: Oct. 22, 2024

(54) SYSTEMS AND METHODS FOR ENHANCED EVALUATION OF PRE-OWNED ELECTRONIC DEVICES AND PROVISION OF PROTECTION PLANS, REPAIR, CERTIFICATIONS, ETC

(71) Applicant: A LA CARTE MEDIA, INC., Montreal (CA)

(72) Inventors: Dominique Dion, Montreal (CA); Tony Mastronardi, Montreal (CA)

(73) Assignee: A LA CARTE MEDIA, INC., Montreal (CA)

( * ) Notice: Subject to any disclaimer, the term of this patent is extended or adjusted under 35 U.S.C. 154(b) by 0 days.

(21) Appl. No.: 17/071,717

(22) Filed: Oct. 15, 2020

(65) Prior Publication Data

US 2021/0110440 A1   Apr. 15, 2021

Related U.S. Application Data

(60) Provisional application No. 62/915,557, filed on Oct. 15, 2019.

(51) Int. Cl.
| | |
|---|---|
| G06Q 30/02 | (2023.01) |
| G06Q 10/20 | (2023.01) |
| G06Q 30/012 | (2023.01) |
| G06Q 30/018 | (2023.01) |
| G06Q 40/08 | (2012.01) |
| G06V 20/20 | (2022.01) |

(52) U.S. Cl.
CPC ......... *G06Q 30/0278* (2013.01); *G06Q 10/20* (2013.01); *G06Q 30/012* (2013.01); *G06Q 30/018* (2013.01); *G06Q 40/08* (2013.01); *G06V 20/20* (2022.01)

(58) Field of Classification Search
None
See application file for complete search history.

(56) References Cited

U.S. PATENT DOCUMENTS

| | | |
|---|---|---|
| 8,200,533 B2 | 6/2012 | Librizzi |
| 8,463,646 B2 | 6/2013 | Bowles |
| 9,911,102 B2 | 3/2018 | Bowles |
| 10,032,140 B2 | 7/2018 | Bowles |
| 10,055,798 B2 | 8/2018 | Bowles |

(Continued)

OTHER PUBLICATIONS

Kadleck, Chrissy; E-Waste Recycling Kiosks Continue to Catch on; Feb. 19, 2015.*

*Primary Examiner* — Dennis W Ruhl
*Assistant Examiner* — Donald J Edmonds
(74) *Attorney, Agent, or Firm* — Nixon & Vanderhye, PC

(57) ABSTRACT

Apparatuses, methods and storage mediums associated with evaluating previously-owned electronic devices are described. An example apparatus includes an evaluation area configured to temporarily include within it a previously owned electronic device, and one or more cameras arranged to capture images of the previously owned electronic device within the evaluation area. The example apparatus also includes a processor configured to evaluate the previously-owned electronic device using at least the one or more cameras, and, based on the evaluation, provide at least one of a repair quote, a protection plan quote, a protection plan claim, a certification, or a promise to purchase for the previously-owned electronic device.

38 Claims, 39 Drawing Sheets

(56) References Cited

U.S. PATENT DOCUMENTS

| | | |
|---|---|---|
| 10,127,647 B2 | 11/2018 | Forutanpour |
| 10,438,174 B2 | 10/2019 | Bowles |
| 10,475,002 B2 | 11/2019 | Silva |
| 10,825,082 B2 | 11/2020 | Librizzi |
| 11,080,662 B2 | 8/2021 | Bowles |
| 11,107,046 B2 | 8/2021 | Bowles |
| 11,126,973 B2 | 9/2021 | Silva |
| 11,443,289 B2 | 9/2022 | Bowles |
| 11,526,932 B2 | 12/2022 | Bowles |
| 2010/0088192 A1* | 4/2010 | Bowles .................. G06Q 10/30 348/E5.022 |
| 2010/0169231 A1* | 7/2010 | Bowles ............... G06Q 30/0237 705/308 |
| 2012/0191562 A1* | 7/2012 | Bowles .................. G06Q 30/08 705/308 |
| 2013/0046699 A1* | 2/2013 | Bowles ............... H04M 1/0287 705/306 |
| 2013/0124426 A1* | 5/2013 | Bowles ............... H04M 1/0287 705/308 |
| 2013/0144797 A1* | 6/2013 | Bowles .................. G06Q 30/00 705/306 |
| 2013/0311318 A1* | 11/2013 | Librizzi ............. G06Q 30/0278 705/308 |
| 2014/0349615 A1* | 11/2014 | Hsu ..................... G06Q 30/018 455/411 |
| 2015/0356637 A1* | 12/2015 | Graffia, II ............ G06Q 20/405 705/306 |
| 2016/0092849 A1* | 3/2016 | Cirannek ............. G06K 9/6201 705/26.4 |
| 2016/0098688 A1* | 4/2016 | Hunt ..................... G06Q 20/18 705/308 |
| 2016/0098689 A1* | 4/2016 | Bowles ............. G06Q 30/0611 705/23 |
| 2016/0125367 A1* | 5/2016 | Bowles ................ G06Q 20/306 705/14.11 |
| 2016/0125548 A1* | 5/2016 | Bowles ............. G06Q 30/0237 705/4 |
| 2016/0132840 A1* | 5/2016 | Bowles ................... H04W 8/22 705/306 |
| 2016/0148289 A1* | 5/2016 | Altschuler ......... G06Q 30/0603 705/26.81 |
| 2016/0171456 A1* | 6/2016 | Bowles ............. G06Q 30/0278 705/23 |
| 2016/0171575 A1* | 6/2016 | Bowles ............. G06Q 30/0611 705/26.4 |
| 2016/0210648 A1* | 7/2016 | Cirannek ................. H04M 1/24 |
| 2016/0275460 A1* | 9/2016 | Ploetner ............. G06V 10/145 |
| 2016/0284019 A1* | 9/2016 | Bowles ................. G06Q 20/18 |
| 2016/0335616 A1* | 11/2016 | Bordeleau ............. G06Q 20/18 |
| 2017/0169401 A1* | 6/2017 | Beane .................. H04W 24/00 |
| 2017/0323279 A1* | 11/2017 | Dion .................. G07F 17/3216 |
| 2018/0144301 A1* | 5/2018 | Engel ................ G06Q 10/0837 |
| 2019/0019147 A1* | 1/2019 | MCarty ............ G06Q 10/087 |
| 2019/0287141 A1* | 9/2019 | Bordeleau ............. G06Q 10/30 |
| 2019/0325530 A1* | 10/2019 | Bowles ................ G06Q 10/30 |
| 2020/0167748 A1* | 5/2020 | Dion ......................... E05G 1/06 |
| 2020/0202319 A1* | 6/2020 | Forutanpour ........ G07F 15/006 |
| 2020/0258343 A1* | 8/2020 | Forutanpour ........ G06Q 20/322 |

\* cited by examiner

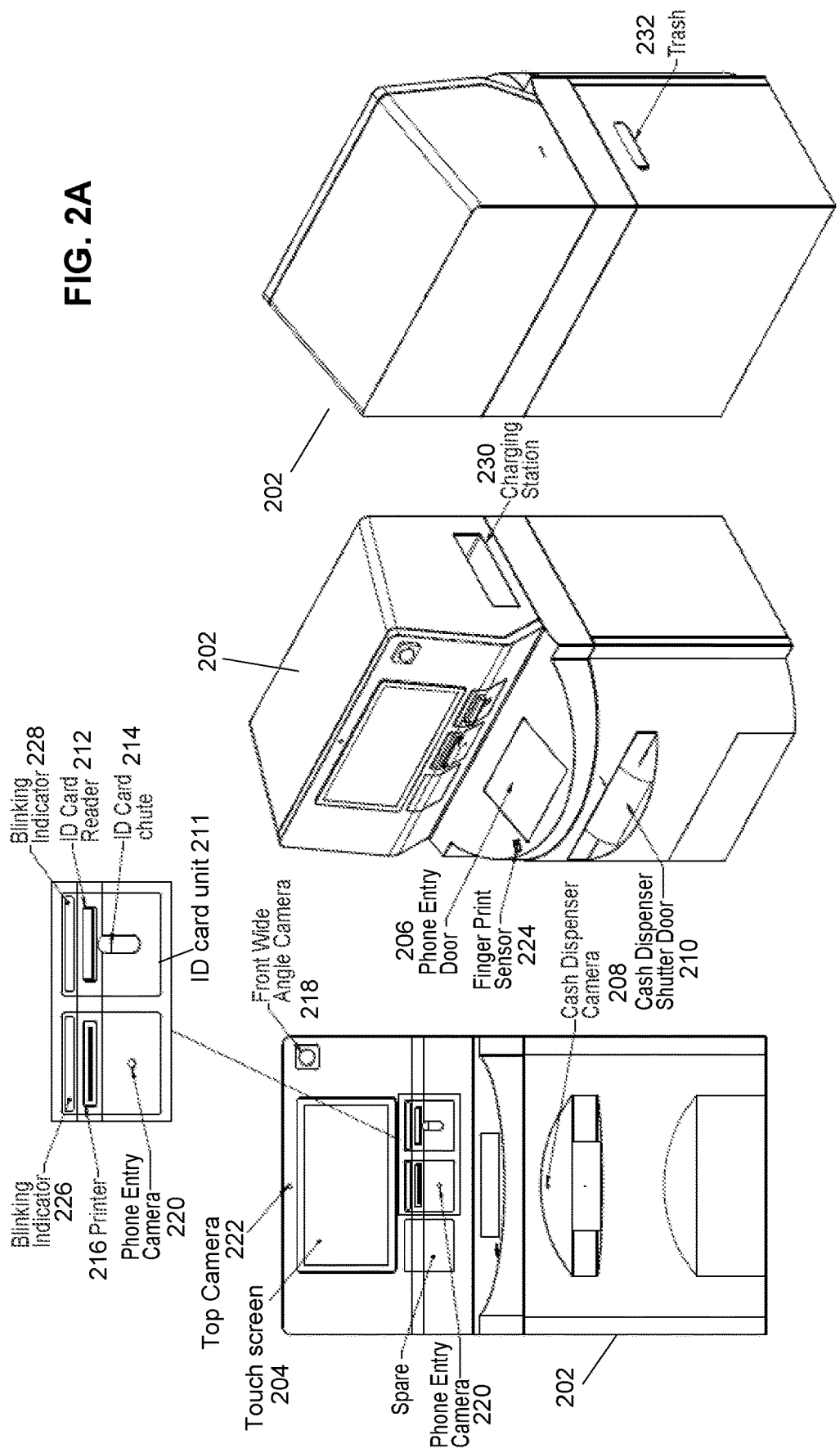

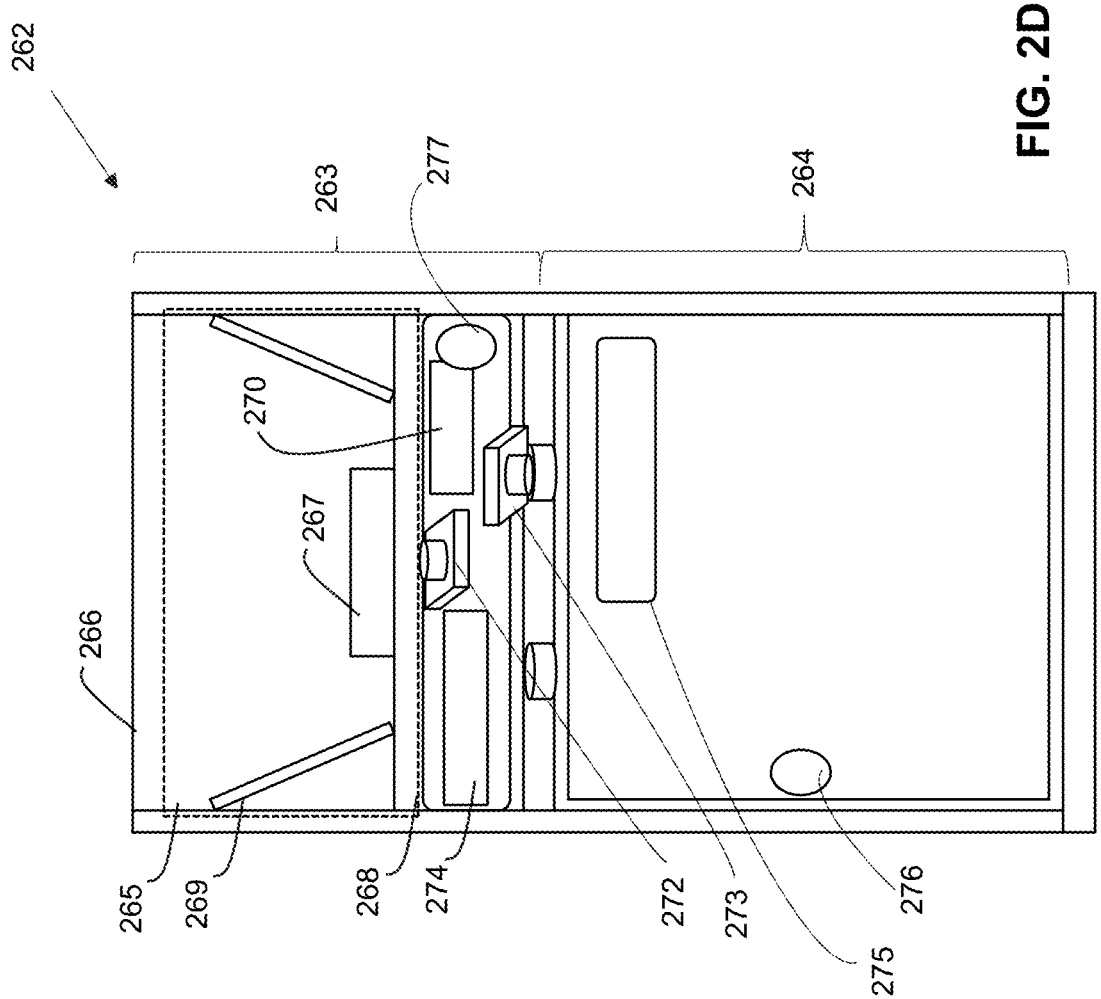

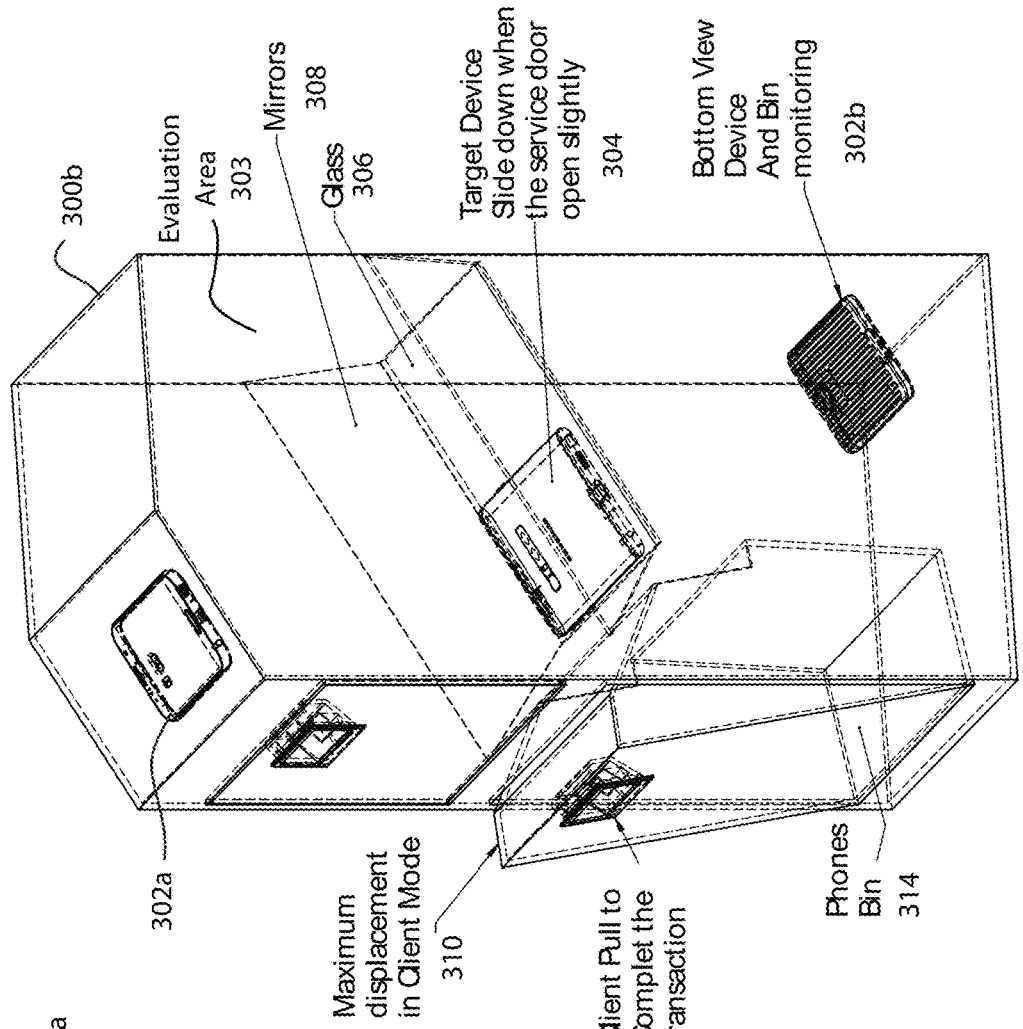
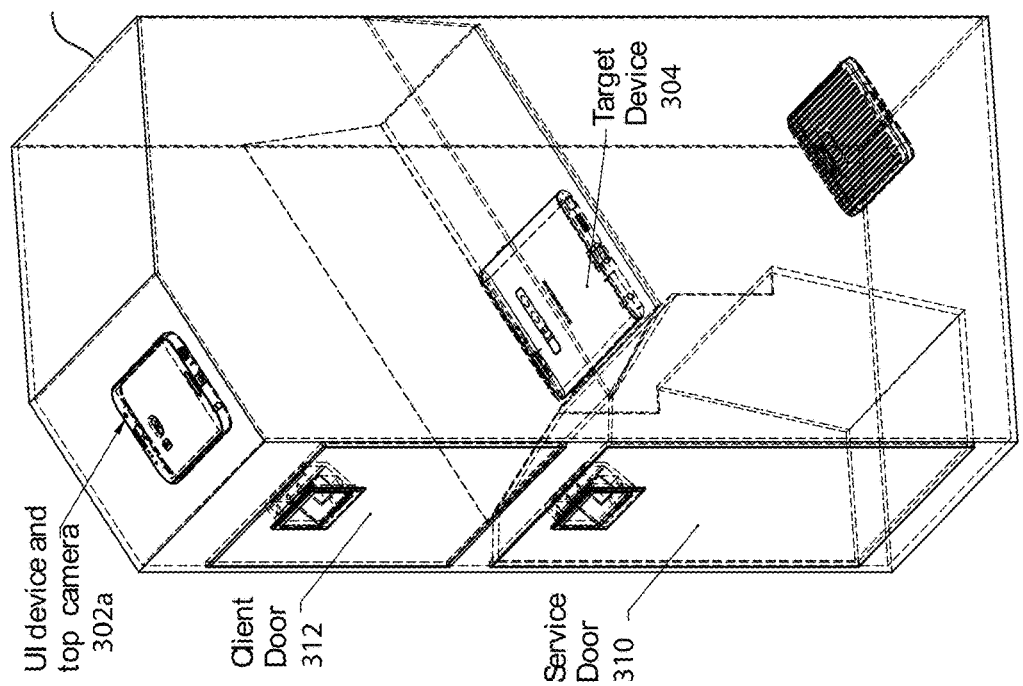

Overview

| Inspection | Method | Result |
|---|---|---|
| Working device | Device powers on and identified<br>(if App) BBB App | PASSED<br>21/22 PASSED |
| Liquid Damage Indicator | As determined by Store Rep [Johnny@wcstore1.com] | PASSED |
| Screen Condition | Defect detection | POOR<br>(1 heavy, 1 light) |
| IMEI Check | 2018-01-28 18:00:02 (CERTID : 7-E1DBCB5D687-552:0AA63BDA)<br>Blacklist<br>Finance check<br>Icloud Lock | <br>PASSED<br>PASSED<br>PASSED |
| Body condition | Missing tray | GOOD |

Diagnostic Details

| Category | Feature | Result |
|---|---|---|
| Buttons | Silent switch<br>Volume UP<br>Volume Down<br>Home button | PASSED<br>PASSED<br>PASSED<br>PASSED |
| Features | Wifi<br>Bluetooth<br>Gyroscope<br>Accelerometer<br>Touch Screen<br>Vibration | PASSED<br>PASSED<br>PASSED<br>PASSED<br>PASSED<br>PASSED |
| Cameras | Front camera<br>Back camera | PASSED<br>FAILED |
| Sound | Microphone<br>Speaker | N/A<br>N/A |

FIG. 9C

CUSTOMER REPORT

BuyBack Booth inc., 1234 Company Rd, City, Province, Prov. Code
Phone 123.456.7890 | email: info@company.com | companysite.com

DEVICE INFORMATION

| | |
|---|---|
| IMEI | 354216220995 |
| Brand | Google |
| Line | Pixel 3 |
| Model | (N/A) |
| Storage | 128gb |
| Carrier | T-Mobile |
| Time of diagnostic | 2019-10-21 10:06am |

YOUR SCORE

96

GENERAL SCORE

General condition  Features  Cameras

DEVICE PICTURES

FIG. 9F

| PHYSICAL DEFECTS | | | |
|---|---|---|---|
| Ref | Count | Short Name | Defect Details |
| 1 | - | Top Screen scratch | Medium (less than 4mm) scratch on the Top Screen (primary display). Deep enough to be visible from more than one point of view |
| 2 | - | Top Screen chipped | Chipped on the Top Screen (primary display) glass |
| | | | |
| | | | |
| | | | |

OVERVIEW

| Inspection | Method | Result |
|---|---|---|
| Working Device | Device fully functional (tested with CellTell app) | PASSED |
| Physical Condition | Physical detection of any defects | PASSED |
| IMEI check | 2019-10-21 10:05am (CERTID : 1-A1B2CD34E56-789:0ABCD)<br>Blacklist Check<br>Finance Check<br>iCloud Lock Check | PASSED<br>PASSED<br>PASSED<br>PASSED |

DIAGNOSTIC RESULTS

| Category | Feature | Result |
|---|---|---|
| Buttons | Silent Switch<br>Volume Up<br>Volume Down<br>Home Button<br>Scroll Button | PASSED<br>PASSED<br>PASSED<br>PASSED<br>PASSED |
| Features | Wifi<br>Bluetooth<br>GPS<br>Gyroscope<br>Accelerometer<br>Proximity sensor<br>Touchscreen<br>Vibration | PASSED<br>PASSED<br>PASSED<br>PASSED<br>PASSED<br>PASSED<br>PASSED<br>PASSED |
| Cameras | Front Camera<br>Back Camera | PASSED<br>PASSED |
| Sound | Microphone<br>Main Speaker | PASSED<br>PASSED |

FIG. 9G

PRICING

Price over the last 6 months
Pixel 3 Price over time

— Price GOOD
--- Price BAD

MORE OPTIONS

BuyBack Booth got these offers for you ...

FINANCE the purchase of this phone
Check out our financing service and check if you're eligible to finance the purchase of this phone for only ...

$12.99 / month

PROTECT this phone with our PROTECTION PLAN
It's time to protect that baby! Our premium package includes shipping protection. Check the option below ...

LITE PACKAGE
<Description of coverage and exclusion highlights>
$7.99 / month

PREMIUM PACKAGE
<Description of coverage and exclusion highlights>
$11.99 / month

FIG. 9H

Phones in booth

| Session ID | Brand | Name | Phone value | Date Bought |
|---|---|---|---|---|
| T7TP | Your Device | | Non-valued | Fri Feb 15 2019 12:58:41 |
| T5TY | Your Device | | Non-valued | Fri Feb 15 2019 07:49 |
| T9RD | Your Device | Galaxy | Non-valued | Fri Feb 15 2019 01:39:00 |
| T3QT | Your Device | | Non-valued | |
| TU1 | Your Device | | Non-valued | Tue Jan 08 2019 12:58:41 |
| TCN | Your Device | | Non-valued | Tue Jan 08 2019 12:48:16 |
| T36 | Your Device | | Non-valued | Tue Jan 08 2019 12:48:57 | of Valued Phones : 0
# of Non-Valued Phones : 7

Go to page: 1  Show rows: 50

Transactions

| Trans. ID | Date Start | Kiosk Name | Coupon Partner | CouponID | Brand | Name |
|---|---|---|---|---|---|---|
| ABC333 | Fri Feb 15 2019 1 Star | | Star | No CouponID | Your Device | |
| TCYY23 | Fri Feb 15 2019 1 Star | | Star | No CouponID | Your Device | |
| KVZ0764 | Fri Feb 15 2019 1 Star | | Star | No CouponID | Your Device | |
| TOCK31 | | | Star | No CouponID | Your Device | |
| TC0703 | Tue Jan 08 2019 1 Star | | Star | No CouponID | Your Device | |
| PC5191A | Tue Jan 08 2019 1 Star | | Star | No CouponID | Your Device | |
| YTS4193 | Tue Jan 08 2019 1 Star | | Star | No CouponID | Your Device | |
| STYR4570 | Thu Jun 28 2018 1 Star | | Star | C670 | APPLE | IPHONE 6S | of Valued Phones : 1
# of Non-Valued Phones : 7

Go to page: 1  Show rows: 5

FIG. 10C

SYSTEMS AND METHODS FOR ENHANCED EVALUATION OF PRE-OWNED ELECTRONIC DEVICES AND PROVISION OF PROTECTION PLANS, REPAIR, CERTIFICATIONS, ETC

CROSS-REFERENCE TO RELATED APPLICATIONS

This application is related to U.S. patent application Ser. No. 15/598,004 filed on May 17, 2017, U.S. patent application Ser. No. 15/153,137 filed on May 12, 2016, Patent Cooperation Treaty (PCT) Application No. PCT/IB2018/055219 filed on Jul. 13, 2018, PCT Application No. PCT/IB2018/055218 filed on Jul. 13, 2018, and PCT Application No. PCT/IB2019/056533 filed on Jul. 31, 2019, each of which is hereby incorporated by reference in its entirety. This application is a continuation-in-part of PCT Application No. PCT/IB2019/056533 filed on Jul. 31, 2019, and also claims the benefit of priority from U.S. Provisional Application No. 62/915,557 filed on Oct. 15, 2019.

FIELD OF THE TECHNOLOGY

The technology presented herein relates to systems and methods related to the evaluation of pre-owned electronic devices. In some examples, the technology is related to remote collection of small electronic devices in exchange for value. In some examples, the technology is related to remote identification, verification and/or evaluation for providing various services other than, or in addition to, remote collection.

BACKGROUND

Small electronic devices such as smartphones, tablet computers, smart watches, etc. are now in widespread use. These small consumer electronic devices may be collectively referred to herein as "pre-owned electronic devices", "pre-owned devices" or "PODs". With increased use among all segments of the populations, numerous services and other applications are frequently released by various entities to be performed or used on such devices. Also, the hardware and/or software of these devices are frequently upgraded in the form of new devices being released by manufacturers.

U.S. patent application Ser. No. 15/598,004 filed on May 17, 2017, U.S. patent application Ser. No. 15/153,137 filed on May 12, 2016, PCT Application No. PCT/IB2018/055218, and Jul. 13, 2018, and PCT Application No. PCT/IB2018/055219, and Jul. 13, 2018 the entire contents of which are hereby incorporated by reference in their entireties, filed by the Applicant, described improved systems and techniques for distributed collection centers, such as collection kiosks (herein sometimes also referred to as "booths") that are configured to accept a client's smartphone (or other consumer electronic device) and to then provide the client with an amount of money corresponding to an estimated value. Such systems and techniques enable many people who find themselves in situations where, after having bought a new smartphone or some other consumer electronic device to replace an older device, would like to conveniently and safely dispose of the old device. In many instances, such persons may desire to trade the old device in return for some monetary or other gain.

However, either in association of such trading of an older device for value or separately, certain other services associated with a small electronic device are required by owners of small consumer electronic devices. Embodiments described in this application provide for remote distributed evaluation devices/collection kiosks and techniques for efficiently providing services associated with small consumer electronic devices.

SUMMARY

Apparatuses, methods and storage mediums associated with evaluating previously-owned electronic devices are described. An example apparatus includes an evaluation area configured to temporarily include within it a previously owned electronic device, and one or more cameras arranged to capture images of the previously owned electronic device within the evaluation area. The example apparatus also includes a processor configured to evaluate the previously-owned electronic device using at least the one or more cameras, and, based on the evaluation, provide at least one of a repair quote, a protection plan quote, a protection plan claim, a certification, or a promise to purchase for the previously-owned electronic device.

An example embodiment provides a system for evaluating previously-owned electronic devices, comprising a control system comprising at least one server, and a plurality of evaluation devices communicatively connected over a network to the control system. At least one evaluation device of the plurality of evaluation devices comprises an evaluation area, and a first previously-owned electronic device arranged with one of its cameras configured to capture images of the evaluation area.

An example embodiment provides an apparatus comprising an evaluation area, and a first previously-owned electronic device arranged with one of its cameras configured to capture images of a second previously-owned electronic device within the evaluation area.

An example embodiment provides a kiosk for evaluating previously-owned electronic devices, comprising one or more cameras configured to capture images of a previously-owned electronic device including one or more microdefects and/or micro-differences where the one or more microdefects and/or micro-differences are invisible to the naked eye, and a processor. The processor may be configured to control the one or more cameras to capture the images, detect the one or more microdefects and/or micro-differences in the captured images, and use the detected one or more microdefects and/or micro-differences to distinguishingly identify the previously-owned electronic device.

An example embodiment provides a kiosk for evaluating previously-owned electronic devices, comprising an evaluation area configured to temporarily include within it a previously owned electronic device, one or more cameras arranged to capture images of the previously owned electronic device within the evaluation area, and a processor. The processor may be configured to select a context from a plurality of preconfigured contexts in accordance with a user-selected service, configure a set of rules based on the selected context, and control at least the one or more cameras in accordance with the configured set of rules to determine an evaluation of the previously owned electronic device.

An example embodiment provides an apparatus for evaluating previously-owned electronic devices, comprising an evaluation area configured to temporarily include within it a previously owned electronic device, one or more cameras arranged to capture images of the previously owned electronic device within the evaluation area, and a processor. The processor may be configured to evaluate the previously-owned electronic device using at least the one or more cameras, and based on the evaluation, provide at least one of a repair quote, an insurance or warranty quote, an insurance or warranty claim, a certification, or a promise to purchase for the evaluated previously-owned electronic device.

An example embodiment provides a system for evaluating previously-owned electronic devices, comprising a control system comprising one or more servers, and a plurality of evaluation devices communicatively connected over a network to the control system. Each evaluation device comprises an evaluation area, one or more cameras, and a processor. At least one camera is arranged to capture images inside the evaluation area. The processor is configured to, in coordination with at least one of a server from the control system or a remote operator, perform an evaluation of a previously-owned electronic device. The performing includes controlling the one or more cameras to capture images of the previously-owned electronic device in the evaluation area. The control system comprises a memory storing a plurality of contexts, the captured images, and evaluation session attributes determined from the evaluation; and a processor. The processor is configured to: select, for the evaluation, a context from the plurality of contexts; process the evaluation session attributes based on the selected context, the processing resulting in at least one contextual attribute corresponding to one of the evaluation session attributes; and generate an evaluation report for the evaluation, the generated evaluation report including a description of the at least one contextual attribute.

An example embodiment provides a system comprising a control system comprising one or more servers; and a plurality of evaluation devices communicatively connected over a network to the control system. Each evaluation device comprising: an evaluation area; one or more cameras, with at least one camera arranged to capture images inside the evaluation area; and a processor. The processor is configured to in coordination with at least one of a server from the control system or a remote operator, perform an evaluation of a previously-owned electronic device, wherein said performing includes controlling the one or more cameras to capture images of a previously-owned electronic device in the evaluation area, and the central control system comprising: a memory storing the captured images, and evaluation session attributes determined from the evaluation; and a processor. The processor is configured to: process the evaluation session attributes; generate an evaluation report for the evaluation, the generated evaluation report including a description of the at least one contextual attribute; and provide web-based access to remote users to information regarding the evaluated previously-owned electronic device, the information including the generated evaluation report.

An example embodiment provides a method comprising accepting a payment via a payment device associated with an evaluation device; responsive to the accepted payment and using an evaluation device equipped with at least one camera, capture images of a previously-owned electronic device; analyze the captured images; generate an evaluation report based upon the analysis of the captured images; and responsive to the evaluation report, displaying, on a user interface of the evaluation device, an offer to advertise the previously-owned electronic device for sale.

An example embodiment provides a system comprising an evaluation device communicatively connected over a network to a control system, and a point-of-sale integration component configured to intercept data from a coupon reader associated with a point-of-sale system and communicatively connected to the control system. The point-of-sale integration component is configured to: detect, based on the intercepted data, information obtained from a coupon generated by the evaluation device; transmit, using a service interface, the detected information to the control system; receive, in response to the transmitted information, validation information for the coupon; and communicating the validation information to the point-of-sale system.

BRIEF DESCRIPTION OF THE DRAWINGS

FIG. 2A, FIG. 2B, FIG. 2C, FIG. 2D, FIG. 2E, FIG. 2F and FIG. 2G each illustrates an example kiosk, or one or more components thereof, that can be used for the remote evaluation of PODs, according to some embodiments.

FIGS. 3A, 3B, 3C and 3D illustrate other example kiosks, according to some example embodiments.

FIG. 9A, FIG. 9B, FIG. 9C, FIG. 9D, FIG. 9E, FIG. 9F, FIG. 9G and FIG. 9H (collectively, FIG. 9) illustrates an example evaluation reports (e.g. transaction report and customer report) that may be generated by a contextual evaluation process, such as that shown in FIG. 8.

FIGS. 10A, 10B, 10C and 10D (collectively FIG. 10) are example screens that may be available to operators, according to some example embodiments.

FIG. 17A, FIG. 7B, and FIG. 7C (collectively FIG. 17) illustrate example protection plan, loaner phone and post repair inspection on an evaluation system according to some example embodiments.

DETAILED DESCRIPTION

Figure 1:
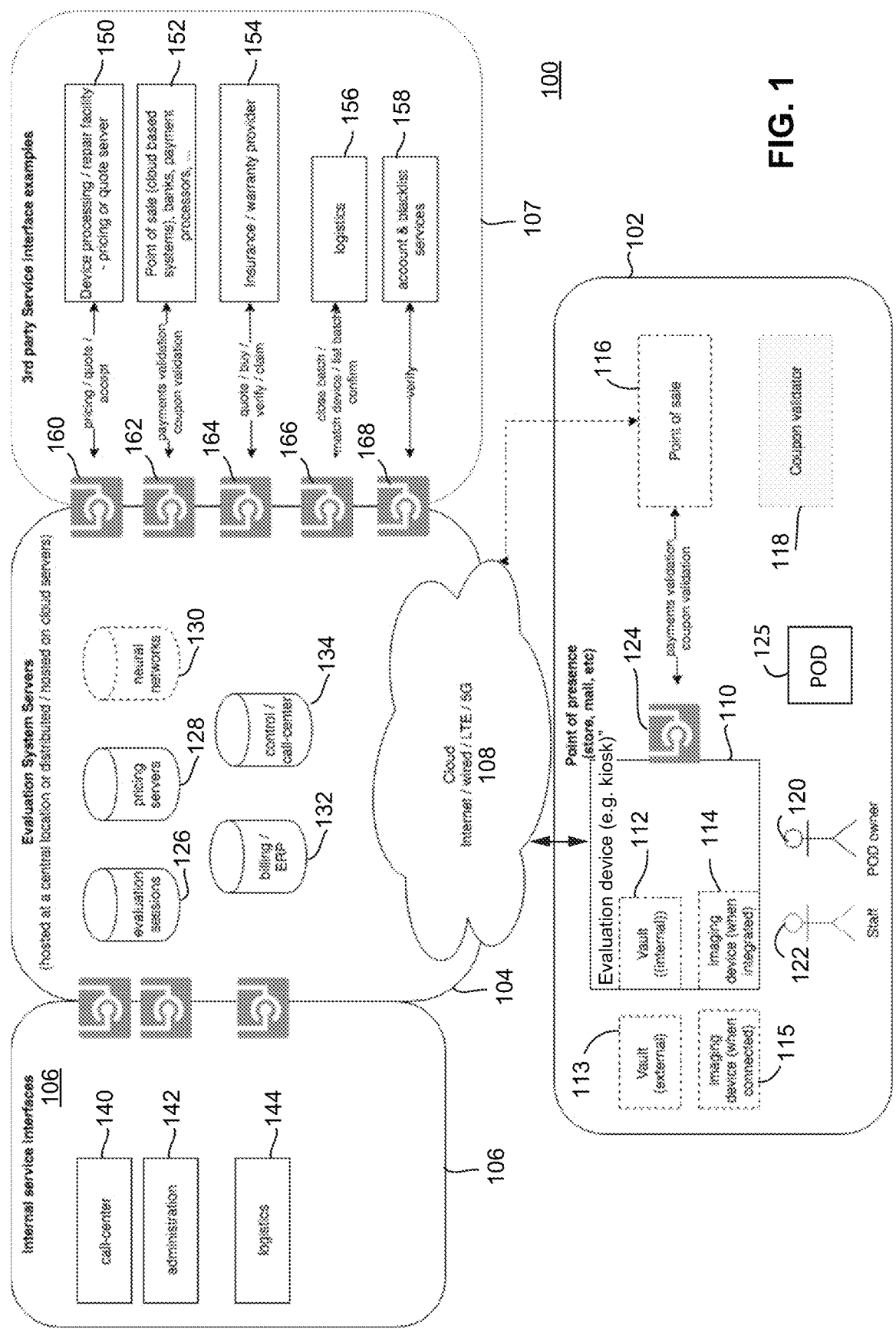
FIG. 1 illustrates a system view of a network of remote distributed pre-owned electronic device evaluation devices (e.g. kiosks), according to some embodiments.

Some exemplary embodiments of this disclosure include an electronic device evaluation device (sometimes herein referred to simply as "kiosk") that facilitates remote distributed evaluation of electronic devices. In some embodiments the evaluation device may additionally facilitate collection of the electronic device in exchange for a monetary value or other value. The pre-owned electronic devices ("POD") that may be collected in these kiosks may include consumer and/or portable electronic devices such as, but not limited to, smartphones, tablet computers, smart watches, game devices, personal health monitoring devices, or other processor-based electronic devices. In some example instances, it may be expected that the evaluation devices described herein will more frequently evaluate smartphones and the like which are in widespread use and are often replaced with newer versions on a relatively short (e.g., 2-4 years) replacement cycle by many consumers. These embodiments will be described with reference to the accompanying drawings. It should be noted that the embodiments described below are illustrative only, in order to describe how, for example, the electronic device evaluation device according to this disclosure is formed and operated, and it is not intended to limit the electronic device evaluation device to specific configurations described below. Other specific configurations may be employed as appropriate according to the embodiments.

According to some example embodiments, the evaluation device enables enhanced evaluation of PODs. The enhanced evaluation may provide ameliorated diagnostics for trading and enables the use of the evaluation device to facilitate one or more of various services associated with the POD such as repair services, insurance/warranty services, evaluation/certification services, account services, blacklist services, and the like. By using the new identification techniques described herein, the evaluation devices are capable of better detection of account locking and nationwide or international blacklisting verification, for example, the OCR or programmatic techniques for accessing unique identifiers, such as IMEI, combined with third party services for validating automatically at the point of presence, reduces risk of fraud/theft. A unique identifier for a POD may be referred to as a POD identifier. In some embodiments, the one or more various services are add-on features associated with an evaluation device that is designed and configured to evaluate and accept PODs that are traded-in by users sometimes in exchange for a monetary gain, a coupon for goods or service, and/or contributions made to selected charities on behalf of those users, or points, such as RecycleBank® points given to users engaging in recycling and other similar environmental activities.

This document expands upon the description in PCT application no. PCT/IB2019/056533 filed on Jul. 31, 2019, and provides additional subject matter including subject matter associated with determining, evaluating, servicing etc. of protection plans for various POD, repairs of POD, certifications, and the like.

This document may use the term "protection plan". In some embodiments of the present invention, the protection plan may include one or more of insurance and warranty. Some embodiments described herein relate to evaluation of, and/or protection plans for, POD that encompassed smartphones, watches and other small electronic devices. However, some embodiments may in addition or alternatively provide for evaluation of, and/or protection plans for, devices that may not be pre-owned, on condition that the evaluation device has the capability of adequately imaging the device.

Although in general the electronic device that is evaluated according to embodiments herein is referred to as a POD, at least in some embodiments, the evaluated device may not be pre-owned. For example, in some embodiments, the evaluated electronic device may be a loaner phone or the like, where the device could be new, and the proposed services may be used by existing protection plan providers.

The evaluation system described herein may include a computing system arrangement that comprises at least a mobile or remote point of presence providing means of inspection, such as an evaluation device, an application, a camera or other means to visually inspect a POD, one or more servers or remote processor for executing various tasks which may include guiding the means of inspections during ongoing evaluations, making decisions, assessing, providing feedback, pricing, grading, creating and storing evaluation data sessions, or requesting human intervention, etc. Some of these tasks may be performed at the point of inspection by the inspection means when they have processing capability, for example for evaluation devices operated by embedded computers, or as described herein, using repurposed pre-owned devices, or mobile applications being operated on a mobile device. With modern computing and networking facilities and all the frameworks available for distributed computing, which processors executes a task is less and less relevant. Therefore, the term processor used herein refers to any computing unit, electronic or virtually implemented, capable of performing computing operations and includes CPUs, CPU-cores, GPUs (graphics), VPUs (vision), NPU (neural), DSP (digital signal processor), ISP (image signal processor), FPGA (field programmable gate array), VCPUs (virtual CPUs and other virtual implementations of the above) and the likes for as long as it has sufficient processing capability, alone or jointly with other processors, to perform the tasks described.

FIG. 1 illustrates a system 100 of a network of remote distributed electronic device evaluation devices, according to some embodiments. The system 100 includes a plurality of points of presence 102 connected over a network 108 to one or more central servers 104. The central servers 104 may interact with one or more internal services 106 and/or with one or more third party services 107 over defined application programing interfaces.

A point of presence 102 may include, but is not limited to, a store, a mall, an event venue, a club, or the like, at which there is a high likelihood of the presence of people who might be open to receiving services offered by the evaluation device. For example, a store at which smartphones are sold may be selected as a point of presence because there is a reasonable likelihood that users who are purchasing a new smartphone may be interested in trading in their current smartphone in exchange for value, to obtain a protection plan for their new smartphone or the current smartphone, to obtain repair recommendations for their current smartphone, etc. In another example, a mall may be selected as a point of presence because it may be a central and convenient location for users to come in order to obtain a warranty or insurance, and/or repair services for their smartphone.

Each point of presence 102 includes an evaluation device 110, such as, for example, a kiosk or other evaluation apparatus, which may include a vault 112 and/or imaging device 114. In some example embodiments, the vault and/or imaging device may not be integrated with the evaluation device 110. In some embodiments, the evaluation device 110 may use a vault 113 and/or imaging device 115 that is not integrated into the body of the evaluation device. Example evaluation devices 110, according to some embodiments, are shown in FIG. 2 (i.e. FIGS. 2A-2G) and FIG. 3 (FIGS. 3A, 3B, 3C and 3D).

In some embodiments, a point of presence 102 may include point of sale (POS) device 116 with which an evaluation device 110 is configured to interact via an interface 124 to perform payment validation. The point of presence 102 may also include a coupon validation device 118, with which the evaluation device 110 is configured to interact via an interface 124 to perform coupon validation. A user 120 who submits a previously owned device to evaluation in the evaluation device 110 may be referred to as a previously-owned device owner ("POD owner"). In some embodiments, the evaluation device 110 may require some interaction with a staff member 122 of the point of presence 102.

The central servers 104 include central information repositories and server applications that enable the operation of the evaluation devices distributed at various points of presence. The central servers 104 may be all located at one location or may be distributed at various geographic locations, and/or may, at least in some embodiments, be provided as cloud-based services. The central servers 104 may include a session information server 126, pricing server 128, learning server 130, billing and resource planning server 132, and control systems 134. Each of the servers, or each group of two or more servers, in the central servers 104 may include one or more server processes and associated data stores. The session information server 126, for example, may include one or more server information processes and a database to maintain real-time information regarding active sessions and to also store historical information about the sessions in a manner that is efficiently searchable. The session information server is configured to communicate with the remote evaluation devices in relation to creation of new sessions, real-time control of ongoing sessions, teardown of sessions and archiving of session information.

The session information is ideally structured and stored in a manner that can efficiently identify all information associated with a particular POD, and also allows for efficiently identifying devices that can be considered similar to each other based on various selectable criteria, typically stored as structured tables or key/value pairs. The selectable criteria may include one or more of, but is not limited to, the type of device (e.g. smartphone, tablet, personal digital assistant, smartwatch), make of device, model of device, model subtype of device, dimensions of device, shape of device, type of operating system (e.g. Android, Windows, IOS, etc.) type of display screen (e.g. no-screen, glass, antiglare glass, curved glass, Corning Gorilla glass, etc.), type of memory (e.g. dynamic RAM, double data rate RAM, etc.), type of non-volatile storage (e.g. FLASH, SD card), type of processor, number of processors, components of device, type of damage(s)/defect(s) or wear and tear information (e.g. "no damage", "scratched screen", etc.), etc. The session information for a particular POD can be stored in an evaluation session detail data structure as described in more detail below in relation, for example, to FIG. 5.

The pricing server 128 may include a database of curated pricing information for devices and/or components of devices. The pricing may be based on the condition of the device. The condition may include POD age, type of usage, extent of usage, optional features (storage size, network bands, screen size, etc.), feature functionality verification, physical defects, cosmetic defects, etc. The pricing information that is directly stored and maintained by the pricing server may be pricing information that is curated specifically by or for the entity that is the owner of the network of evaluation devices. In some embodiments, the pricing server may also incorporate pricing information obtained from third party services 107, and in some embodiments, while the pricing server may not incorporate pricing information from third party services 107, the evaluation system 100 may directly access pricing information of third party services 107 via a service interface, such as an API or database connection, to one or more of the third party services 107. Such third party services may be provided, for example, by POD trading partners, such as phone processors, for example Hyla Mobile™, Brightstar™, CloverWireless™ PCSWireless™, Phobio™, etc.

The learning server 130 may include one or more learning platforms that monitors information including the evaluation device interactions, remote operators, central server responses to evaluation device interactions, the utilization of third party services in relation to evaluation device interactions, and the utilization of internal services in response to evaluation device operations. Based on the monitoring, the learning server 130 may periodically propose and/or automatically effect adjustments to the pricing information, changes to rules controlling evaluation device operation and/or interactions, etc. For example, the learning server 130 may monitor transactions for each point of presence individually, and/or for multiple points of presence as a group. Based on the monitoring, the learning server 130 can determine increases or decreases to the price or valuation of a POD. For a particular evaluation device that is configured to accept traded in devices, the learning server may automatically determine, based on preconfigured thresholds, that a particular type of device has been over-collected and then automatically reduce the price offered for that type of device after the determination. Alternatively, the learning server may automatically increase the offered price when a shortage and/or a higher demand is anticipated for a particular type of device. In certain embodiments, such price adjustments may be made based upon the statistics at a particular evaluation device, a group of evaluation devices in a local area, a group of evaluation devices in a selected type of POP, or on all the evaluation devices. According to some embodiments, the learning server may include one or more neural networks that are continually trained on locally-acquired and/or globally-acquired historical evaluation device performance data and data acquired from other sources, including from third party pricing services, price lists, online marketplaces (eBay™ Amazon™, Facebook Marketplace™, Craigslist™, etc.).

The billing and resource planning server 132 may be configured to maintain certain information regarding users of evaluation devices, which may be customers or representatives of the stores the evaluation device is located in, (e.g. name or other identifier, address, devices owned, historical information associated with each user/POD owner, historical information associated with each POD, historical information of each evaluation device, etc.), information regarding third party services 107, etc. In such embodiments, a screen may be presented to the user as a way to select which sales representative is currently assisting the trade. The screen may or may not be followed or replaced by a personal code, as it may uses pictures or other authentication means.

The control systems 134 may include a database of configuration information for each evaluation device in the system, and may also have access to databases of device information and pricing information either by connecting directly, or through a service interface. Based upon the information in one or more databases accessible to it, the control systems 134 may control operations of the evaluation devices. The control systems 134 may also control the call center 140, and may perform overall control of the evaluation system 100.

The internal services 106, according to some example embodiments, include call center services 140, administration services 142, and logistics services 144. The internal services 106 may also be accessible to the central servers 104 and/or evaluation devices 110 via software APIs.

The third party services 107, according to some example embodiments, include one or more of device repair services 150, payment processing services 152, insurance/warranty services 154, logistics 156, and account status services 158. The third party services 107 are characterized in that, at least with respect to the example embodiments described herein, the interaction of the central servers 104 and/or evaluation devices 110 with the respective third party services 107 are entirely defined by the "service interfaces" such as, for example, an application programming interface (API) exposed by each of the third party services 107 to the central servers 104.

The service interfaces 160-168 that provide for interaction with third party services 107, and other service interfaces such as those providing for interaction with various internal service applications are an important aspect of the efficient operation of the evaluation system 100.

In some example embodiments, service interfaces allow communications with software components that may be residing on different servers/processors of the evaluation system (e.g. internal services in FIG. 1), as well as allow access to, or permit access from, third party services interfaces (e.g., third party services in FIG. 1). The third party service interfaces may be provided by entities such as, for example, vendors, POD processing entities, POD buyers, service providers, databases, quote services, validation services, and the like. Third party applications comprising application logic and/or databases may be made accessible in the form of services which may use local function calls or requests or machine-to-machine communications. Some third party services and/or internal services may be provided as service-oriented-architectures (SOA), and/or may utilize any technique such as, for example, REST API, RPC, web service, micro-services, WebRTC, RabbitMQ, JSON-WSP or like technique. Note that a "service interface" may provide the ability to be used for one or many services referred hereto and may refer to the initiating end (such as a client), and/or receiving or servicing end (such as a server), according to the mode of use. A service interface in this meaning usually requires at least 2 connecting components, unless the service interface is broadcasting information or the like.

In this disclosure, evaluation system central servers (see FIG. 1) represent one or more servers hosted at a central location or distributed on cloud servers, or a mix of, which are software, storage and networking arrangements, the software arrangements may be distributed on a plurality of processors for convenience, efficiency, reliability including redundancy, or security concerns.

Evaluation system processors includes all processors from the evaluation system servers, as well as any processor of the evaluation devices typically placed in commercial stores, that are networked or accessible to the evaluation system, any of these processors may be connected directly or through service interfaces to:

at least one remote visual inspection point, an electronic apparatus capable of imaging a POD, which may be part of an evaluation device (e.g. kiosk), a mobile device or other apparatus;

at least one remote communication point, an electronic apparatus capable of bidirectional communication with a user, which may be comprised as part of an evaluation device, a mobile device or other apparatus, for example having at least one input (touchscreen, microphone, keyboard, buttons, hand motion detector, etc.) and at least one output (display, audio, print, etc.); and at least one control interface, allowing agents or remote operators or administrators to operate the evaluation system, for example, through intranet secured webpages, a mobile application, a software application or client/server applications, providing functions, for example, for analyzing evaluations, finding defects or grading PODs, confirming offers, offering live support through audio call or chat sessions, updating prices, authorizing remote visual inspection points, remotely control reactive inspection points such as, for example, by sending a command or series of commands to: move a camera; move two or more cameras in coordination with each other; change the focus and/or field of view of one or more cameras; cause an audio signal to be emitted while the evaluated device is listening or recording from at least one microphone; and/or cause a connected specific lighting source to be turned on, off, or at a specific color, or at a specific intensity, etc.

In some embodiments, the evaluation system processors may also comprise one or more additional service interfaces, such as API, SOA (service oriented architecture), RPC (remote procedure call) or any machine-to-machine protocol for exchanging data or instructions or providing services to:

billing, accounting or ERP-type system, for managing inventory and billing services, including service interfaces capable of recognizing incoming shipments, and incoming PODs;

querying in real time a third party pricing service, possibly a potential buyer of a POD being evaluated;

POS (point of sale) system interface for coupon validation, for example services for verifying a coupon validity, using a coupon (whole or in part), accounting services such as end-of-period balance checks, transaction lists, etc.;

Payment terminal or POS (point of sale) system interface for interfacing with a third party payment system for example when the evaluation system is used to sell a service (insurance, repair, evaluation fee, etc.), an interface to a local POS or terminal may confirm payment, or to activate a gift card possibly with a value related to the purchased POD;

Payment method system interface for interfacing with an Internet accessible third party payment system. For example, when the evaluation system is used to sell a service (insurance, repair, evaluation fee, etc.), an interface can be made available to allow the user to pay using their PayPal account, Venmo account or other such service. Also, the user can use the evaluation's equipment to pay via systems that need an NFC interface. With a credit-card reader, the evaluation system can also use the user's debit card or credit card to pay for their transaction;

price update service, permitting the entry of new or updated pricing for a plurality of devices models under various conditions, as described by grading, contextual grading, or specific attributes;

notification services, allowing notification of events to third parties, such as independent service providers that may be required from time to time to service, or collect inventory contained in one or more vaults;

reporting services, allowing third party to query or receive reports on transactions, performance, billing information, etc.;

payment services, allowing orders of payment to be sent for example to a bank, using ACH payment services, for paying for the acquired POD to the POD owner or the store acting as transfer agent;

device processor services, allowing device processors (buyers) to retrieve evaluation information when the POD is received at their facility, possibly using credentials, transaction ID or POD identifier or uniqueness information; and promotion or marketing services, wherein based on partial POD information, such as for example make and model, the evaluation system may query through service interfaces one or more partner to identify if a promotion is currently active for the presented or identified POD (in some embodiments promotion or marketing program information are communicated to one or more evaluation device, and the program information may be stored in a variety of ways such as a flat file, specific file, structured on non-structured database entry, JSON, etc.).

The service interfaces may reside on any processor for providing access to, requesting access to, or otherwise making interaction possible between the evaluation system and at least one other system, internal system or a third party system. In most embodiments, these service interfaces are networked with the internet, but some service interfaces may be made available only through LAN, including through Wi-Fi, Bluetooth, etc. In many embodiments, the service interfaces make use of at least information previously received, identified, assembled or computed from the evaluation process, including attributes, and conditions, and will likely be called and/or performed in a particular context (contexts are described below in relation to FIG. 7). Some service interfaces may allow access to stored information by using a search key. Common search keys for retrieving, adding or modifying information include, for example, a POD identifier or uniqueness data for a POD, a transaction identifier, a location identifier, an evaluation device identifier (also referred to as "a kiosk identifier"), etc.

Accordingly, in an example embodiment, a service interface uses a remote entity, such as a server or database, to determine or participate in the pricing process of a service. Once evaluation of a POD is complete, or partially completed, the evaluation system may, through a service interface, query information located, stored, or computed by a third party vendor. The querying may be performed, for example, using a web service.

In an example embodiment, an entity, say "CDE purchasing corporation" (CDE), would offer a service interface for quoting on pre-owned devices (e.g. pre-owned phones), so that, a POD evaluation in a trading context with CDE would result in a processor of the evaluation system making a request to CDE's server, using a web service or other implementation, passing information about the evaluation of the POD, such as, for example, its condition in CDE's context, and receiving from CDE's server one or more proposed prices. The evaluation system may then use such proposed pricing as a base to determine an offer price, optionally applying internal margins or other business rules, before presenting the offer to the user. For clarity, in such embodiment, a likely configuration would have a user in a location A accessing an evaluation device of the evaluation system in the same location, the evaluation system partly located in location A and server components in location B, the server in location B accessing through service interfaces the CDE's server located in location C.

According to some embodiments, in a service interface, price lists are transmitted from time to time by a third party and integrated in the pricing database in the central servers using a data importation process, so that the evaluation system may be operable with no real-time connectivity requirements from the third party.

According to some embodiments, in a service interface, the evaluation system is configurable to notify third parties about accepted transactions (e.g., trades, insurance quotes, repair tickets, warranty claims, etc.). To accomplish this, the evaluation system is operable to notify in real-time, or at predetermined intervals, of selected completed transactions. In one embodiments, a real time service interface may be used, such as a web-call to the third party server which creates a notification of a completed successful transaction, for example, of a recently quoted insurance policy.

Another embodiment may use daily or weekly (or another configurable duration) reports by exporting data pertaining to the selected completed transactions to a third party. Some embodiment may do so upon successful completion of a transaction at the point of presence (kiosk or the like), and/or after a certain operation has been completed elsewhere, such as online (such as payment of the insurance through a web portal) or at a third-party point of sale.

In such embodiments, wherein the transaction needs extra steps for completion, for example requiring a payment to be completed, another service interface may provide the ability for a third party payment or point of sale system to notify the evaluation system of the completeness of the payment. Alternatively, a service interface for modifying, or canceling a transaction may be provided.

In another embodiment, a third party application or software, such as a point of sale system, may access a service interface to validate the validity of a voucher or coupon emitted by the evaluation system. Such service interfaces may be accessible locally, for instance through the evaluation device, or remotely, for instance by accessing a remote location or cloud based service interface. As an example of such embodiment, the service interface can be queried to validate the authenticity of a transaction, for example, a point of sale system may first retrieve a transaction identifier by way of scanning, for example printed on a paper or electronic voucher, or electronically by means of communicating with an associable electronic device, which could be the POD, another smartphone or the like. Once a transaction identifier has been retrieved, the point of sale can query by communicating a transaction identifier or similar identifier, using a service interface that is either locally available for example on the local area network (wired or wireless), or remotely available, for example using the internet, VPN or other network, and the service interface after validating the authenticity of the transaction, for example by querying a transaction database, returns information confirming the validity of the transaction which may be in different form, such as a boolean information, a value of voucher information, or any data form capable of being interpreted as such.

In another embodiment, a service interface is provided for a third party to retrieve information about a transaction. For example, a third party may desire: to know what occurred or in what state is a quote previously made, to know what were the details of an evaluation, download the digital assets associated with the transactions, and the like regarding a transaction. In an embodiment, an authentication process such as, for example, authentication using a private key, a login with password, and possibly combined with a web-cookie or similar authentication techniques, may be used to enable the service interface to validate the authenticity of the request. In an embodiment, the service interface may use an identifier, probably a transaction identifier or POD identifier that may have been previously transmitted to the third party, so that the receiving end is able to retrieve, update, modify or add to the specific transaction, accordingly. In such embodiment, for example, a phone purchasing offer may have been made and accepted, and, upon receiving the device at the buyer's processing facilities, a request for information may have been made through a service interface in order to retrieve an evaluation report, in whole or in part. An "evaluation report" may be a series of information pertaining to a specific evaluation, typically retrieved from an evaluation session, or to a list of evaluations for a same POD, including part of attributes, meta-attributes, conditions or digital assets, optionally within a given context. Such a service interface may be used, for example, by POD processing facilities which may retrieve multiple evaluation reports on PODs being received.

In this later embodiment wherein a request is made to retrieve, update, modify or add to more than one evaluation for a given POD, it is possible for the evaluation system responding to such requests to ascertain defects that were known to be at the first evaluation of the POD, versus defects that appeared between the various evaluations. This particular feature enables services such as, for example, insurance and warranty claim validation.

In embodiments that retrieve one or more evaluation reports for a device, the request to the service interface may be automatically populated by presenting the POD's displaying a unique identifier, such as the POD's IMEI, for example after dialing *#06 #, and, using OCR techniques, a software creates the requests containing the unique identifier and pulls the evaluation report or reports by using the service interface.

Another embodiment provides the ability to check for a POD's problematic status, for instance a POD having been blacklisted due to the POD being lost or stolen, or if it is locked, such as customer lock (PIN or biometrics, etc.), or locked to an account (such as Apple iCloud/Find my phone features, etc.), or if it is finance locked (meaning that an outstanding balance on the device is still due by the owner). In this embodiment, the evaluation system may be capable of connecting to third party service interfaces like databases, such as some services offered by Recipero™ or Phone-Check™, and, likely using the IMEI identifier but possibly another identifier, is capable of verifying at least one of the problematic status. After identifying that a phone has one or more problematic status, the evaluation system may provide user with guidance information on how to resolve the issue, or simply reject the transaction.

The vault 112/113 is an important aspect associated with the evaluation device (e.g. kiosk). Many embodiments, offer trade services for purchasing PODs from the evaluation system or apparatus. When operating these embodiments, some problems that are of logistics nature may arise. The embodiments may also provide means to circumvent or improve the security of the assets traded using the evaluation system.

In applications such as the kiosks, a secured area is typically attached to the kiosk for receiving and temporarily storing traded inventory of PODs. Upon receiving confirmation of a trade, the kiosks typically move in some way or another the traded device into the safe vault. This requires the kiosk to be significant in size, which can pose problems, especially in space constrained locations. As an obvious example, a wireless store located in a mall corridor may not have the required space for a full kiosk to be installed.

In an embodiment, if the evaluation system is equipped with a secured vault, the secured vault may be unlocked by controllable means, for example, of a controllable electromagnetic lock. In various embodiments, the secured vault may be in a common structure with the evaluation device, or may be separated and detached from the structure having the evaluation device. The control of the lock may be wired, or internet-of-things connected, or remotely connected to a processor of the evaluation system. The processor can respond to local or remote commands or functions, including through a service interface, in order to unlock the controllable lock.

In an embodiment using a controllable lock, a "collector" (a person in charge of collecting traded PODs for transition toward a processing center) may request access to the vault after proper identification for example using a unique code previously communicated to the collector, or by way of facial recognition, or other biometric recognition methods or for enhanced security, a combination of two or more methods. Upon validation of the identity of the collector, the evaluation system unlocks the vault, or commands the processor capable of unlocking the vault for providing access to the vault for the collector to proceed with collecting PODs.

In some embodiments capable of detecting a door open through for example computer vision, magnetic switch or physical switch, an alarm can be generated upon detection of door opening without previous identification. Such an alarm may be a soft alarm, such as sending a signal to a server, or sending pictures or video streams, or can also be an active alarm, such as emitting sound.

In an embodiment, a list of PODs may be made available to the collector for verification. The list may be provided on a printed paper connected to the system, directly or on the same network, or the list may be provided on a portable device, such as the collector's smartphone, or the list may also be provided on the evaluation device's main screen. In an embodiment, the collector confirms the devices collected matches the recorded transactions. In case of conflict, as much information possible about the incident is retrieved and the collector may be put in communication with a live agent (e.g. a remote operator) in order to resolve the issue. In a simpler embodiment, the collector is requested to enter the number of devices collected or to confirm the number of devices, and, the evaluation system may take a preprogrammed action when there is a mismatch between the expected collection and the number of collection devices, for example, by initiating a request to a live agent.

In an embodiment equipped with a vault, the vault may be supervised with an imaging system for enhanced security. The imaging system may be a camera connected to a processor, an IoT camera, or a smartphone, or similar device. In such embodiment, the evaluation system may continuously or periodically take images of the vault to ensure its integrity. It may likely take an image just before unlocking the vault. In such embodiments, computer vision algorithms are typically used to detect and/or confirm normal activity of the evaluation device, for example, expecting a new device in, monitoring that all devices are still present, monitoring that no abnormal movement of device occurs, etc. The computer vision algorithms to detect any abnormality may reside on the evaluation device or on a server.

Some embodiments may use visual challenge response techniques in order prevent "device swapping". Some persons may want to trick the evaluation system by running health diagnostic from the mobile application diagnostic software on a first phone, and, knowing that a second phone has failures, capture the static visual identifier of the first phone, which may be for example a QR code on screen, copy the code on the second defective phone and place the latter in, or in relation to, the evaluation device for physical observation. Some embodiments uses external challenge response, such as a visual challenge response which is a technique where a computer of the evaluation system is capable of observing behavior change, for example visual information displayed on a POD, which observed from or within the inspection bin and where the computer observes that the device responds positively to at least one interactive challenge. For example, the evaluation system may be programmed or operated in a way so that it to send commands (challenges) to a POD, for example "display an image" or "set screen color to red", or "display a new QR code containing a secret", and, using a sensors, such as the camera of the inspection area the evaluation system or evaluation device determines that the POD in the inspection area responds to the challenge sent and must therefore be the proper POD. A preferable challenge uses several sequences to augment the certainty level of the authentication. The challenges may also be integrated as part of additional interactive testing of the device, for example, by demanding the POD to change the display to RED, then GREEN, then BLUE, an evaluation system may at the same time use the observed data to look for defects on the POD display. If the POD does not respond to the commands, or responds incorrectly, its authenticity may be rejected. Alternatively, although audio challenge responses are less efficient, they can also be used as another means of external challenge response. Another example of an external challenge response could be communication of the response using another observable element, such as the LED light flashing in some verifiable manner.

A visual challenge is a technique in which a processor with a camera and a capability to transmit commands or information to a device (e.g. POD) and, the device, in response to the command or information will adapts its display in a way that is recognizable by the processor, the sequence can be repeated for augmented security. The ability to transmit command or information to a device may be: a network communication, locally or through proxy or internet services, a Bluetooth communication, signals sent visually by the processor from light emitting capabilities (screen, LED or other processor controllable lighting source), an audio signal transmittable to a device equipped with a microphone, etc. An audio challenge would operate likewise, but instead the processor has a microphone or audio listening capability, and is capable of listening to a challenge sent to a device being evaluated, which, in such case, may respond by sending an audio signal.

In some embodiments, a physically separated vault for storing purchased or, "to be repaired" PODs that operates in conjunction with the evaluation system may be preferable, for example, when a space constraint exists in the retail environment. In such embodiments, the POD is manually deposited into the separate vault. In embodiments with a separated vault, the separated vault typically has an area or zone to allow insertion or deposit of the POD, such as for example a drawer, an area accessible by opening a door or an open enclosure, all of which may be electro-mechanically configured in a way to accept or disallow the device because of the ability to detect that the expected POD is being secured, for example, by using imaging identification, for example using imaging capabilities for taking a visual identifier on the POD's main screen, such as a QR code, or preferably a non-copyable identifier such as a video code or an external challenge response, such as a visual and/or audio challenge-response. Upon acknowledging that the correct POD is being presented by the processor in charge, the processor will command the vault, for example by activating electro-mechanical functions, so that it will secure the POD in a secured area and the processor will print, command or enable the printing of the final voucher, coupon, or payment. In order to secure the POD, various mechanical or electro-mechanical options may be used. For example, the vault may operate in a "postal box" mode where it is possible to insert the POD without having access to the inventory, then, once the evaluation system has determined that the proper POD is in the vault incoming area, it may make it possible, using for example a solenoid, to complete the transaction. Sensors which may be electrically or visually implemented, for example by using computer vision techniques may be used to determine if the door is opened or closed in order to facilitate the transaction or improve the security of the transaction.

In other embodiments, no vault exists to safely store the traded POD, instead, a secured shipping box may be used. In such embodiments, a confirmation that the POD purchased has been secured by the store staff may be required. In other embodiments, the secured POD may itself detect that it is stored in a secured box, for example, the secured box may have an identifiable pattern, such as a QR code, from which the POD device can read using its cameras.

In some embodiments, a vault is used as a safe temporary storage for POD held for trading or repair. Some embodiment have the vault as part of the evaluation system, such as previously described in the evaluation devices.

Figure 3C:
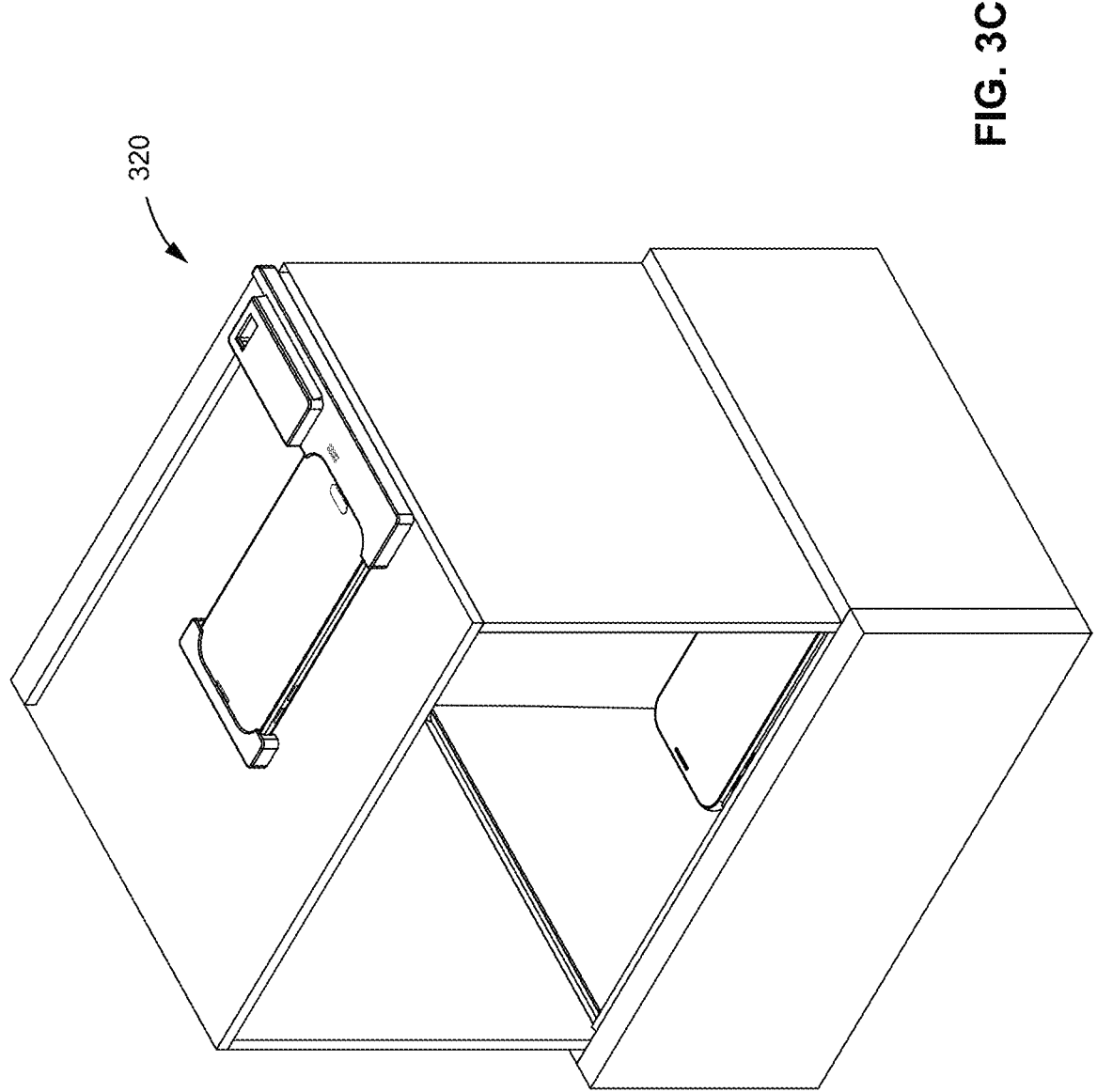
Figure 3D:
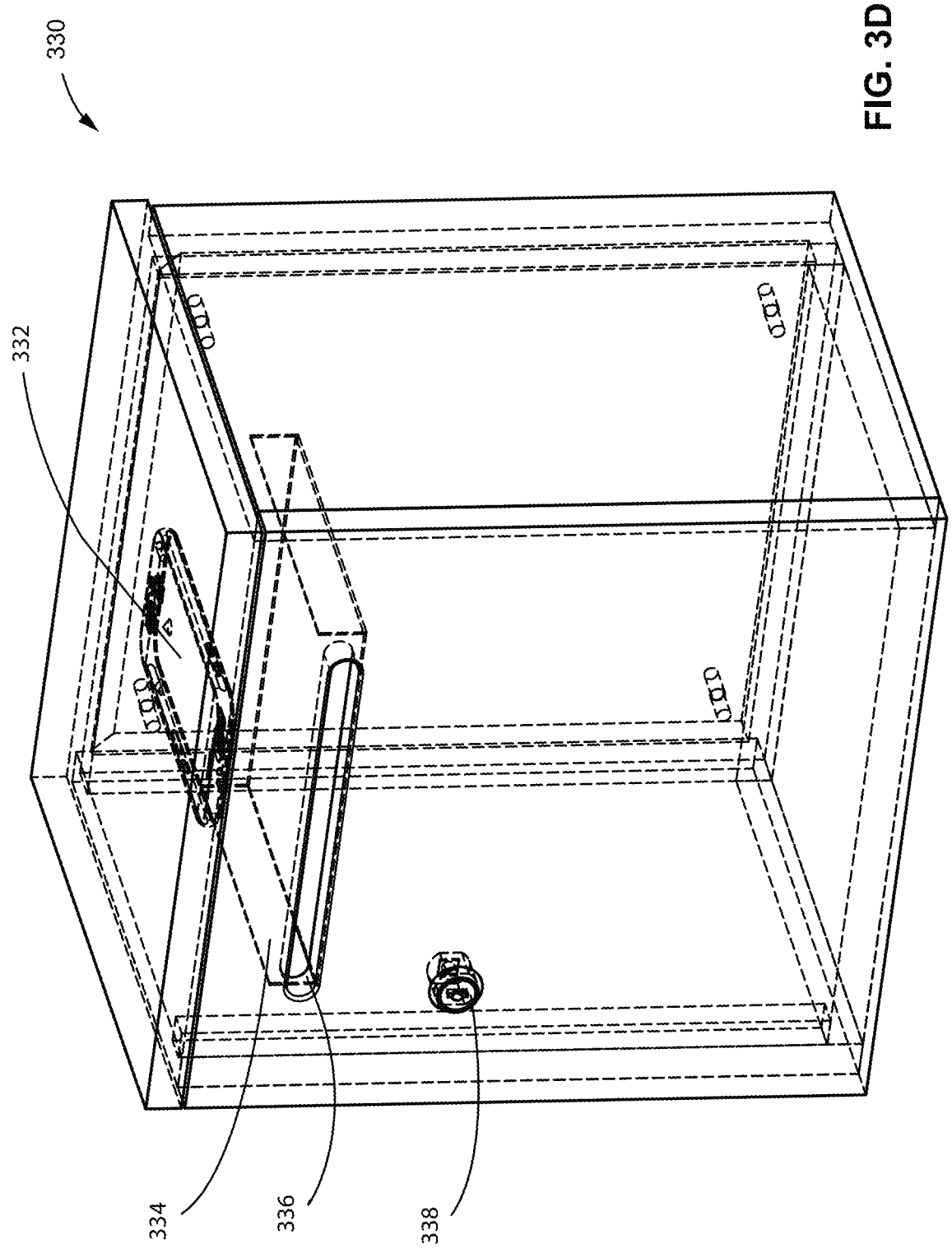

Some embodiments permit the vault to be physically detached from the evaluation system. Such a detached vault may be particularly useful when the point of presence space is limited. For example, a vault that is detached from the evaluation device may be placed in a convenient location, possibly under a counter, or back store. FIGS. 3C-3D illustrates a kiosk and a detached vault according to an example embodiment.

The vault may be intelligent or not. For simplistic vaults, which can be a safe such as a drop-box, the evaluation system relies on trusting the staff supporting the transaction to have safely placed the device in the vault. In such embodiment, the staff may be required to identify for example by presenting a card, entering a PIN or password, by taking a picture such as a face picture with the evaluation device front camera, and possibly uses biometric identification. Once identified, the confirmation of the trade is deemed complete and the coupon or voucher may be issued.

The vault may be intelligent. In such embodiments, a processor coupled with imaging capability is operable to take at least one front image from a POD about to be deposited in the vault. By uniquely identifying the POD using one of the techniques described herein (in some embodiments, also by using a visual challenge-response), the vault may accept or deny the deposit. When accepting, the vault may use electro-mechanical means to secure the device, for example by triggering a motor to move the POD in the safe area, or a solenoid that effectively opens a door or moves the device to its secured place.

The embodiment may furthermore comprise a vault organized in a way that makes the stored, or at least the last stored PODs, visible from the evaluation device, at least when the small portable device is in operation. In an embodiment configured in this manner, one or more vault inlets are mechanically configured so that they are sufficiently sized to accommodate the entrance of a POD device in a non-retractable manner. In a multi-inlet vault, each inlet may be configured to store one POD. In a single-inlet vault, the inlet may be configured to accept multiple POD, stacking them one over another by force of gravity. The inlet may also have a confirmation button, which can be electrically connected to the evaluation device, or simply mechanically activated, so that once activated, the POD may no longer be retrieved from the vault. The confirmation button may only be actionable after the evaluation system has confirmed the proper POD is in the inlet reception area (e.g. inspection area) by using for example external challenge-response or other computer vision techniques.

In embodiments with visible vaults from the simplistic evaluation device, an important feature is the ability for the evaluation system, through the imaging capability, for example, a camera connected or in communication with the evaluation system, to confirm that the proper POD is secured in the secured zone of the vault before permitting payment or confirming the transaction. For doing so, embodiments use a signal from the POD, for example a text, passcode, QR code, image or sequence of images, or an audio signal, or a combination thereof, or an external challenge-response, and, when the signal is properly recognized by one of the processors of the evaluation system to be legitimately sent by the POD subject to the transaction, the processor permits completion of the transaction, such as permitting payment by means of printing or commanding the printing or sending of (email, text) a coupon or otherwise commanding, enabling, validating or authorizing the payment or e-payment.

In such embodiment, preferably the signal may be commanded by a processor of the evaluation system, so that it cannot be altered, for example by taking a screenshot on a good, diagnosed POD, and displaying the screenshot on a lesser value POD. In order to do so, the mobile diagnostic application is presumably in communication with at least one processor of the evaluation system and may react to commands from the processor, for example, changing the signal at least once while the evaluation system is imaging the POD and creating a visual challenge-response.

In embodiments of evaluations system with an intelligent vault, a locking mechanism prevents phones stored from being removed from the evaluation device. In an embodiment, a signal from the evaluation device may trigger an electro-mechanical feature for unlocking access to vault, for instance during inventory pickup. In such embodiments, a person responsible for inventory pickup is identifiable by the evaluation system by using identification methods, such as PIN, voice activation, pre-authenticated through a mobile application, email, SMS, or picture validation by human or machine agents such as biometric evaluation, etc., or combination thereof.

In some embodiment, the inventory pickup identification is volatile and can be used only once, for example, a unique passcode valid for an inventory pickup. This enables the system to be used by various, possibly changing, logistics staff, such as, for example, a postman or crowd sourced staffing. Such a passcode may be valid for a limited time window.

In an embodiment, PODs collected by the kiosk are prepared and packaged in prepaid shipping boxes and the boxes are placed by staff employees in a secured shipping area (possibly a different type of vault for storing boxed PODs, and not unpackaged PODs). In such embodiment, when a box is ready for pickup, a unique pick-up code is created and communicated to the designated collector. In an embodiment, the communication of the code is made through a service interface. For example with USPS postal service, when a transaction is completed and a box is ready for pickup, the evaluation system may generate a unique code, schedule a pickup of the prepaid box, and provide the generated code within the instructions that are transmitted to the USPS collector.

In an embodiment, a method and system for securely storing devices until proper pickup by a carrier. In this embodiment, the carrier may be the operator described herein, but could also be a third party, such as an "Uber-like" delivery (pickup) man, or a post office mailman. For example, USPS offers to pick up packages such as Priority Mail boxes. In such embodiment, two distinct methods are described for the batch closing process. In one of the proposed method, a batch closing process is initiated either automatically by a processor upon certain requirements are met, such as after a certain delay after the phone was traded, or once it is expected that the price of a device is likely to fall. This method of waiting before closing the batch aims at having more than one phone shipped in order to minimize costs. However, waiting too long could result in a price drop of the POD (volatile market). Once the batch close process is initiated, a staff, presumably local to the evaluation device, is provided access, either through a mechanical key or in some advanced embodiment, remotely activated by the call center agents or by an authentication process and access is provided by unlocking access to, for example by triggering an electro-mechanical lock in response to a successful authentication. During the batch close process, a shipping label is applied to a shipping box and the phones are safely wrapped and placed within the shipping box. Once the box is ready, the method and system can require that the box be securely put back inside a secured security bin (which can be the same as the phone inventory bin).

In an embodiment, a method for inventory access to the carrier is provided, for example, a unique code may be transmitted to the carrier allowing unlocking by pressing a sequence on the user inputs, or by displaying a unique identification card, such as a USPS employee card in front of a camera connected to the evaluation device, or otherwise.

In such embodiment, it is possible for the collector to signal they are "ready to pickup" to the evaluation system, for example, by pressing a button, showing a QR code or computer recognizable code to a camera, communicating to the evaluation system a unique code, or by using a pre-authenticated service such as a mobile phone application, an email, a webpage, a SMS message. Alternatively, face recognition techniques, audio recognition techniques, finger print recognition techniques are all example of authentication. In response to the valid "ready to pickup" signal or authentication, a processor of the evaluation system is capable of electro-mechanically unlocking or commanding the unlocking of the vault. For example, the collector could enter the code on the evaluation device, or on a device connected to the vault, or using a mobile application, or using a communication mean such as email or text, which would cause the evaluations system to—after validating the authenticity of the signal—cause the unlocking of the vault.

FIG. 2A-2G each illustrates an example evaluation device, or components thereof, that can be used for the remote evaluation of PODs, according to some embodiments.

FIG. 2A illustrates an evaluation device described in U.S. patent application Ser. No. 15/598,004 filed on May 17, 2017. FIG. 2A schematically illustrates a frontal view (left), an angled frontal view (middle) and an angled rear view (right) of an electronic device collection kiosk 202, according to certain example embodiments.

The evaluation device 202 includes a screen 204 to display instructions and messages to the client. Screen 204 may be configured to display messages, images, and/or video. The displayed content may be stored in the evaluation device, dynamically generated based upon interactions with the client and/or call center operator, and/or received over a network from an external source such as, for example, central servers 104 and/or call center 140. In at least some embodiments, screen 204 may include a touchscreen (e.g. display screen including a touch-sensitive panel) by which the client can provide input to the evaluation device using fingers and/or a stylus. The touchscreen may be configured to display a keyboard or the like for the client to provide inputs. In addition to, or in place of the keyboard, the touchscreen may provide displayed buttons and the like that the user can "touch" in order to provide inputs to the computer programs executed on evaluation device 202. In some embodiments, instead of or in addition to "touch", the evaluation device may include support for input via hand motion detection technology such as for example radar-based SOLI™ technology from Google™, or computer vision algorithms or the like to determine user input. Alternatively, the evaluation device 202 may have voice activated controls, in such case, requiring audio capabilities such as a microphone and speaker, and voice recognition software capable of collecting and interpreting user commands or responses.

In many embodiments, the evaluation device 202 includes a device entry door or drawer 206 that is opened in order for the client to submit the POD for scanning and processing and also, in some cases, for the client to retrieve the POD from the evaluation device 202. The device entry door 206 is manipulated to control access to a scanning area, sometimes referred to herein as the evaluation chamber, where the device is scanned using one or more cameras. In certain example embodiments, device entry door 206 is electronically controlled to open only at certain points during a transaction with a client. For example, the door 206 may be controlled by the evaluation device 202 to remain closed at all times except when the displayed messaging on screen 204 indicates that the client may now submit the POD for scanning and processing or when the messaging indicates that the client may now retrieve the POD. In some embodiments, the device entry door 206 may be opened and/or closed manually by the client.

Evaluation device 202 may also include a cash dispenser (not shown in FIG. 2A) which has a related cash dispenser camera 208 and a cash dispenser shutter door 210 that controls access to the cash dispenser. The cash dispenser is configured to dispense cash to the client, and has access to a known amount of money in stored cash of one or more value denominations. In certain example embodiments, the cash dispenser shutter door 210 is electronically controlled to provide access to the cash dispenser only at certain times during a transaction. The cash dispenser camera 208 is configured to monitor the cash dispenser door. In some embodiments, the cash dispenser camera 308 is selectively activated to take images and/or record video when the cash dispenser shutter door is activated. For example, during an interval starting shortly before the cash dispenser shutter door is opened to shortly after it is closed, the cash dispenser camera may be activated recording video. In some embodiments, one or more other cameras of the evaluation device too can be activated for all or some part of the duration in which the cash dispenser camera is active. The recorded images/video may be stored in association with an identification of the client or clients who are currently interacting with the evaluation device.

In an embodiment, the evaluation device comprises or is connected to a card dispenser unit, which is capable to mechanically dispensing cards such as store gift cards or merchandising coupons or value stored on a card. The card dispenser unit can be of any type, such as simple mechanics dispensing predefined value cards, hybrid models such as the Mutek F5 or multi tray Mutek MTK F56. In an example embodiment comprising a card dispenser unit, the evaluation device is capable of sending instructions to the card dispenser for writing information which may comprise of a unique identification code that can be assigned in a database accessible on the network or otherwise distributed to a variety of database or lists. In some embodiments, a monetary value is assigned to the unique identification code in a database so that, for example, a vending equipment or payment terminal, such as POS systems or card payment system that is capable of functioning with open loop or closed loop card systems can be used. Although not shown separately in FIG. 2A, the card dispenser may be incorporated as an output device in the evaluation device or the card dispenser may be incorporated in another device such as the cash dispenser.

An ID card unit 211 may be provided to accept an ID card, such as, for example, a driver's license. The ID card unit 211 may include an ID card reader 212 and an ID card chute 214. The ID card reader 212 may be configured to accept a submitted ID card such as a driver's license, to move the ID card into a scan region (not separately shown), to read one or more of a magnetic stripe, a smart card chip, or an RFID in the ID card, and/or to scan or photograph one or both sides of that ID card while it is in the scan region. After the ID card has been processed in the ID card reader 212, it may be dropped into the ID card chute 214 or, in some embodiments, be returned through the same or similar card slot as it was put into. The ID card chute may have an electronically or manually controlled door which can be opened to retrieve the ID card. The ID card unit may have an indicator 228 to display status associated with the ID card reader. In some embodiments, the indicator 228 may include one or more indicator lights to indicate one or more its operational statuses such as, for example, ready to receive ID card, scanning in progress, ID card is in the chute. In some embodiments, the indicator 228 may include an LCD display screen in which short status messages can be displayed. In some other embodiments, the ID card unit 211 may include a camera that can capture images of an ID card in sufficient resolution, and associated optical character recognition (OCR) or other technology to process the captured images of the ID card to determine identification information. For example, with such a unit 211, the user of the evaluation device may be prompted to hold each side of the ID card up to a camera for an image of sufficient resolution can be captured, and the captured images can be processed by OCR software to detect the associated driver license number, name etc. contained in the ID card. Some embodiments could alternatively use Near-field communications (NFC) such as the technology used for smartphone payments.

A printer 216 incorporated into evaluation device 202 may be configured to print one or more of receipts, estimates, labels, etc., as commanded by one or more processors in the evaluation device. An indicator 226 may be associated with the printer to display its status. In some embodiments, the indicator 226 includes one or more indicator lights which may be associated with the printer to provide visual status of the printer's operation (e.g., "printer busy", "out of paper", etc.). In some other embodiments, the indicator 226 may be an LCD display screen. Alternatively, e-receipts may be provided for instance by email or text-message to the customer and/or the representative, but also can be taken as a picture of the screen of the evaluation device, which may in preferred embodiment contains identifiers that are easy to be computer recognized, such as bar or QR codes.

The evaluation device 202 may also have incorporated into it one or more outside-facing cameras, such as, for example, front wide angle camera 218, device entry monitoring camera 220, and top camera 222. The front wide angle camera 218 and top camera 222 can be configured to capture images of the client as he/she approaches the evaluation device and/or interacts with the evaluation device. The device entry monitoring camera 220 is configured to provide for monitoring the device entry door 206 and surrounding area, so that aspects relating to the submission of the POD to the evaluation device and retrieval of the POD from the evaluation device can be reliably confirmed. The cash dispenser monitoring camera 208 is another outward facing camera provided in at least some embodiments. The evaluation device may be configured so that two or more of these cameras can be activated in a coordinated manner. For example, in some examples, one or more of the cameras may be activated based on a trigger detected by one of the cameras (e.g., motion detection from top camera 222 or wide angle camera 218), when triggered by opening of a controlled shutter or door of the evaluation device, when the fingerprint reader is activated, when the touchscreen is touched, etc.

A fingerprint scanner 224 may be arranged on the surface of the evaluation device 202 such that the client is provided the ability to conveniently provide a fingerprint scan via the evaluation device 202. In various embodiments, the fingerprint of a user may be stored by the evaluation device in association with the ID card of the client, and may be used in association with agreements etc. as the client's signature, and/or to provide access verification for one or more of the controlled shutters.

Evaluation device 202 may also have incorporated in its structure a charging station 230 and/or a trash bin 232. The charging station 230 can be configured for providing clients with the capability to charge devices such as the electronic device which they wish to transact using the evaluation device 202. In some embodiments, the charging station 230 includes power outlet such that the client can plug in his own power cord to charge his electronic device. In some other embodiments, one or more different charging cables/connecters of different types (e.g. connectors for iPhone, connector for Samsung Galaxy S5, different types of USB connectors, etc.) may be provided such that the client can select the appropriate charging cable. In yet other embodiments, a combination of the above two techniques may be provided. The charging station may be behind an electronically controlled door. The charging station may, in some embodiments, charge a plugged in device for long as it is left plugged in the charging station. In some other embodiments, the charging station may be configured to provide a measured charge for each plugged in device. The measured charge may be provided based upon a limited time allowed for charging, based upon limited duration and amount of power provided, or based upon a percentage of the battery being charged.

It may not be possible to attest with a high level of accuracy the state of a battery during the limited period of time that the diagnostic application is run. Short duration of a battery test is likely to create false positive wherein many batteries may appear to work well, but will suffer rapidly or suddenly. However, some embodiments use an astute method that continues to test the battery after the device has been traded and is secured in the vault. In such embodiments, measurements of the battery levels are made at regular intervals and stored as attributes of the POD for possible further analysis. At some point the battery should fail and stop reporting. An algorithm, programmatic or machine learned, may then be used to determine the state of the battery. Such test may be used to issue another payment to the customer when the battery health is above a certain level, such as e-payment and other methods described herein, and can also be used to facilitate triage when the POD arrives at the processing center, for example, by having the information communicated or rendered available to the processing center so that defective batteries are sorted immediately and routed through a repair area or process.

The trash bin 232 is designed to provide clients with the convenience of disposing small amounts of trash such as, for example, wrapping or packaging for electronic devices, labels, receipts, and additional parts associated with the electronic device that is submitted to the evaluation device etc. In some embodiments, in place or in addition to the trash bin, another peripherals bin (accessory bin) is provided. The peripheral bin may be protected by a controlled door, and, in some embodiments, may be opened only for a client who has completed a predetermined stage of the transaction process (e.g., stage of actually submitting an electronic device to be scanned by the evaluation device, stage of completing authentication by submitting the identification documents, etc.). The peripherals deposited into the bin may be collected in a chute. The collected peripheral etc., may be for purposes of recycling. However, in some embodiments, peripherals submitted to the peripheral bin may be tagged or marked as being associated with an electronic device submitted to the evaluation device, so that, if necessary, the peripherals can be associated with the proper POD in a downstream activity.

Figure 2B:
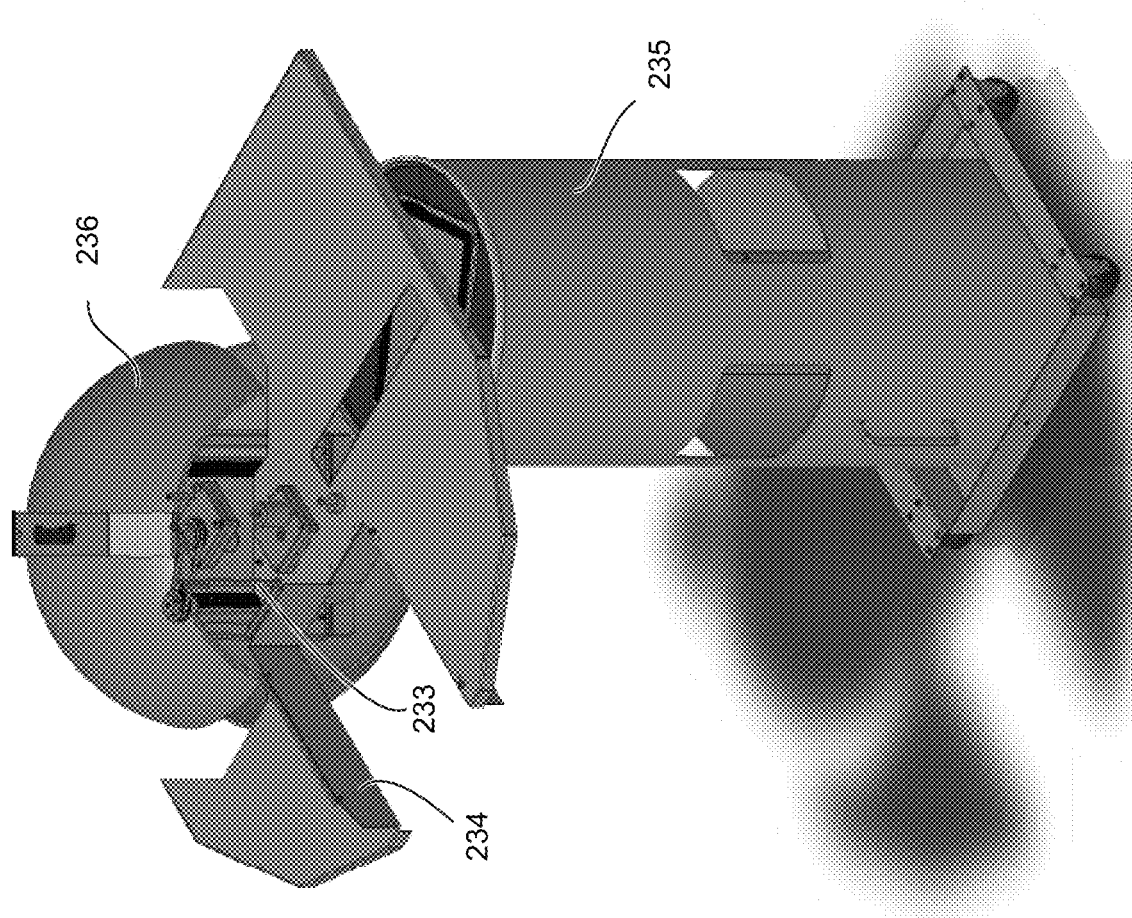

FIG. 2B schematically illustrates a shutter 234 together with shutter actuator 233 (a shutter actuator lever is hidden from view by shutter 234), of evaluation device 202 described in U.S. patent application Ser. No. 15/598,004, according to an embodiment. The shutter 234 may be actuated open by the closing of the door 206 and closed by the opening of the door 206. Also illustrated in FIG. 2B is a drum assembly 235 used for collecting the scanned PODs. The scanned PODs may be deposited temporarily in a vault in the drum assembly 235.

Figure 2C:
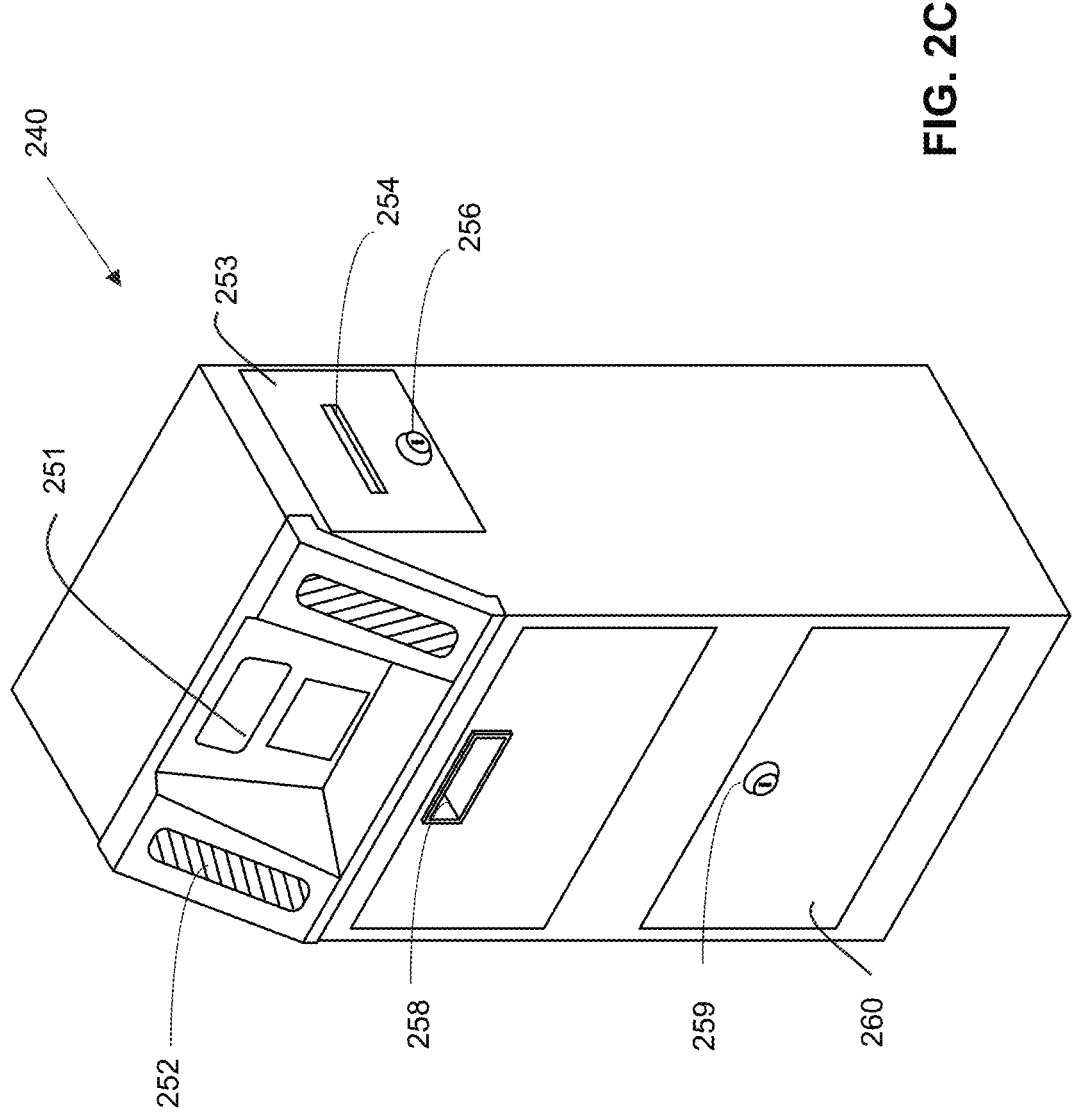

FIG. 2C illustrates an external view of a lower cost evaluation device described in PCT Patent Application No. PCT/IB2018/055218 filed Jul. 13, 2018. The low-cost electronic device collection kiosk 240 may be equipped with basic computer processing capabilities, according to some embodiments.

Evaluation device 240, in the illustrated embodiment, may include a touchscreen display 251 for interacting with the user by displaying output and receiving touch screen input, one or more speakers 252 (the illustrated embodiment includes a speaker to the left and to the right of the display screen), a door 253 to access the evaluation chamber and/or computer configuration, an opening 254 to receive the POD for imaging, a lock 256 for the door 253, an opening 258 to receive the POD for collection, a door 260 to access the collection bin, and a lock 259 for the door 260.

FIG. 2D illustrates a schematic view of a low-cost electronic device collection kiosk 262, which is equipped with basic computer processing capabilities, according to some embodiments.

Evaluation device 262 is a mini kiosk for imaging and collection of electronic devices. Evaluation device 262, in contrast to the full featured evaluation device 202, includes only basic (or bare bones, skeletal) computing capabilities. In some embodiments, the computer processing capabilities available in the evaluation device 262 is limited to controlling a single camera capturing images of the POD positioned in the evaluation chamber and controlling a basic display and an input device. Other embodiments may include additional processing capabilities such as, for example, controlling one or more additional cameras in the evaluation chamber, control of higher quality display devices and input devices, controlling audio input/output, controlling a tray, etc., but remains with less processing capabilities than full-function evaluation devices 262.

By equipping evaluation device 262 with only basic computing capabilities, and at least in part thereby reducing the manufacturing cost of the evaluation device 262, the inventors have developed an evaluation device that can be economically installed at a large number of locations including locations at which the number of portable devices collected is below a certain threshold that would have been necessary for a full featured evaluation device to be economical.

The reduced processing capabilities result in evaluation device 262 having insufficient processing power to perform tasks as simultaneously driving multiple displays, movably manipulating the POD inside the evaluation chamber while image taking is being performed, simultaneously performing an attract loop while normal processing of the evaluation device is taking place, etc. The inventors have compensated for many of the reduced capabilities by relying on the backend (e.g., call center 140 and/or data processing servers 104) for some of the processing typically performed at the full featured evaluation devices, relying upon mirror reflections of the POD to reduce the number and angles of required images and the number of cameras required, etc.

Other design aspects contributing to the lower cost, when compared to the full featured evaluation devices such as evaluation device 202, may include one or more of a lower cost housing, fewer and/or lower resolution display screens, fewer cameras, fewer security features, reduced advertising capabilities, alternate techniques of safely depositing portable devices in a collection bin after evaluation, etc.

According to some embodiments, evaluation device 262 comprises an upper container 263 configured to facilitate evaluation of the portable device, and a lower container 264 configured to collect and store PODs.

The first container 263 is configured to have a POD (e.g., electronic device intended to be traded) positioned within in a manner that one or more images can be captured of the POD. The area 265 in the first container in which the POD is located during may be referred to as the "imaging chamber" or "evaluation chamber". In one embodiment, the first container 263 includes an opening (not separately shown in FIG. 2D) through which the POD is moved into the first container. The opening may be of a shape or size that permits a user to manually insert the POD into the first container and place it on the bottom inside surface 268 of the evaluation chamber. In some example embodiments, the first container includes a door (not shown in FIG. 2D) on one of its sides, such that the inside of the first container can be accessed by opening the door.

In some embodiments, the door (not separately shown) may be held closed (locked) by electromechanical means (e.g., lock 277) such as an electro magnet, solenoid or motor so that the first container is accessible only when the mini evaluation device is operated normally, for instance, after image capture and user responses are received via the touchscreen display to questions regarding transaction, where the imaging of the POD in the evaluation chamber is controlled with the help of an evaluation device application running on an evaluation device premise representative smartphone or other portable device (e.g., "salesperson application") and/or where the imaging of the POD is controlled remotely through a website. In such embodiments, a minimal or bare-bones electronics and communications means may exist for a remote application or software (for example, a system-on-chip, a Bluetooth or Wifi enabled device, Internet of Things or Raspberry pi type of low cost computing device 270) to, among other things, control the door.

ADD: With imminent large-scale deployment of 5G network, an embodiment of low-cost mini evaluation devices, the input and output controls may be of 5G type, so that there is only limited computing, if any at all, at the evaluation device level. 5G will enable more machine to machine wireless communication (M2M). With 5G technologies, using 5G sensors and actuators, or one or more 5G controllers, an embodiment of the evaluation device is totally controlled remotely, such as through cloud computing servers which receives real-time data and emit real-time commands from and to the 5G sensors and actuators of an evaluation system. Such embodiment could be comprised of 5G sensors and 5G actuators. Example 5G sensors in example embodiments may include 5G high definition camera for examination of the device, 5G door open switch, and 5G microphones, Example 5G actuators that may be used in example embodiments may include a 5G audio speaker, and 5G open door actuators (for example an actuator may be used to lock/unlock the inspection area, and another actuator to lock/unlock the vault. me example embodiments may combine two or more of the sensors/actuators on one or more 5G controller board, such as on a small footprint embedded PCB, or by using a 5G controller as a board connected to a special purpose PCB for input and outputs (sensors and activators). Some example embodiments may combine two or more of the sensors/actuators on one or more 5G controller board, such as on a small footprint embedded PCB, or by using a 5G controller as a board connected to a special purpose PCB for input and outputs (sensors and activators).

The inside of the evaluation chamber in the first container may have one or more mirrors 269 arranged at one or more positions (e.g., on the inside sides of the evaluation chamber in the top container 263) around the location designated for placing the POD. The mirrors may be arranged so that they capture reflections of the sides of the POD, and the captured reflections are also captured in an image of the face of the POD captured by a camera positioned at the top or bottom of the first container. The mirrors may include a single mirror, or multiple mirrors. In some embodiments, the mirrors are arranged so that every portion of every side of a POD (e.g., rectangular or substantially rectangular smartphone, devices of other shapes, etc.) is captured in a reflection at least by one of the mirrors.

In some embodiments, additional cameras or additional image taking positions for the same camera may be used instead of mirrors to provide additional viewing angles. For example, two additional cameras placed at 45-degrees and having a view on the edges of the POD combined with a top view and bottom view cameras provides additional viewpoints without having to move the POD inside the first container. It will be understood, that while multiple cameras can be used advantageously, only a single camera (for example, a camera taking an image from the top, supported by the reflections in the mirrors) is necessary for evaluation of the POD.

In some embodiments, a platform 267 is formed on the bottom inside surface 268 of the evaluation chamber 265. The platform is sized and shaped for placing the POD. In some embodiments, the platform is made of the same material as the bottom inside surface 268 of the evaluation chamber. In some embodiments, the platform 267 may be constructed with a transparent material such as plexiglass. In some embodiments, the bottom 268 of the evaluation chamber too is made from a transparent material. Having the bottom 268 and the platform 267 in transparent material enables the capture of images using a camera located below the bottom surface 268.

In some embodiments, a unique computer-readable identifier such as one or more QR codes may represent an evaluation device ID and may be included in the viewing area in a portion of the evaluation chamber that does not interfere with the imaging of the POD. Using recognizer algorithms, such as optical character recognition, QR or barcode reading technology, the system (e.g., data processing servers or application that process images) may be capable of confirming the location where a particular trade occurs.

In some embodiments, where there the evaluation chamber includes a platform on which the POD is to be placed, at least some of the mirrors may be arranged at an angle so that, in addition to reflection so the sides of the POD, at least some portions of the bottom surface of the POD are also represented in the reflections. In this manner, an image that captures the face of the POD can also include reflections of the sides of the POD and at least portions of the bottom surface of the POD.

One or more sides of the first container may be constructed with a transparent (or partially transparent) material so that the flow of light to the inside of the first container is facilitated, and/or additional images of the POD within the first container can be captured (e.g., using an evaluation device premise representative's smartphone) through the transparent sides.

The top 266 of the first container may be, in some embodiments, at least in part constructed from a transparent material. A transparent material may facilitate the inside of the container to have more light, and may facilitate the use of a second camera-enabled device (other than the evaluation device), such an evaluation device premise representative's smartphone or other portable device, to capture additional images to supplement images captured by the one or more cameras integrated with the evaluation device.

In some embodiments, a hole (not separately shown), with a size barely sufficient for a smartphone camera (e.g., such as a camera of electronic device) to capture an image of the face of the POD is formed at or near the center of the top 266. The field of a camera placed over the hole so that it can capture an image of the face of the POD may include the mirrors located around the POD. In this manner the image of the face of the POD, also includes reflections of the sides and/or portions of the bottom surface of the POD. Therefore, the hole may be sized in accordance with the size of the cameras (e.g., camera lens, or lens and flash) that are expected to be used, the thickness of the top such that the top does not interfere with the field of the camera, and the distance to the mirrors from the center of the bottom surface such that the mirrors (or at least portions of the mirrors) are within the field of the camera placed at the hole and the reflected images in the mirrors would also be included in the image of the face of the POD. In example embodiments of the evaluation device 262, any images captured by a camera that is not integrated with the evaluation device is supplemental to the images captured by the at least one camera 272 integrated with the evaluation device to capture images of the evaluation chamber. This techniques ensure that all pictures are taken in a similar environment, with regards to distances, which facilitates machine learning.

The bottom container 264, as noted above, is configured to collect a plurality of PODs. After a POD has been subjected to an image capture in the evaluation chamber 265, and the subsequent evaluation, and if the user and the system come to an agreement to complete the trade of the POD, then the POD is deposited into the bottom container 264 to be stored until it can be securely transferred to another location for further processing.

In some example embodiments, the POD is deposited into the bottom container through an opening 275 on a side of the bottom container. The opening may be sized so that it is large enough to accept PODs up to a certain predetermined size (e.g., size of a larger smartphone, size of iPad etc.), but is too small to allow retrieving the deposited PODs by hand or other retrieving device. The shape of the opening, in the inside, may also be configured to make it more difficult or substantially impossible to retrieve deposited devices using a retrieval tool.

The computer 270, or a controller operating with the computer, may control one or more cameras 272 and 273. Camera 272 may be located underneath a plexiglass bottom 268 of the evaluation chamber 265 so that an image of the POD positioned on the platform 267 can be captured. The image may include reflections of various angles of the POD from strategically placed mirrors 269 in the evaluation chamber. The camera 273 may be controlled by the computer or other controller to capture images in the collection bin in order to confirm that a particular POD has been deposited in the bin.

The computer 270 may operate to transmit information about the POD obtained during evaluation, such as, for example, the images captured in the evaluation chamber, images captured in the collection bin, to the data processing servers 104 and/or call center 140 either via a direct network connection (e.g., direct wireless network connection through computer 270) or via a router 274 (e.g., WIFI/broadband router).

In another embodiment, a mechanically or electronically-operated door (not shown in FIG. 2D) in the bottom of the top container and/or top of the bottom container such that the user, after confirming that the POD is to be traded for agreed upon terms, can operate the door to drop the POD into the bottom container from within the top container. The door may be operated by a user using any of an app, website, a button, lever, slide or the like located on a side of the bottom container. In some embodiments, the doors may be operated by a minimal electronic setup that provides features such as door-locking etc., as described above in relation to a door in the top container. One or more safety mechanisms may be in place, to prevent (or minimize) accidental depositing of the POD into the bottom container.

The bottom container provides for secure storage of the collected PODs. In some embodiments, the only manner by which PODs with the bottom container can be collected is by using opening a lock 276 on a door of the bottom container. In order to ensure that staff at retail locations where mini evaluation devices are located do not have access to the collected devices, the key to the lock may be maintained by another entity other than those at the retail location. Another manner by which this security may be provided is to have two or more locks that each requires a different key. The purpose to have multiple locks with different keys is so that different interested parties can have their own key and lock such that, the PODs collected within the bottom container can be accessed only when all the interested parties are present. This security reduces the complaints about switched smartphones, missing PODs, etc.

According to some embodiments, a collection bag, bin or the like may be arranged in the bottom container such that when the door is opened to collect the so far deposited PODs, the collector does not have to gather them one by one, and instead can merely retrieve the collecting bag and tie the bag before forwarding it on for processing of the collected devices. In still other embodiments, the opening of the door may mechanically cause the tying/sealing of the collection bag.

In some example embodiments, the top container and bottom container may be moved relative to each other in an up/down direction. Such movement may affect the size of the area used for collecting PODs. This feature may be used to adjust the size the mini evaluation device for purposes such as fitting into restricted spaces.

Some embodiments may not include a bottom container, and may instead simply include a device receptacle such as a bag. In yet other embodiments, the bottom container may simply be non-existent. In such embodiments, traded-in electronic devices may be stored apart from the evaluation device, for example, in a secure bag, another safe located elsewhere, or somehow managed by the sales staff or representatives of the evaluation device location.

In some example embodiments, the system may include a method for associating a sales person or representative from the evaluation device location (i.e., representative who assists with accepting the trade-in electronic device) with a transaction. For example, the evaluation device application running on the POD may have a sign-in option, may require a pin code, password, visual face recognition, audio voice recognition, thumbprint or fingerprint scan or may require the sales person to identify itself before or after performing an evaluation so that any transaction can be associated with the sales person. The identification process can be made only once, for instance, if the sales person uses his personal phone (for embodiments using a sales person personal smart-phones). This identification mechanism may be useful in case there is a problem with the transaction. It can also be used to monitor the best sales persons by creating reports, for example using an online web portal, and optionally to give rewards or commissions.

Figure 2F:
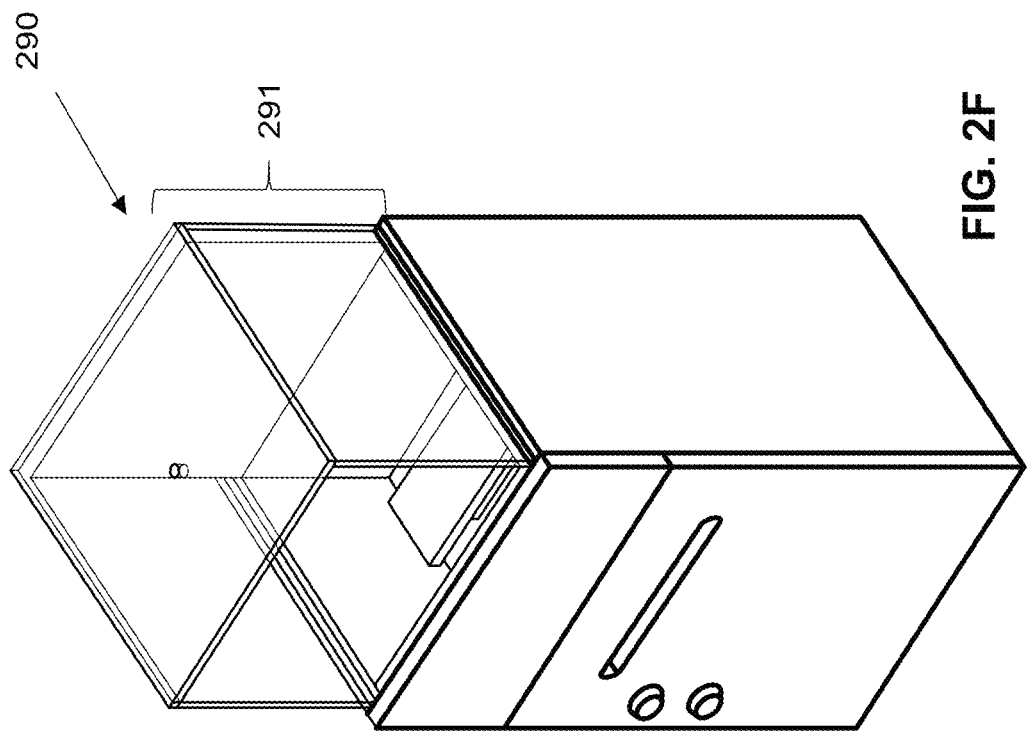
Figure 2E:
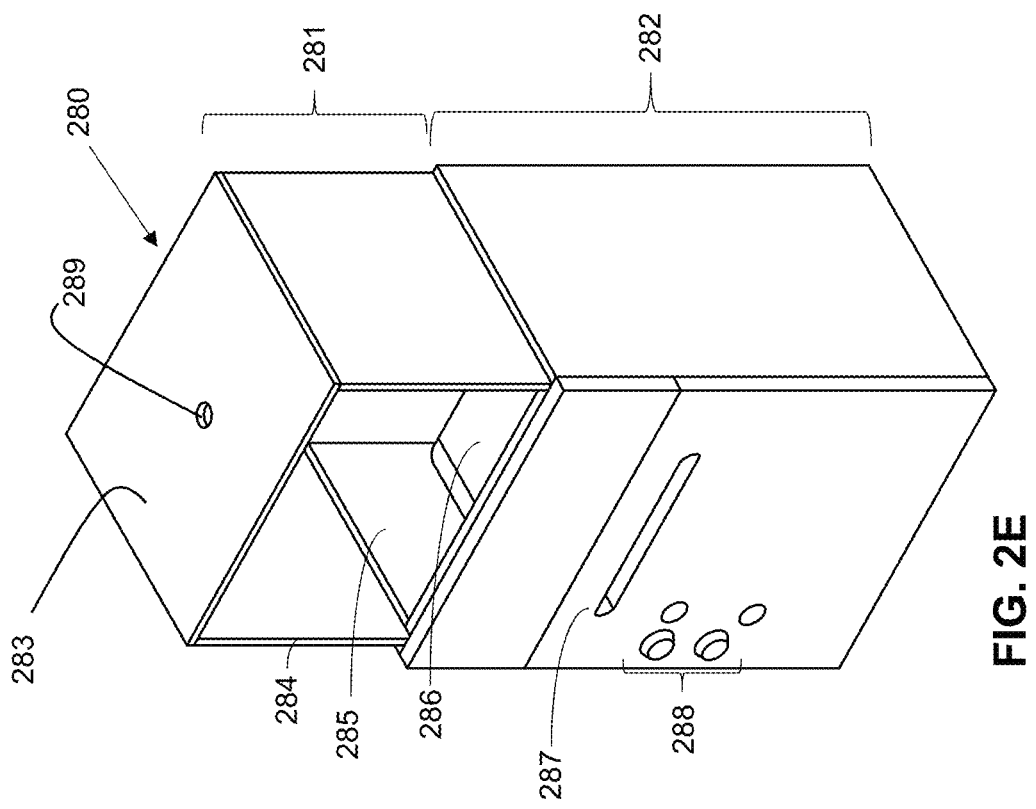

FIG. 2E illustrates a "computer-less" electronic device collection evaluation device 280, described above, according to some embodiments.

Evaluation device 280 is a mini evaluation device for imaging and collection of electronic devices. Evaluation device 280, at least in some example embodiments, does not include a computer processor and/or its own camera. A user may utilize a smartphone, tablet computer or the like to capture one or more images of the POD, to transmit the captured images to a remote server and/or operator, to receive a proposed trade value for the POD and/or instructions for further evaluation, to provide payment or other compensation for the POD, and to complete the transaction. For example, when evaluation device 280 is deployed in a retail store that specializes in mobile services and/or equipment and a user brings in a tradeable device (e.g., such as electronic device 125 above), a sales associate may use his smartphone or an iPad or the like as an image capture device to take and transmit an image of the POD to a server (e.g., such as data processing server 104 and/or call center 140) and to facilitate the interaction between the user and the server.

Transmission of the POD information, such as the image captured, may be done in various ways. In an embodiment, email or other standard information messaging systems (SMS/MMS, iMessage etc.) may be used to communicate information to data processing servers (e.g., data processing servers 104) and/or call center operators (e.g., call center 140). Other embodiments may use a custom application or a web-page for transmitting POD information, providing a better user experience.

Such embodiments may be used in conjunction with a diagnostic application running on the POD, such as described in U.S. patent application Ser. No. 15/153,137 filed on May 12, 2016 and/or U.S. patent application Ser. No. 15/598,004 filed on May 17, 2017. Such diagnostic application on the POD may provide additional information for the remote servers and/or the call center agents to make more accurate evaluation of the POD value, the POD make, model and completed tests.

In some embodiments, one or several method are implemented to send information about a network access point, such as a private Wi-Fi network, to the POD in order to simplify the process of the POD connectivity to the evaluation device and/or evaluation system.

In such an embodiment, the evaluation device is capable of providing, directly or indirectly, access to a network for POD to connect to. This may be done for example by having the evaluation device connect to a first network, which network may be able to provide internet connectivity, such network could be wired or wireless, and the POD could be provided with access to a network access point of a second network. The second network may have limited access, possibly limited by a router or the evaluation device or evaluation system itself acting as a router. The method can include a passive NFC Tag on the evaluation device to relay a static information, or a dynamic NFC Tag so that the information can be changed dynamically.

In some embodiments, some other method could make use of a special QR Code for example displayed on the evaluation device display, or printed on the evaluation device chassis, to relay the private Wi-Fi network information to the POD. The POD would be using a QR Code reader to read the information and connect to the network. When POD are evaluated through a network controlled or offered by an evaluation device, the evaluation device may use the MAC address information of the network controller of the POD for integrating into diagnostics or device identification processes. For example, when the evaluation system offers a network to a POD, the evaluation system may monitor and collect the connecting MAC address and may compare it with other source of information, for example MAC address obtained and communicated by the diagnostic application, or OCR read from a device information page of the POD.

In an embodiment using private network access point, the MAC address may be obtained upon a first connection when the POD is being diagnosed with the diagnostic application, and obtained again at a later step, possibly after data has been wiped or the device has been factory reset, in order to authenticate that the proper is inserted in the evaluation device's inspection bin or vault. In such embodiment, an association between the MAC address and the IMEI may be used, for example by using a service interface to ensure that the inserted phone is not locked or blacklisted, for example, using an API to PhoneCheck®.

In an embodiment using private network access point with dynamic NFC, the login information may change again in order to limit potential fraud or access. In such preferred embodiment, the login information changes at least for every device, based on time or modifying the login information every time a device is to connect to the private network access point. In an embodiment using private network access point, the network may be hidden for enhanced security because the network SSID may be transmitted as part of the NFC information Evaluation device 280 comprises a first container (upper container in 281) configured to facilitate evaluation of the POD, and a lower or separate/separable container 282 configured to collect and store PODs.

The first container 281 is configured to have the POD (e.g., electronic device intended to be traded) positioned within in a manner that one or more images can be captured of the POD. In one embodiment, the first container 281 includes an opening 285 through which the POD is moved into the first container. The opening may be of a shape or size that permits a user to manually insert the POD into the first container and place it on the bottom inside surface 286 of the first container. In some example embodiments, the first container includes a door (not shown) on one of its sides, such that the inside of the first container can be accessed by opening the door.

In some embodiments, the door (not separately shown) may be held closed (locked) by electromechanical means such as an electro magnet, solenoid or motor so that the first container is accessible only when the mini evaluation device is operated normally, for instance, with the help of a salesperson application or through a website. In such embodiments, a minimal or bare-bones electronics and communications means may exist for a remote application or software to control such door, for example, a system-on-chip, a Bluetooth or Wifi enabled device, Internet of Things (for computer-less version) such as Arduino board or similar design or Raspberry pi type of low cost computing device for computer-based versions.

In some embodiments, the POD may have at least a portion of a side (e.g., 284 side) open in order to facilitate access to the inside of the first container and also to facilitate the flow of light to the inside of the first container.

The inside of the first container may have one or more mirrors arranged at one or more positions (e.g., on the inside sides 285) around the location designated for placing the POD. The mirrors may be arranged so that they capture reflections of the sides of the POD, and the captured reflections are also captured in an image of the face of the POD captured by a camera positioned at the top or bottom of the first container. The mirrors may include a single mirror, or multiple mirrors. In some embodiments, the mirrors are arranged so that every portion of every side of a POD (e.g., rectangular or substantially rectangular smartphone, etc.) is captured in a reflection at least by one of the mirrors.

In some embodiments, additional cameras or additional image taking positions for the same camera may be used instead of mirrors to provide additional viewing angles. For example, two additional cameras placed at 45-degrees and having a view on the edges of the POD combined with a top view and bottom view cameras provides additional viewpoints without having to move the POD inside the first container. It will be understood, that while multiple cameras can be used advantageously, only a single camera is necessary.

In some embodiments, a platform is formed on the bottom inside surface of the first container. The platform is sized and shaped for placing the POD. In some embodiments, the platform is made of the same material as the bottom inside surface. In some embodiments, the platform may be constructed with a transparent material such as plexiglass.

In some embodiments, a unique computer-readable identifier such as one or more QR codes may represent an evaluation device ID and may be included in the viewing area in a portion of the first container that does not interfere with the imaging. Using optical character recognition, QR or barcode reading technology, the system (e.g., data processing servers or application that process images) may be capable of confirming the location where a particular trade occurs.

In an alternate embodiment, the evaluation device ID is placed elsewhere, which requires an additional step for the "trade application" (e.g., an app running on an evaluation device premise representatives device or interaction control device, evaluation device application or part thereof running on an interaction control device) to scan the evaluation device ID so that the system is informed of the trade location.

In some embodiments, where there the first container includes a platform on which the POD is to be placed, at least some of the mirrors may be arranged at an angle so that, in addition to reflection so the sides of the POD, at least some portions of the bottom surface of the POD are also represented in the reflections. In this manner, an image that captures the face of the POD can also include reflections of the sides of the POD and at least portions of the bottom surface of the POD.

One or more sides of the first container may be constructed with a transparent material so that the flow of light to the inside of the first container is facilitated, and/or additional images of the POD within the first container can be captured through the transparent materials of the sides.

The top 283 of the first container may be at least in part constructed from a transparent material. A transparent material may facilitate the inside of the container to have more light.

In some embodiments, a hole 289, with a size barely sufficient for a smartphone camera (e.g., such as a camera of electronic device 122) to capture an image of the face of the POD is formed at or near the center of the top. The field of a camera placed over the hole so that it can capture an image of the face of the POD may include the mirrors located around the POD. In this manner the image of the face of the POD, also includes reflections of the sides and/or portions of the bottom surface of the POD. Therefore, the hole may be sized in accordance with the size of the cameras (e.g., camera lens, or lens and flash) that are expected to be used, the thickness of the top such that the top does not interfere with the field of the camera, and the distance to the mirrors from the center of the bottom surface such that the mirrors (or at least portions of the mirrors) are within the field of the camera placed at the hole and the reflected images in the mirrors would also be included in the image of the face of the POD.

The height of the top container may be adjustable. For example, a first part and a second part of the top container may be moved relative to each other so that the height can be changed. The changeable height may be used to configure a height appropriate for the focal point of the camera to be used, and/or to change the size of the entire mini evaluation device so that it may be fit to a more restricted place. In some embodiments, the height may be changed using pre-marked latch positions that are configured for optical image capture using one or more popular smartphone models.

The bottom container, as noted above, is configured to collect a plurality of PODs. After a POD has been subjected to an image capture in the first container, and the subsequent evaluation, and if the user and the system come to an agreement to trade the POD, then the POD is deposited into the bottom container to be stored until it can be securely transferred to another location for further processing.

In some example embodiments, the POD is deposited into the bottom container through an opening 287 on a side of the bottom container. The opening may be sized so that it is large enough to accept PODs up to a certain predetermined size (e.g., size of a larger smartphone, size of iPad etc.), but is too small to allow retrieving the deposited PODs by hand or other retrieving device. The shape of the opening, in the inside, may also be configured to make it more difficult or substantially impossible to retrieve deposited devices using a retrieval tool.

In another embodiment, a mechanical door in the bottom of the top container and/or top of the bottom container such that the user, after confirming that the POD is to be traded for agreed upon terms, can operate the mechanical door to drop the POD into the bottom container from within the top container. The door may be operated by a user using a button, lever, slide or the like located on a side of the bottom container. In some embodiments, the doors may be operated by a minimal electronic setup that provides features such as door-locking etc., as described above in relation to a door in the top container. One or more safety mechanisms may be in place, to prevent (or minimize) accidental depositing of the POD into the bottom container.

The second (bottom or separate) container provides for secure storage of the collected PODs. In some embodiments, the only manner by which PODs with the bottom container can be collected is by using opening a lock 288 on a door of the bottom container. In order to ensure that staff at retail locations where mini evaluation devices are located do not have access to the collected devices, the key to the lock may be maintained by another entity other than those at the retail location. Another manner by which this security may be provided is to have two or more locks that each requires a different key. The purpose to have multiple locks with different keys is so that different interested parties can have their own key and lock such that, the PODs collected within the bottom container (e.g. a vault for collecting POD) can be accessed only when all the interested parties are present. This security reduces the complaints about switched smartphones, missing PODs, etc.

According to some embodiments, a collection bag, bin or the like may be arranged in the bottom container such that when the door is opened to collect the so far deposited PODs, the collector does not have to gather them one by one, and instead can merely retrieve the collecting bag and tie the bag before forwarding it on for processing of the collected devices. In still other embodiments, the opening of the door may mechanically cause the tying/sealing of the collection bag.

In some example embodiments, the top container and bottom container may be moved relative to each other in an up/down direction. Such movement may affect the size of the area used for collecting PODs. This feature may be used to adjust the size the mini evaluation device for purposes such as fitting into restricted spaces.

Some embodiments may not include a bottom container, and may instead simply include a device receptacle such as a bag. In yet other embodiments, the bottom container may simply be non-existent. In such embodiments, traded-in electronic devices may be stored apart from the evaluation device, for example, in a secure bag, another safe located elsewhere, or somehow managed by the sales staff or representatives of the evaluation device location.

In some example embodiments, the system may include a method for associating a sales person or representative from the evaluation device location (i.e., representative who assists with accepting the trade-in electronic device) with a transaction. For example, the trade application may have a sign-in option, may require a pin code, password, thumbprint or fingerprint scan or may require the sales person to identify itself before or after performing an evaluation so that any transaction can be associated with the sales person. The identification can be made only once, for instance, if the sales person uses his personal phone. This identification mechanism may be useful in case there is a problem with the transaction. It can also be used to monitor the best sales persons, and optionally to give rewards or commissions.

FIG. 2F illustrates another "computer-less" electronic device collection evaluation device 290, according to some embodiments. Evaluation device 290 may be similar to evaluation device 280 described above, except where the top container 291 in evaluation device 290 is on several sides and on the top made of a plexiglass-type transparent materials. A see through top container (or at least partially transparent top with one or more sides transparent or partially-transparent) may facilitate the flow of light to the inside of the top container, and may make the evaluation device more attractive and interesting to users.

Figure 2G:
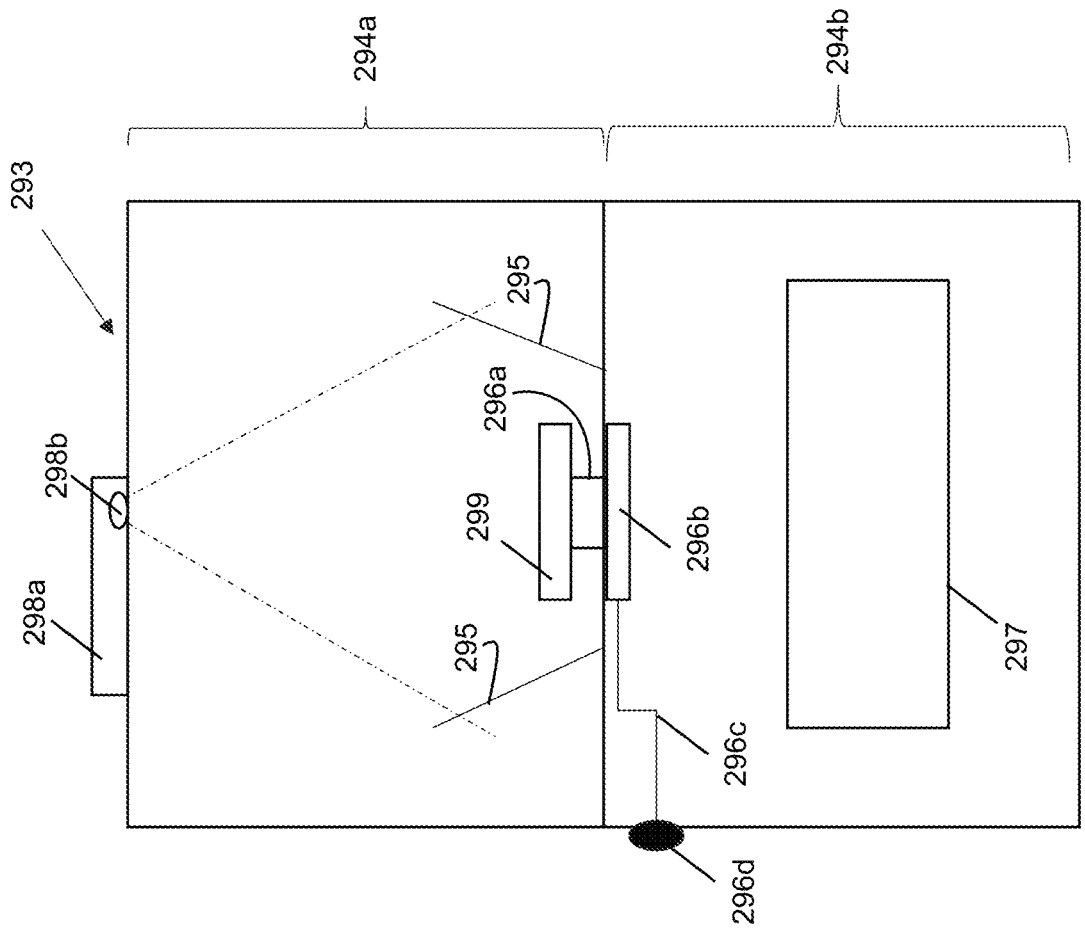

FIG. 2G is a schematic illustration of an image capture device 298a being arranged to capture an image of an electronic device 299 placed inside a "computer-less" electronic device collection evaluation device 293, according to some embodiments.

The image capture device 298a, which may be a smartphone of a user (e.g., POD described above), is positioned on the top panel of the top container 294a such that its camera 298b is positioned directly over a hole (not shown separately in FIG. 2G) facing downwards. The field of view of the camera 298b may be arranged so that mirrors 295 are within the field of view, as well as the POD 299 which may be placed on a platform 296a.

A trap door 296b may be operated by a button, slide or switch 296d and via a mechanical mechanism 296c to open and close door 296b. When the door 296b is caused to open, the electronic device 299 may fall into the collection bin 297 located in the bottom container 294b of the evaluation device 293.

Some embodiments may provide for ensuring that the POD was safely deposited inside the collection bin (e.g., bag, bin etc.). An example technique may include causing an evaluation device app running on the POD to take pictures inside the collection bin 297 where one or more QR codes or other computer-readable identifiers may be placed at strategic locations in order to confirm from the images that the POD was indeed inside the bin of the particular evaluation device. In another technique, the evaluation device app running on the POD may be caused to listen to audio or capture visual signals such as a specific sequence of light that is transmitted by a minimal electronic setup. For example, a minimalist electronic component, for example a micro controller programmed to toggle a signal on and off for controlling a LED for or speaker for an audio signal that may transmit such a "morse code like" audio sequence or binary information sequence by turning on/off an LED, wherein the sequence contains information to permit the evaluation device app on the POD (and/or subsequently the processors 104 or call center 140) to securely confirm that the POD was securely placed in the intended bin 297. In some embodiments, such confirmation may trigger the generation of a trade coupon or the like. Some embodiments may also use Bluetooth, local range wireless communication or LTE or 5G global network communication to accomplish the same.

In an example camera-enabled embodiment, for example, an embodiment including processor such as a Raspberry Pi or the like, a camera may be located inside the bin 297, and, by taking differential pictures may be able to confirm the placement of the POD inside the bin 297.

FIG. 3A and FIG. 3B illustrate a simplified evaluation device 300 (shown as 300a and 300b), according to some example embodiments. The evaluation system 300a is shown with the service door 310 closed, and the system 300b is shown with the service door 310 open. Manufacturing costs of evaluation devices has been a significant concern of the inventors and substantial research and development efforts have been made towards reducing costs related to manufacturing. Another constraint that drove the development of the simplified evaluation system shown in FIGS. 3A and 3B, or other embodiments thereof, is the sometimes limited retail space available for the installation of evaluation devices and associated apparatus.

The simplified evaluation device 300 is a mini evaluation device for evaluating and collecting portable devices such as smartphones, portable game devices, portable media players, and the like. The mini evaluation devices are designed so that they cost substantially less than the type of evaluation devices described, for example, in relation to FIG. 2. In at least some of the example embodiments, the mini evaluation devices are configured to be capable of accepting the full range of portable devices accepted by the full size evaluation device shown in FIG. 2A. In some other example embodiments, the mini evaluation devices may be designed to accept only some of the portable device types (e.g., accept smartphones but not devices as large as the 9.7 inch iPad) that are frequently traded by users. The mini evaluation devices can, at least in part due to their lower cost, be deployed in substantially greater numbers and/or in substantially higher densities to facilitate higher number of portable devices being collected. The lower cost of the mini evaluation devices enable each mini evaluation device to be profitable with a lower number of portable devices collected per collection period. Thus, for example, a mini evaluation device may be deployed at each retail outlet of one or more wireless service providers where users typically come to get new portable devices, have their portable devices examiner and repaired, etc.

Smartphones and the likes are often traded-in or disposed for recyclings after having been used for typically 2-3 years average. Most of these devices are still capable of performing many functions, even if they can carry some defects. Some embodiments innovate by making astute use of purchased or recycled pre-owned devices, and "repurposing" them into repurposed portable electronic devices ("RePOD") and making them useful as a manufacturing component for new evaluation systems, such as evaluation devices or other evaluation devices embodiments described herein. While providing performances similar or equal to brand new evaluations systems made from microcontrollers or new embedded electronics, these RePOD provide economics and environmental benefits.

In some embodiments, evaluation device 300 comprises one or more upcycled or repurposed portable electronic device ("RePOD") 302 (shown as 302a and 302b in the example FIGS. 3A and 3B) such as a smartphone or tablet computer, which may include, in an integrated form, at least an integrated user output interaction means such as a display or audio output arrangement, an integrated input means such as a touch screen, button or microphone audio arrangement, at least one embedded processor, at least one integrated camera and at least one of a wired or wireless communication means. At least one RePOD 302 is attached to an evaluation apparatus 300 to act as a core processing, interacting, and imaging device of the evaluation apparatus.

In the illustrated embodiment of evaluation system 300, a first RePOD 302a is attached to the system such that the first RePOD's integrated camera (e.g., the back camera) can be used to monitor and/or capture images of a POD placed in evaluation area 303 of the evaluation system 300. The first RePOD may be attached to any of the walls or ceiling of the chamber that includes the evaluation area 303. The first RePOD may be positioned so that images of the POD 304 located in the evaluation area 303 can be captured, preferably with the help of strategically positioned mirrors. The location of the first RePOD is controlled such that the acquired images of the POD are of a quality and a level of detail that is sufficient to detect at least some defects of the POD. In a preferred embodiment using the display screen of the first RePOD may be positioned such that the POD owner and/or operator(s) of the evaluation system can utilize the display screen as a user interface. The microphone and/or speakers of the evaluation system may also be positioned so that they can be used in the evaluation of the POD 304 that is located in the evaluation area. An embodiment of the invention may be voice-controlled, for example, allowing for recycling/repurposing of RePOD with problematic displays.

The evaluation area 303 may be formed to have mirrors 308 on one or more of the side walls. In some embodiments, one or more mirrors may also be attached to the bottom of the upper surface/ceiling of the evaluation area. The bottom surface of the evaluation area may be entirely or partially made of glass 306. A client door 312 may also be provided to enable placing the POD in the evaluation area 303.

A bin 314 may be configured as a vault to accept and temporarily securely store the POD that are subjected to evaluation or some other processing by the evaluation system. A service door 310 can be provided to enable the POD to be manually, or automatically upon completion of the evaluation, be deposited in the bin. The service door 310 may be configured so that it prevents access to the PODs in the bin without opening a door or the like by using an access key. In the illustrated embodiment, the opening of the service door 310 is restricted such that at maximum displacement of the door, the size of the opening to the bin and/or the configuration/shape of the bin prevents access to any devices that are already in the bin.

In some embodiments, a second RePOD can be positioned at a location lower than the POD in the evaluation area, such that a camera of the second POD can also be used to capture images of the POD located in the evaluation area. In one example, as shown in FIG. 3B, the RePOD 302b can be positioned so that it can be used to capture images that are either not available or that are difficult to acquire for the first RePOD 302a. For example, when the bottom surface of the evaluation area is made of glass 304, the second RePOD 302b can capture images at least of the surface of the POD being evaluated that is not visible to the first RePOD's cameras.

The RePODs 302a and 302b may be configured such that RePOD 302b can be controlled (e.g., to capture images of the POD in the evaluation area or in the bin) by the RePOD 302a. The captured images and/or other diagnostic information can be transmitted by one or more of the RePODs 302a and 302b to the central servers (e.g., central servers 104). In some embodiments where video is available on RePODs, one or more of the RePODs may be configured to record a video sequence as a potential additional defect detection visual information and to transmit or otherwise render accessible the video, or part of video information, to the evaluation system server for further analysis by human or machine agents.

In some embodiments using RePODs integrated within an evaluation system 300, specific input and outputs of the RePODs are repurposed to control parts of the system, such as, for example, unlocking a door, receiving signals from the system, detecting that a door is opened, etc. For example, in some embodiments, one or more of the following inputs may be repurposed to provide input signals to control the evaluation system:

the microphone, which may be configured to provide inputs in a variety of ways, such as analog input or simulated digital input, or used to receive single-wire databus for a frequency less than half the audio input spectrum (i.e. approximately maximum of 10,000 bits per second), or may be used as multiplexed audio tone input, such as DTMF, which could support for example 16 inputs, or other coder/encoder/modulation to support additional inputs limited by the audio limitations, such as frequency response and S/N level of the microphone input;

the volume up switch and the volume down switch, which support low-bitrate input/output that is sufficient for signaling door open/close states or singe-wire data bus;

the start/stop button; and one or more of the cameras through computer vision, for example by reserving part of a camera viewing area to receive information such as a color code that could be, for example, mechanically moved within the reserved viewing area when a door is closed as an indication of a door close, or by more sophisticated computer vision algorithms, which can visually detect an open versus a closed door.

In some embodiments the following outputs of a RePOD may be repurposed as output signals:

one or more of the LED lights may be used using optical electronics to control an external function, such as locking or unlocking a solenoid connected through the optical electronic; and one or both audio output channels (left and right) may be used for transmitting analog or digitally recognizable signals by connecting at least one of the headset or audio output signals to a controller or processor of the evaluation system for further decoding (for example, the RePOD could have the left channel routed to an analog to digital converter, which is furthermore digitally connected to a controller or a processor capable of interfacing and decoding information transmitted by the RePOD. More precisely, for example, the RePOD may use a signal such as serial communication simulated in an analog manner, carrier frequency, or by using multiple frequencies, for example DTMF or other multiplexed/codec, or by using any digitally recognizable signal capable of being transmitted within typical audio spectrum (normally from 20-20 000 hertz or the like)).

In some example embodiments with repurposed outputs of a RePOD, at least one input and one output channel can be connected to communicate with a custom control input-output board that redistributes information, or that provides external additional logic for operating the evaluation system. For example, in some example embodiments with repurposed outputs, an input output control board connected with the RePOD through a USB connection typically found on the charging connector, the input output control board redistributes information (input and output signals), or provides external additional logic for operating the evaluation system.

In other embodiments of system using RePOD, it may communicate with electronics through local wireless methods, such as Bluetooth, NFC, Wi-Fi, or, through wireless network, for example directly or through the servers, communication with the local devices could be made using 5G sensors and activators.

In some example embodiments with repurposed outputs, the display screen of a RePOD (e.g. RePOD 302a) may be used to display information and interact with the user, POD owner or on site assistant.

In some example embodiments with repurposed outputs, the display screen may reserve a few pixels in designated areas for controlling optically coupled information. For example, all 4 corners may be hidden from user view and assigned to optoelectronics so that signals can be communicated by illuminating the reserved areas of the screen. In such embodiments, the optoelectronics are typically connected to a controller or processor, or simply connected to electro-mechanical components, for example a solenoid that could be activated by turning to white (or other color capable of being optically recognized by the optoelectronic components or circuitry) a reserved area of the screen by the application running on the RePOD.

In some embodiments, the evaluation system 300 may furthermore be assembled with a support for attaching one or more RePODs at predetermined (and/or adjustable) positions and focal distances from an evaluation area within which a POD is subjected to evaluations based on imaging and optionally other techniques. A good (e.g., optimal) focal distance permits the evaluation system (i.e. the imaging devices of the evaluation system) to have a complete view of the evaluated POD 304, including of various dimensions, thus maximizing the pixel density for enhanced defect detection. The support for the one or more RePODs may be provided in some example embodiments by a system of railings and support bars, with adjustment knobs. The support and adjustment may enable the one or more RePODs 302, which are attached to the support, to be moved horizontally and/or vertically to position it with respect to the evaluation POD 304 in order to perform the evaluation. In some embodiments, the support and adjustment also may enable to rotate one or more of the RePODs 302 around its own axes so that more accurate images of the evaluation POD can be captured while having a RePOD oriented at an angle with respect to the evaluation POD. Whereas some embodiments may permit only manual adjustments to the positioning and/or angle of the RePOD, in some other embodiments, some or all of the adjustments may be electronically performed.

An example embodiment may furthermore comprise a fixed evaluation area with guides attached to the surrounding walls etc., on where to place the POD to be evaluated.

An example embodiment may furthermore have the support for the RePOD and/or the evaluation apparatus 300 being bendable, foldable or moveable, so that it takes a minimal amount of retail space when the evaluation device is not in use. In an embodiment, the support is foldable, so that it reduces the space occupied by the evaluation system 300, and when unfolded, it is operable to take images of PODs placed on the evaluation area at different angles, for example, a 45 degree view, a 90 degree view and a 135 degree view. If the small portable device (e.g. the RePOD) running the embedded evaluation diagnostic application is equipped with a gyroscope (and possibly accelerometer), the diagnostic application may provide instructions on where to move the attached small portable device and hold for the duration of imaging process. The movement may be performed manually or electronically.

FIGS. 3C and 3D illustrate an evaluation device and a detached vault according to an example embodiment. FIG. 3C illustrates the evaluation device 320 and FIG. 3D illustrates the detached vault 330. In this embodiment a smartphone 322 is used as the evaluation device which processes (evaluates) a POD 324 placed in the evaluation device which has an evaluation chamber 326. The smartphone 322 may be a RePOD as described above, and may be affixed to the evaluation device by a structure 328 that can hold the rePOD 322 securely in place during the evaluation process. Although a smartphone is shown as the rePOD, any electronic assembly providing user interaction means, network and a camera to inspect may be configured as the rePOD.

The detached vault 330 may be placed in a manner that is physically separated from the evaluation device 320. The detached vault 330 may have a rePOD 332 affixed at the top of the vault in a manner that it can at least capture an image of the POD 324 after it has been securely inserted into the vault. The POD 324, after it is evaluated in the evaluation device 320, can be physically removed from the evaluation device and inserted into the vault by placing it in a chute area 334 by a drawer 336 or the like. The drawer 336 may be electronically controlled by the rePOD 332 to slide out and in to enable the POD 324 to be brought into the chute area 334. When the POD 324 is located in the chute area 324, the rePOD 332 may capture an image of the POD 324 (while causing the POD 324 to display its IMEI or a QR code or the like) in accordance with a challenge-response technique for validation/verification described elsewhere in this disclosure.

Figure 4:
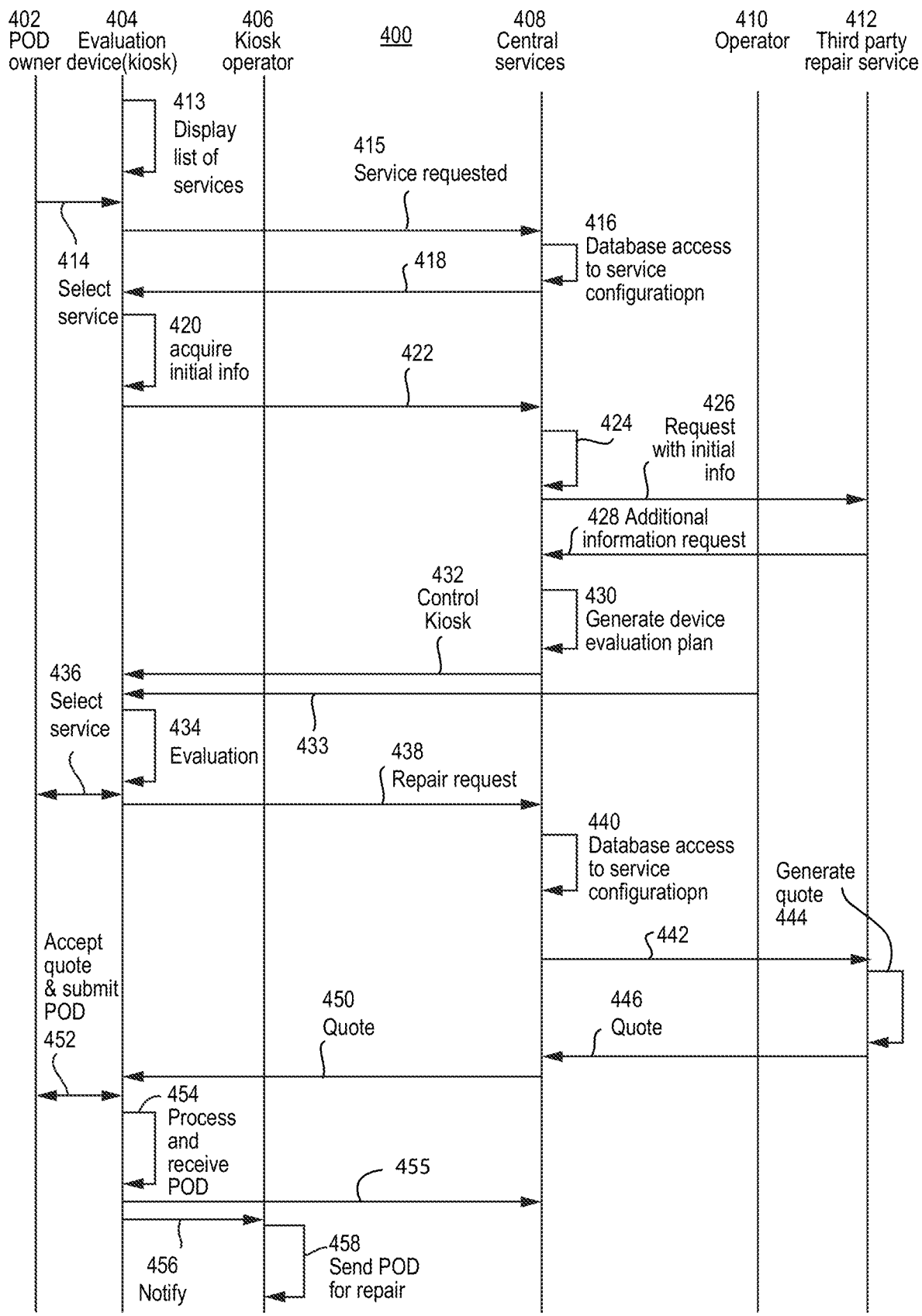
FIG. 4 illustrates a flowchart of a sequence of interactions and operations associated in using an evaluation device in a system such as that shown in FIG. 1, according to some embodiments.

FIG. 4 illustrates a flowchart of a sequence 400 of interactions and operations associated in using an evaluation device in a system such as that shown in FIG. 1, according to some embodiments. The sequence 400 of interactions illustrate an example use of an evaluation device by a user of a POD to obtain repair quotes for the POD and, optionally, to submit the POD for collection in association with the evaluation device.

According to some embodiments, sequence 400 may be used to provide a service of estimating repair costs. Evaluation devices 110 of the system 100 can be used to provide repair estimates for a POD in an unbiased manner by subjecting the POD to an evaluation that is at least partly independent of the repair service providers. The repair estimates may be with or without market value estimation. Once the repair costs have been estimated, the POD owner can optionally be directed to at least one repair outlet selected based on at least one of several criteria chosen by the user such as proximity, rating, cost, etc. In some other embodiments, the POD can be submitted to the system to be submitted to repair.

In example embodiments, the evaluation system is capable of estimating the repair costs of POD based on evaluation data taken by one or more of a diagnostic application executing on the POD, evaluation in the evaluation device, and/or visual inspection by a remote operator and/or evaluation device local staff. In some embodiments, the evaluation data from a POD's evaluation is stored as attributes in the POD's evaluation session and a repair pricing function or agent is enabled, by associating parts, parts repair costs and attribute information, to determine which parts need to be replaced and apply adequate pricing rules in order to estimate the cost required to repair the POD with improved accuracy compared to estimation many techniques. In an example embodiment, the algorithm is capable of identifying cost-efficient repairs by, for example, not adding repair time if not necessary and/or by identifying repair items for the POD in a manner that can be combined to save repair costs/time while adequately servicing the POD. For example, it may take two minutes to open the phone, but if two repairs are necessary requiring the steps of opening the phone, the time to open may be counted only once.

In an embodiment offering repair estimation, the evaluation system may print or electronically send an evaluation report which may include a repair or insurance (as described hereafter) quote. It may also be configured to email the repair information or otherwise make that information digitally accessible, for example, to a technician associated with the evaluation device, or located nearby.

In an embodiment offering repair estimation, the evaluation system may provide a service to have the phone repaired. In some embodiments proposing repair estimation services, an offer to repair may be presented on screen and upon accepting the offer, the phone may be secured in a vault until picked up for eventual repair. The repairs may be made using on-site staff at the POP, or third party personnel at off-site locations. Choices may be offered to the user that would allow for repairs within specific durations. The costs may be higher for a same-day repair as that for a 3-day repair. Other contextual factors may also be included in the pricing such as the geolocation of the evaluation system as well as its location in reference to the relevant repair entity. In these embodiments, digital notification may be sent to the appropriate staff members or repair company advising that a phone (e.g. or any other POD) is due for repair, and providing advanced information about the device's diagnostics.

In an embodiment offering repair estimation, the evaluation system may provide status of all relevant repairs in order to optimize the device. Offering the user choices of the repairs they may want to make, and showing the different pricing as the user modifies their selection.

In an embodiment offering repair estimation, once the POD owner has made their selection of intended repairs, the POD owner can be given a choice of possible local-area repair location at which to possibly bring in their device to get repaired. This can also be sent to the user using one of the many communication methods such as email, text, etc.

The evaluation system can, after having offered the repair possibilities, also offer the user the ability to get the repair cost financed. The POD owner can be given choices of term and frequency of payments they wish to make (bi-weekly, monthly, etc.). Furthermore, the user can also be prompted to see if they wish to now insure the device (post repair). Special pricing can be given to those that combine the two (repair and insurance).

Although in FIG. 4, operation sequences are described in relation to a service activity of obtaining a repair quote, the same or similar sequence of operations or certain subsequences within that sequence of operations may be used for other service activities. For example, the service activity of warranty or insurance on a POD may have a sequence of operations very similar to the sequence described in relation to this figure.

Moreover, for ease of description, the sequence 400 is described in relation to an evaluation device such as the evaluation device shown in FIG. 2A. However, the same sequence or similar sequences may be performed in relation to other types of evaluation devices, such as, but not limited to FIGS. 2B-2G and 3A-3D.

The illustrated sequence 400 is shown between the POD owner 402, evaluation device 404, evaluation device staff 406, central servers 408, remote operator 410, and third party servers 412. In some embodiments, the POD owner 402, evaluation device 404, evaluation device staff 406, central servers 408, remote operators 410 and third party servers 412 may be similar to POD owner 120, evaluation device 110, evaluation device staff 122, central servers 104, remote operators 140 and third party servers 107, respectively.

The operations sequence shown in FIG. 4 may be initiated when a POD owner comes within proximity of an evaluation device, such as evaluation device 110 in FIG. 1, and the evaluation device, either automatically or upon being provided some input by the POD owner, initiates operations by some activity, such as, for example, an operation 413 displaying a menu screen of one or more services which may be invoked by the user. In an example embodiment, the displayed menu may include options such as, for example, "Trade in Device", "Repair Services", "Warranty/Insurance Services", "Evaluation Report", and the like. It will be understood that other services may be facilitated by the evaluation device according to some embodiments, and thus the displayed menu may also include such other services.

At operation 414, the POD owner 402 selects "Repair Services" option from one or more services available on the evaluation device 404. It is understood that if the evaluation device is dedicated to a service, such option is not necessary. The POD owner may make this selection using any suitable manner of selection, for example, by clicking on a graphical user interface element with a mouse, touch command or voice command. The menu may be arranged in any of several ways so that the POD owner can select a desired service at an appropriate granularity. For example, the POD owner may be guided to select "Repair Service" as the desired service, "smartphone" as the type of device to be repaired, and "glass repair" as the type of desired repair, using a hierarchical menu.

At operation 415, the evaluation device 404 transmits a message indicating the requested service to the central server 408. According to an embodiment, the central server 408 to one of the servers in central servers 104 and/or a proxy server that distributes work requests to one or more servers of the central servers 104. The central server may be structured such that all messages are received at a central node, and then directed to separate nodes based on the type of message and/or type of service. The message may be a standard message type structure that identifies the type of requested service within the message. Optionally, if additional information such as, for example, the device type and repair type, has been acquired by the evaluation device, that information too can be included in the message transmitted from the evaluation device to the central server.

At operation 416, the central servers 408 accesses configuration information based upon information obtained from the message received from the evaluation device at operation 415. Upon identifying the service or the type of service being requested by the user, the central server may access a database or separate tables in a database based upon the identified service. The accessed configuration information may identify the user and/or POD information to be collected in accordance with the requested service.

The information to be collected may be organized in tiers in the databases accessible to the central servers 408. For example, a first tier may include all information that is general to more than one service. Such information may include the POD owner's name, address and identifying information, POD identifying information, etc. A second tier may be specific to the requested service. Such information may include the selected repair service information, repair particulars, etc. By organizing and/or structuring the data to be acquired in tiers, example embodiments provide the capability to gradually acquire information from a general to specific manner, thus improving the acquisition flow and intuitive feel of the menu driven information acquisition. In some embodiments, the access to the second tier information is dependent on the acquired first tier information. For example, the second tier repair information may be stored in the configuration database separately for each device type, and the applicable table may not be identifiable until the tier one information acquires at least basic device information to determine the type of device. Such information in exemplary embodiments are stored as attributes to an evaluation session, possibly as key/pair values.

Figure 7:
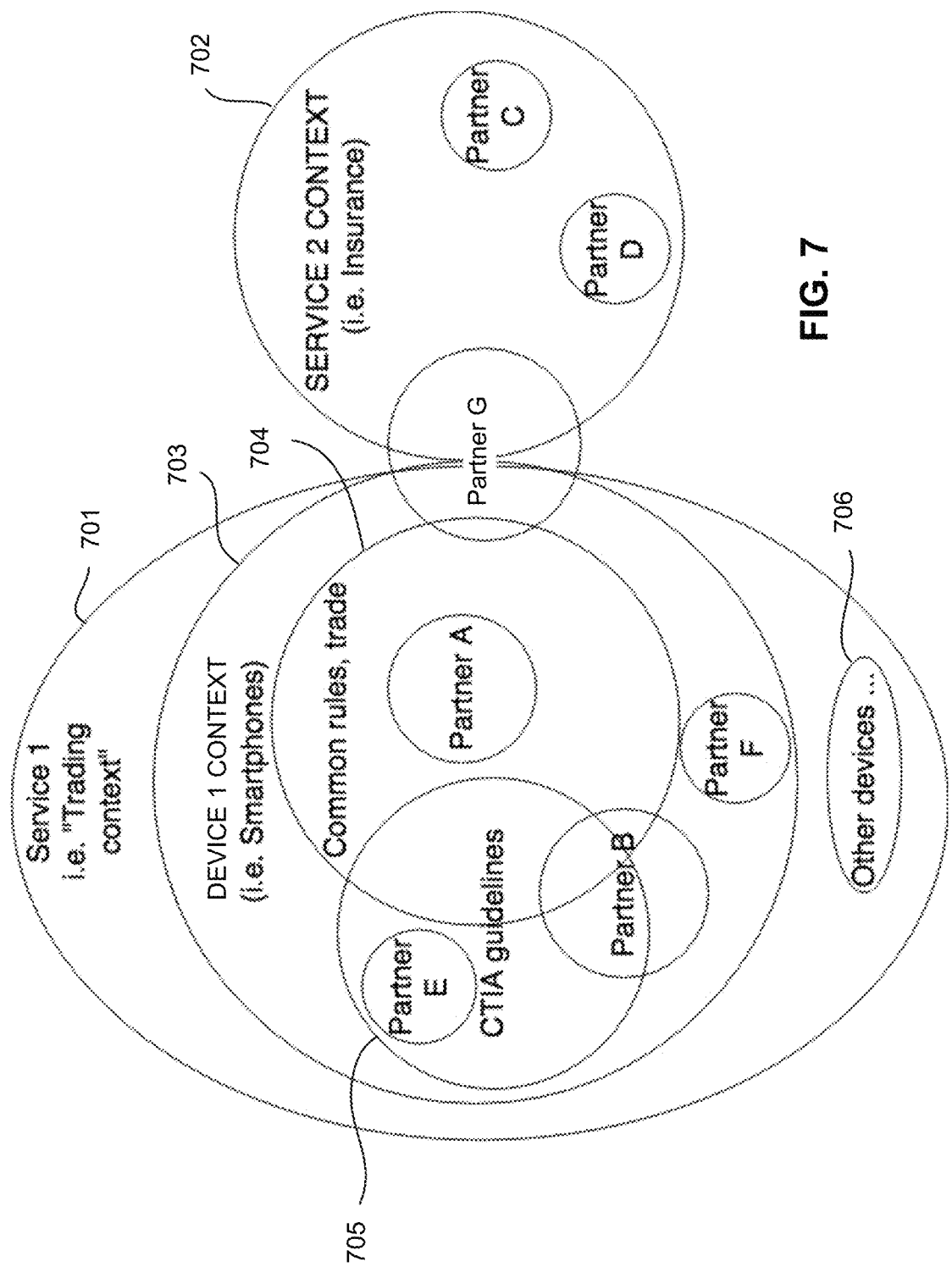
FIG. 7 graphically illustrates the relationship among some example contexts according to some example embodiments.

In some embodiments, at least some of the information to be acquired may be organized and/or stored in a context-specific manner. FIG. 7, for example, describes the use of contexts in certain embodiments.

At operation 418, the central server 408 returns information requirements to the evaluation device 404 to enable obtaining additional information from the POD owner 402. At operation 420, the evaluation device 404 obtains additional information based on requirements received from the central server at operation 418. At operation 422, the evaluation device 404 transmits the acquired information to the central server 408. In some embodiments, this information exchange between the central server 408 and evaluation device 404 may be transmitted in a single transmission. In some other embodiments, this information may be transmitted separately for each tier of information.

At operation 424, if a third party service has not been identified already, the central server 408 accesses its configuration information for the requested service in order to identify a third party provider for the requested service.

At operation 426, the central server 408 may access a service interface for the identified third party service provider and request a description of the information that is required for providing the requested service. The central server may provide the third party service provider some of the information already collected such as, for example, type and model of device, a high level description of the repair requirements, etc.

At operation 428, the requested information that is required for providing the requested service is indicated by the third party service provider 412 to the central server 408.

At operation 430, the central server 408 may generate a sequence of operations to obtain the information requested by the third party service provider 412. The information requested by the third party service provider may change due to various factors such as, but not limited to, device type (e.g. smartphone or other POD, smartphone type, etc.), time requirements (e.g. repair urgency, estimated repair times per type of repair), type of damage (e.g. screen damage, water damage, button damage, etc.), third party service provider capabilities (e.g. screen repair only, selected smartphone models only), third party service provider categorization of defects (e.g. major screen cracks, mirror screen cracks, etc.), etc. For example, a first service provider may offer repairs to a subset of make/models, for example expert in repairing Apple™ branded phones. As another example, a second service provider may insure phones not older than 24 months from manufacturing date.

The generated sequence of operations may be a sequence of instructions for any of capturing images of the POD according to certain specifications (e.g. specific angles of view, specific lighting conditions, specific backlight conditions, specific magnification levels, specific focal point adjustments, etc.), capturing video of the POD (e.g. capture video while particular application sequence is being run on the POD displaying to the POD screen, etc.), capturing audio samples (e.g. capture audio while particular application sequence is being run on the POD outputting audio from the POD speakers, capture play back of audio output from the evaluation device and recorded by the POD, etc.), determine certain characteristics using image analysis and/or OCR (e.g. use OCR to determine model and serial number information of the POD, use image analysis detect physical device features such as buttons etc. and/or defects such as cracks/scratches/missing buttons etc.), etc. Some instructions in the sequence may provide for a remote operator to view the POD through a camera or to control/adjust some of the images being captured by moving one or more of the cameras and/or adjusting camera or lighting conditions. In some embodiments the remote operator having real-time access to the evaluation conducted by the evaluation device is via an internal service interface 106, and in some other embodiments the remote operator may be via a third party service interface 107. In the event of a remote operator via a third party service interface, the third party service interface, central server and/or evaluation device may implement security and authentication measures to restrict access by the remote operator to a particular POD and particular controls for that POD. Another sequence of instruction may create a visual challenge-response, to authenticate that the device being inspected is the device associated with the other evaluation information that have been communicated or that will be communicated by the diagnostic application. Such visual challenge-response may be necessary to avoid fraud where, for example, a simple QR identification is not sufficient because it could be easily reproduced (e.g. by taking a screen shot) and transmitted to another device, possibly with internal malfunctions or other problems. By using a visual-response challenge when the POD is within the inspection area, the evaluation system ensures the authenticity of the device as well as the integrity of the corresponding retrieved attributes.

The sequence of instructions may be generated based on the type of repair requested and/or defects identified, and also based on the configuration of the evaluation device (e.g. number and controllability of cameras, features of the evaluation chamber, lighting capabilities, etc.). Moreover, the sequence of instructions may be generated in a manner that is context-specific to the service and the third party service provider. For example, the generated rules may be derived from preconfigured rule templates stored for each context or group of contexts. As noted above, contexts are described further in relation to FIG. 7 etc. below. The evaluation system may behave differently depending on the context of the service selected or device being inspected. For example, an insurance inspection service may be particularly interested in "wear and tear" information, while a repair service may ignore or not use this information.

At operation 432, in accordance with the generated sequence of operations, the central server controls the evaluation device. This control may either be commanded on an instruction-by-instruction basis from the central server, or, in some embodiments, the sequence of instructions can be transmitted to the evaluation device which then locally commands the progressing through the sequence.

At operation 434, the evaluation device 404 performs the evaluation of the POD in accordance with the instruction sequence and/or commands received at operation 430 from the central server and/or a remote operator.

At operations 436, the user-evaluation device interactions take place as needed for obtaining the information. The interactions may enable the user to enter information regarding the POD owner, and the POD. The interactions may also enable the evaluation device to obtain POD owner's confirmation regarding automatically detected scratches/cracks and physical or functional defects of the POD. For example, during the execution of the sequence of instructions to conduct the evaluation, the evaluation system may seek confirmation from the POD owner 402 or the evaluation device operator 406 to confirm certain ones of its detections. For example, based on machine learning etc., the evaluation system may have configured confidence thresholds for automatically categorizing certain detected features as defects, and it may seek confirmation from various datapoints, such as different views from the mirrored views of the POD, or using dynamic lighting sources to take additional pictures, or by demanding additional information to the POD owner or the evaluation device operator for detections that are at or near that confidence threshold before automatically categorizing such detections.

At operation 438, the evaluation device 404 transmits the obtained information to the central server 408. This may constitute the repair request accompanied by information required for the performance of the repair.

At operation 440, the central server 408 processes the obtained information. At operation 442, the central server transmits information based on the obtained information to the third party server 412. In some embodiments, the formats of the data and interpretations of certain data items may be different between the evaluation system as represented in the central server 408 and the selected third party service provider. Thus, in such embodiments, the central server may translate between the different formats and/or different interpretations before transmitting the information received from the evaluation device to the third party service provider.

At operation 444, the third party service provider 412 processes the incoming request to determine a quote. The third party may use the received information in any manner in generating the quote. Several third party services may be solicited to receive a multiplicity of quotations. In some embodiments, the service interface may specify minimum information requirements and optimal information requirements for the exchange in each direction between the third party service provider and the central server.

At operation 446, the third party server transmits the third party service provider's generated quote for the requested repair.

At operation 448, the central server processes the quote and at operation 450 transmits a modified quote for the evaluation device. The processing by the central server may include, for example, optimizing the quote. For example, based on machine learning and/or other context-specific optimization techniques, the central server (sometimes in coordination with a remote operator accessing the central server via an internal service interface or a third party service interface) may adjust the quote by suggesting elimination and/or combination of some repairs so that the labor related charges can be lower. The processing may also include adjusting the price of the repair to include a facilitation fee before presentation to the POD owner. The evaluation devices provide value to consumers and third party services by facilitating them access to each other and standardizing the information communicated, and storing such information for later retrieval or analysis. In some embodiments, the central server may automatically conduct multiple exchanges with the third party service provider using the corresponding service interface.

At operation 452, the user interacts with the evaluation device to accept the quote. The acceptance of the quote may include user specifically accepting certain portions of the quote and/or rejecting some portions. Such acceptance and/or rejections can be performed, for example, via check boxes or the like displayed on a touchscreen display of the evaluation device. In some embodiments, the acceptance of the quote may require a signature, which the POD owner may provide using a touchscreen or a touchpad of the evaluation device.

At operation 454, the evaluation device processes the accepted quote, optionally collects the POD, and at operation 455 informs the central server regarding the acceptance and any adjustments made by the POD owner during acceptance and optionally information regarding the collection of the POD. The central server may optionally communicate any relevant information to the third party repair service.

Operation 454 may also include collecting the POD at the evaluation device. IN some embodiments, the POD may be attached with a label associating the POD with the information regarding it stored in the evaluation system. The label may be generated by the evaluation device based on collected information and may be either automatically attached or manually attached by the POD owner or evaluation device operator. The POD is then deposited in a bin or vault of the kiosk (as noted above in relation to FIGS. 2 and 3, the vault configurations and the manner of securing collected PODs may be different for the various types of kiosks used in embodiments).

At operation 456 the kiosk or the central server may notify the kiosk operator regarding the collected POD. The kiosk may also notify the central server, so that the central server may update its information regarding the PODs collected throughout its network of kiosks. For example, FIG. 10 illustrates a view displaying information regarding collected PODs at respective kiosks in the network of kiosks of the evaluation system.

At operation 458, the kiosk operator 406 (or other authorized collector) may securely access the vault of the kiosk and send the POD for repair. In some embodiments, information about the POD collected during the evaluation, information regarding the POD owner etc., may be included with the POD sent for repair. In some embodiments, a transaction report (also referred to as diagnostic report), such as, for example, the report shown in FIG. 9 may be included with the POD (or electronically transmitted) to the repair entity.

Although described in relation to a repair service, the above sequence of operations with some modifications also applies to various other services that can be provided using kiosks for various PODs. Device warranty, extended warranty and insurance are some example services that can utilize a sequence of operations that is similar to that of FIG. 9. Device warranty and extended warranties on new devices are well known, but it is sometime difficult for manufacturers to control which devices are truly under warranty and which devices are not. Warranties on repairs pose additional challenges, as the repairs may not bring back the POD to its new conditions, and the warranty will certainly be limited, both in features and with a time limit. Insuring a POD also poses challenges, for instance, one may realize that it would be better to insure a device against damages or theft. Some example embodiments provide new technological techniques to enhance warranty management, exclude defects made prior to the purchase of the insurance, assess risks and to evaluate what price should be charged, and the like, to enable the use of kiosks and associated techniques for insurance/warranty services. Such services are described in more detail in relation to FIGS. 11-12 below.

Figure 5:
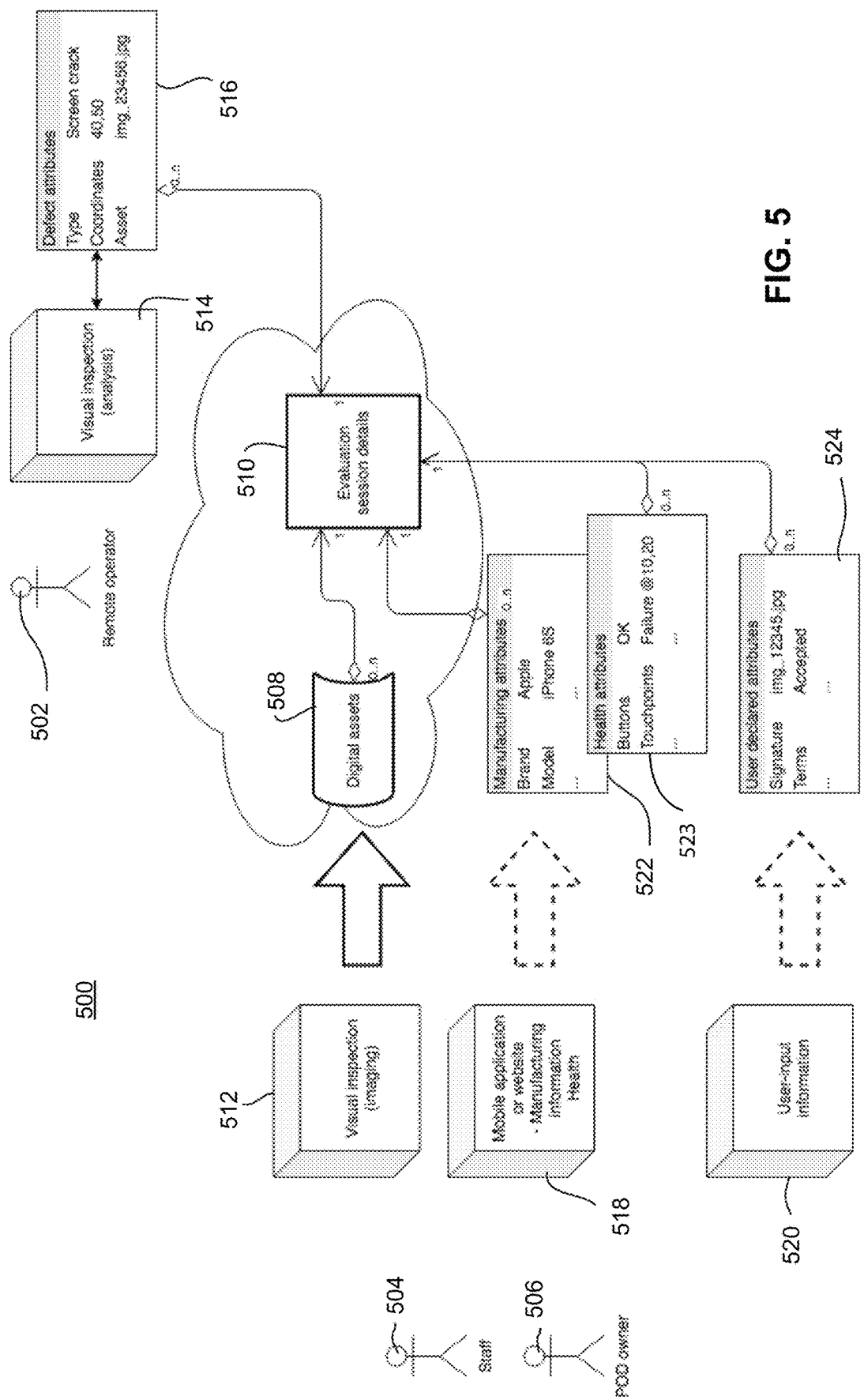
FIG. 5 illustrates some of the data organization associated with an evaluation activity, according to some embodiments.

FIG. 5 illustrates some of the data structures and data organization associated with an evaluation activity 500, according to some embodiments. This figure illustrates that in some embodiments, one or more of a remote operator 502, kiosk staff 504, and/or POD owner 506 may play roles in an evaluation/diagnosis of a POD. It should be noted that in some embodiments, one or more of remote operator 502, kiosk staff 504, and/or POD owner 506, or at least some functions thereof, may be performed by a computer through programmatic rules or artificial intelligence agents (IA or intelligent agent).

The evaluation data of a POD may be organized by having a particular evaluation session details data structure 510 for each evaluation of a POD. The data structure 510 collects all the information input to, and acquired from, an evaluation of the POD. Multiple evaluation session detail data structures pertaining to the same POD may be linked to each other, so that multiple evaluations of the same POD can be accessed efficiently.

Some of the information associated with the evaluation session details 510 are digital assets 508. Digital assets 508 may be a data structure that collects images of the POD and other multimedia evaluations of the POD. The other multimedia evaluations can include video samples, audio samples, etc. The digital assets may be acquired by a kiosk during evaluation of the POD. In some embodiments, the digital assets 508 may also include images and the like that are captured by the any of the entities 502-506.

The evaluation session details 510 may also include various attributes that identify the POD, provide descriptive information about the POD, or that provide diagnostic information about the POD. Manufacturing attributes 522 provide information such as brand of the POD, model, year of manufacture, etc. Health attributes 523 may be used to catalog the working state of each input/output device of the POD. User declared attributes 524 can be used to catalog information that directly relates to the POD owner, such as, for example, the user's signature, whether the user has accepted the terms, etc. Defect attributes 516 may catalog various identified defects, such as, for example, a crack in the screen, For each identified defect, the attribute may provide sub attributes: for example, the type (e.g., "screen crack"), coordinates (e.g. "40,50") and a related digital asset (e.g. link to an image in digital assets 508). Such embedded attributes are easy to describe using object oriented modeling, such as nested JSON objects (objects within objects). In some embodiments, for items that include a defect, there may be overlap between health attributes and detect attributes. For example, the health attributes data structure may indicate that the POD's touchscreen has a fault, and the defect attributes will contain more detailed information about the touchscreen fault.

The digital assets 508 may be at least in part acquired during the operation of imaging 512 in the kiosk of an evaluation system (e.g., kiosk 110 in evaluation system 100 shown in FIG. 1).

Inspection and analysis operations 514 by the remote operator 502 can provide information for defect attributes 516. Defect attributes may also be added to the evaluation session details by the evaluation in the evaluation device.

Operations 518 performed by a diagnostic application executing on the POD, on the central servers (e.g. central servers 104) and/or the evaluation device (e.g. kiosk 110) may provide manufacturing attributes 522 and health attributes 523.

User operations 520 (e.g. user-provided inputs) may be providing user declared attributes 524 (e.g. POD owner signature, acceptance indications, etc.).

Figure 6:
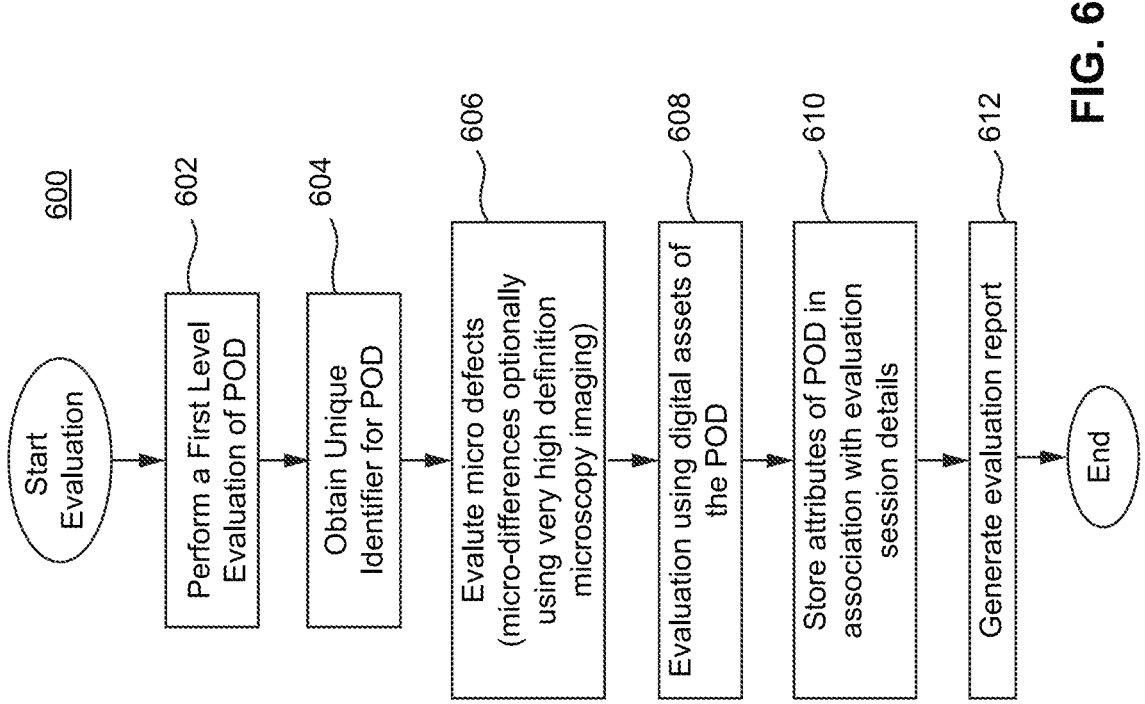
FIG. 6 illustrates a flowchart for a process of enhanced evaluation, according to some example embodiments.

FIG. 6 illustrates a flowchart for a process 600 of enhanced evaluation, according to some example embodiments. Process 600 may be performed during one or more of the operations 430-436 performing the evaluation of the POD. Process 600 performs the entirety or part of the evaluation of the POD in order to acquire the device information required for the repair quote.

At operation 602, a first level evaluation of the POD can be performed. The first level evaluation may include capturing one or more images of the POD using one or more cameras integrated with the evaluation device. It may also include capturing any of one or more video sequences, audio samples, etc. Some of the captured information, such as, for example, images, video samples, audio samples, etc. can be stored as digital assets associated with the evaluation session details. Other information that the first level evaluation can determine from user input and imaging etc., such as, for example, device type, model, etc., can be stored as attributes associated with the same evaluation session detail.

In some embodiments, the first level evaluation may include the evaluations performed as described in U.S. patent application Ser. No. 15/598,004 or U.S. patent application Ser. No. 15/153,137 (both of which are already incorporated by reference) with respect to evaluations performed using evaluation devices such as that shown in FIG. 2A, and/or in PCT Application No. PCT/IB2018/055218 or PCT Application No. PCT/IB2018/055219 (both of which are already incorporated by reference) with respect to evaluations performed using evaluation devices such as that shown in FIG. 2C-2G, In other embodiments, the first level evaluation may include performing the various evaluations in accordance with a configured set of rules and/or commands that are customized for each evaluation based on the type and characteristics of the POD. As also noted elsewhere in this disclosure and described in more detail with respect to FIGS. 7-8, the set of rules for controlling the evaluation may be configured and/or selected in a context-specific manner.

In some instances, in addition to information derived from the first level evaluation at operation 602, it may be important to identify the POD as a uniquely identifiable smartphone (or other POD) with a high level or the highest possible level of certainty. One characteristics that assures such unique identification in a smartphone or like device is the unique identifier assigned to the device by the manufacturer.

In some embodiments, the unique identifier is an IMEI identifier is as it can be used by the evaluation system to query a database, local or remote through a service interface, for example to check for blacklisted or problematic IMEI. In many smartphones, the programmatic extraction of the IMEI has been made difficult, costly or impossible unless having access to the manufacturer's tools such as manufacturer's encryption key or the like.

In some embodiments, the unique identifier, such as IMEI, is acquired with the cooperation of the POD owner at operation 604. In an embodiment, a unique identifier of the POD to be evaluated is retrieved from the POD by first requiring a user (e.g. by displaying a message on the display of the POD and/or evaluation device) to execute a command directly on the POD. For example, the evaluation device interface may indicate to the POD owner the following instruction "Dial *#06 #" by displaying it on the display of the evaluation device, and then requiring a POD owner to take a screenshot of the POD displaying the IMEI, or by instructing the POD owner to place the POD display so that it can be seen by one of the evaluation device's cameras. Dialing the character sequence "*#06 #" causes many PODs to display their unique IMEI on their screen, thereby enabling a screen capture or the evaluation device camera to capture the IMEI reliably. Another example of instructions is to guide the user to the "Settings" page of the POD device where unique numbers, including IMEI, serial and Mac Address may be retrieved. A screenshot of that information may be acquired and then shared with the evaluation system for example by giving access to an application of the evaluation system to the pictures of the POD (at least partially), or digitally transferred by other means to the evaluation system, such as emailing, Bluetooth transfer, and/or uploading. In some embodiments, additional verification can be performed on the screenshot, such as verifying that the timestamp is within the determined timeframe, the image width and height corresponds to the pixel configuration of the POD display, validate that the data of the Exif is conform, and other similar verifications.

In embodiment in which the unique identifier is retrieved from a screenshot, the unique identifier may be associated with other data in order to avoid possible fraud, for example, such as a user transferring another POD's screenshot to a device's picture database.

In such embodiments where the unique identifier is taken from a screenshot or a visual image of the POD's display, the unique identifier may be optically recognized using for example OCR (programmatic or machine learned) or similar technologies. The recognition may be executed on any processor of the evaluation system, or on the processor of the POD via the evaluation application. Once recognized, the unique identifier can be stored as an attribute.

Alternatively, an embodiment may permit a remote operator to enter the identification number manually, using one of the control interface, which can be for example an intranet web-page.

In some embodiments, in addition to the first level evaluation, the evaluation of the POD may include evaluation of micro-defects and/or micro-differences at an operation 606.

While clearly visible defects (in contrast to micro-defects) may be used to distinguish between PODs having a certain level of wear and tear, newer devices may not present enough obvious defects to be used for properly distinguishing models. Micro-defects and micro-differences may be useful for creating another unique way to identify the device. For example, the texture of metal, such as brushed aluminum, while it may not be visible to the human eye, is significantly different when observed at a high definition optical zoom camera or microscope which may be included among the cameras of an evaluation device in some embodiments. While most cameras today try to mimic the visible spectrum of the human eye, optical zoom may provide additional details that are not seen, or hard to see with a human eye. It is likely to predict that mainstream cameras will soon have microscopic capabilities, and as such, they may become usable to observe very high definition imaging. It may also be observed by using very high definition imaging that physical measurements of distance between two elements observed may slightly vary, while not visible or obvious to the human eye. By measuring the distance between elements, it is also possible to derive uniqueness of a device, for example, by applying methods similar to face recognition methods.

These observations may result in the detection of micro-defects or micro-differences observations that may be stored as attributes. In an embodiment, unstructured or semi-structured data format, for example JSON, may be more adequate to associate and store defect attributes or micro-differences attributes of a POD.

In some embodiments, micro-defects or micro-differences may not influence grading of the POD, as they are very common or do not influence market pricing. However, while micro defects are usually not used to influence grading of the POD, they sometime may be useful to detect failures that are likely to happen, for example a glass that is likely to fail soon due to the existence of a small defect, and should be identified as such. They may also be relevant for wear and tear information that may be useful for some services.

A fundamental premise behind uniqueness or quasi-uniqueness recognition through very high definition imaging is that no two devices manufactured will be exactly the same, especially if non-human visible information is taken into account. Leveraging on this, in some embodiments, a unique way to identify a device may be provided by physical characteristic recognition techniques that may be based on the high-definition imaging of the POD. Physical characteristic recognition of the POD may use observable and measurable micro-defects or micro-differences. By using imaging based identification, devices that may be physically limited and/or partially broken, can also be identified. The techniques of quasi-unique characteristics almost certainly may identify a device from visual observations, measurements, computation, etc. By applying algorithms for instance similar to face recognition algorithms, the evaluation system is capable to uniquely or quasi-uniquely recognize two digital assets representing the same POD.

Similar in some aspects to facial recognition techniques, which for example work by comparing facial features, an embodiment may use distances between features, absolute or relative to each other, in order to determine unique traits of the device. As an example, uniqueness attributes could characterize a device as follow:

```
{"uniqueness": {
    "micro-defect": {
        "size": "0.05mm",
        "location": "203,808",
    }
    "left_screw_rotation": "22.5deg",
    "right_screw_rotation": "33.5deg"
    }
}.
```

In an embodiment, a recognizer function has the responsibility of determining the likeliness of the match between the POD. In an embodiment, using physical recognition techniques, in order to avoid false negatives, the recognizer function may be made capable of accepting certain tolerance that may be due to normal alterations or tolerances of the imaging, or measurement techniques.

At operation 608, the digital assets acquired by the first level evaluation and/or subsequent operations can be subjected to visual processing and analysis by the operators. An embodiment includes a technique for advanced defect detection by permitting identification, using a computer interface such as a software and/or a web interface, allowing one or more operators (e.g. remote operator or local operator) with access to digital assets of evaluations to visually inspect and identify, by analyzing one or more digital visual assets of the POD previously rendered available by the remote evaluation system. In an embodiment, the digital visual asset(s) (e.g. images, video and/or audio captured during an evaluation) of the POD would be presented to the remote operator during the evaluation session, on a specialized software or through an intranet or extranet website. For example, through the interface, the remote operator may be enabled to:

select a defect type, for example missing button, broken item, crack, dent, scratch, etc.; and/or identify where on a digital asset the defect can be seen, by using at least one coordinate (X, Y and possibly Z position), or possibly by selecting multi points in order to form one of a point, a line, a multi-point line, a rectangle or another polygon so that the zone containing the defect is recorded as an attribute to the POD.

The operator may do so for every defect identified (unless there are simply too many defects) or some of the identified defects, and each defect would be stored in a way to be associable with or stored within the evaluation session detail, and furthermore associable whenever possible with a unique POD, namely for future retrieval and comparison, a timestamp of the evaluation session or evaluated attributes being stored, for future time-based retrieval and comparison.

Defects may be identified within an area of interest referring to a digital asset. The area of interest which may be a polygon, or a rectangle consisting of the outermost coordinates of the identified polygon as selected by the remote operator or as identified by artificial intelligence agents. The area of interest may also directly be selected as a rectangle of an image where the defect is contained.

Areas of interests as identified by an operator may sometimes be useful to train deep learning models, such as convolution neural networks (CNN). For example, since an operator has already identified each area of interest as to whether or not it includes an identified defect, the machine learning can take such information as ground truth and proceed to learn and/or refine its identification capability for various particular types of defects.

In another embodiment, programmatic and/or machine-learning algorithms such as an image comparison or deep learning CNN model may identify (when a high certainty level is present) or have pre-identified defects (when certainty level remains uncertain) on the POD by analyzing the images or other digital assets rendered available by the evaluation system, and the operator can review and modify, if needed, the defects. In such embodiment, the deep learning model would likely be continuously trained by the defects identified manually by the remote operator, and by the corrective actions made by the remote operator on the identified or pre-identified defects.

Another aspect of the present embodiment includes modelling business rules into an abstraction layer referred herein as a "business logic interface" or "BLI". A BLI is one or many set of rules, programmatically defined or machine learned or a combination thereof, that determines at least one of a POD's condition or meta-attribute based on one or more attribute, and possibly one or more context. For clarity, this disclosure refers to a "meta-attribute" as an attribute that is the result of other attributes, possibly in a given context. For example, an attribute for determining if the screen is broken can be part of the evaluation session data, or, using a meta-attribute, could be computed based on the attributes stored in the evaluation session data, and resulting into different classifications based on the context, or service provider being dealt with.

As specified, a technique for storing identified defects is to store them as an attribute associable with a POD, for example, by storing defects as attributes within an evaluation session detail. See, for example, FIG. 5. A defect attribute is simply one kind of attribute that describes a specific defects and can be stored in a variety of ways, as structured or unstructured information, including key/value, in a database, a list, objects, array or other ways capable of associating a unique POD with attributes, including defect attributes or health attributes. Since a defect typically contains many information points, such as type, location, size, etc., nested attributes as easily representable with JSON object may be a preferred technique in some embodiments.

In one aspect, an evaluation point is an evaluation session from a given point in time, using a time or date information associable with the evaluation session, or the moment a defect or another attribute was identified for a unique POD is stored by the system, probably with the transaction or within the detailed POD information's attributes in the evaluation session detail. In a method described herein (e.g., a "history" section in the evaluation sessions may be used to permit to trace and document the evolution of defects and other attributes). While various methods can be used to store historical information about evaluation session, what is important in the embodiment is the ability to access temporal information about the evaluation session or the found defects, so that the state of the POD can be compared between at least two timestamps.

It is understood that storing a defect associable with a unique POD may be made with a variety of methods known to someone skilled in the art and relates to an ability of being associated, joined or connected.

By associating defects as attributes in a granular method, and by having attributes associated to a unique POD, the evaluation system becomes operable to compare POD physical state or health condition between at least two evaluations made at different moments in time. It is also operable to evaluate various POD condition points, or to contextually compare POD grading based on the multiple evaluation points.

In the present embodiment, an evaluation context may be a service offered, a partner for which a POD may be evaluated for trade or for offering additional services, or a bundle of context and sub-contexts. With more granular information about attributes as described herein, it becomes possible to define rules within context.

Defect detection may not always be certain, especially for smaller defects or defects that can be visually misinterpreted, for example a dirty glass may create confusion. In an embodiment, human agents or machine agents may assess the certainty level of a detected defect. When human agents, such as evaluation device assistants, assess the certainty level, they do so based on a qualitative evaluation, mostly based on their experience or training. Some embodiments may provide input for human agents such as evaluation device assistants and remote operators to input or select a certainty or uncertainty level of the detected defects. For example, a sub-attribute that would define a qualitative certainty level could be expressed as follows:

. . . "defect": { . . . "certainty_level": "high" . . . }.

In an embodiment using computer agents, programmatically directed agents or machine trained agents, the certainty or uncertainty level may be based on algorithms or machine trained model. Artificial intelligence methods, for example based on neural networks (probabilistics, or convolutional neural networks) generally uses some probabilistic approach in making decisions or assessment, and, using these probabilistic information from the artificial intelligence computing results, the evaluation system is able to apply these results to determine a certainty level about the defect or observation. Such embodiments will likely report the certainty level in a numerical evaluated value, such as a percentage or decimal level of certainty. For example, a sub-attribute that would define a quantitative certainty level could be:

. . . "defect": { . . . "certainty_level": "0.88763" . . . }.

Alternatively or additionally, embodiments may provide defect alternatives to defects, in an alternative embodiment, defects could be enumerated as "one of", for example, to identify a defect may be a "screen crack" or "dust" or "residual". For embodiments combining certainty levels and defect alternatives, various certainty levels can be applied to the enumerated alternatives. For example, to describe a high level of certainty that a defect is a residual on screen, but could be a defect of type scratch, attributes could be defined as:

---

... "defect" : {... "location" : "(100,100)-(150,120)" ...
"type" : "dust" {"certainty_level" : "88%" ...}
"type" : "crack" {"certainty_level" : "12%" ...}

---

In embodiments, using certainty levels or defect alternatives, it is possible for embodiments to be instantiated, configured or operable to react differently depending on certainty levels of defects or certain defect alternatives. For example, if the defect type may influence on the evaluation of the device, certain embodiments may provide the user with feedback and the option to confirm, suppress, or correct the defect. Such embodiments could determine, based on certainty level or the presence of some alternative defects that the owner or on site assistant can clean the glass and resume or redo the evaluation of the POD. Such embodiment may also present the user with a view on the detected area, for example, using the defects coordinates on the asset, or the zone of interest of the defect and cropping an image equals to, or more or less equal to the area. For example, such embodiment could notify the user that "We have observed a defect on the upper right corner of the screen.

This defect may be dust or residual present on your device. Please choose: 1) I confirm defect is a scratch 2) please let me clean the glass".

Embodiments using defect certainty levels or alternative defects may use the certainty level or alternative defect information as input to affect price computation (for trading services) or risk qualification (for warranty or insurance), for example, by reserving or augmenting a provision for improperly diagnosed POD.

Embodiments using defect certainty levels or alternative defects may use such information to propose a deferred pricing, as previously described. In such embodiment, a device having an uncertain defect may have one or more pricing associated that are dependent of the presence or absence of the uncertain defect. In such embodiment, a first offer payable or made available at the time of purchase may be made, and the evaluation system may complete the payment until the defect certainty has been properly assessed at a processing center. The second payment may be for example issues by electronic means, electronic transfer, PayPal, or voucher or coupon to be used at a participating or designated store.

At operation 610, the attributes can be stored in relation to a session details data structure for the evaluation of this POD. Session detail records and attributes are described in more detail in relation to FIG. 5 and FIG. 8.

At operation 612, an evaluation report is generated. An evaluation report example is shown in FIG. 9, and the generation of the evaluation report with context-specific processing is described in relation to FIG. 8 below. The evaluation report may be pulled through a service interface, which may be, for example a web portal, used by a phone processing facility, by scanning a code associable with the POD. For clarity, in an embodiment, a printed code may accompany the POD picked up by a phone collector, or the batch (lot) of POD picked up, and, upon receiving the POD or the batch of POD, a processing operator is able to access the information about the POD or the batch by using such code associable with the POD or the batch, by means of entering or scanning said code, which causes the generation or retrieval of the evaluation report or reports associated with the POD or the batch. The evaluation reports are generally created or assembled by taking several attributes stored during the evaluation session, such as the phone model, make, the serial information such as the IMEI, the health information, the visual information, such as defects, etc., and possibly including some visual assets as described in FIG. 9. In some embodiments, the evaluation report can include one or more pieces of information obtained by the evaluation device and/or system by querying a third part server using an identifier obtained from the POD. The information obtained from the third party server, using, for example the IMEI of the POD in a query to a corresponding service interface, may be one or more of a blacklist status, a finance lock status. Account lock status, etc.

FIG. 7 illustrates an example data organization according some example embodiments. Specifically, FIG. 7 illustrates the organization of information, including information for acquiring POD information and information acquired from PODs, according to selected contexts.

Some exemplary embodiments include methods and systems for improved evaluation of a POD from a plurality of aspects, herein described as "device attributes" or "attributes". In the example embodiments, improved techniques are described which permits contextual attributes or contextual evaluation of attributes, herein referred to as "condition", which may replace and/or act in lieu of conventional qualitative attributes which are sometimes too limiting in at least some instances, subject to bias and/or difficult to be interpreted in different contexts.

In example embodiments, a "context" refers to one or several business environment, guidelines and/or rules for model types, situations or partners in which an evaluation is performed. For example, "trading devices" is a generic context used when an embodiment is instantiated, configured or operable to render or facilitate "POD device trading" using the evaluation system. Context may be nested or combined. For example, a "warranty validation" may be a first level of context, but could be furthermore refined as a "warranty validation for ABC repair corporation", or "trading smartphones under CTIA grading" (CTIA provides some industry standardization on mobile device grading) or even more specific "for iPhones only". All contexts may influence the behavior of the evaluation system's instance (when specifically built for that service), or operability when the behavior of the evaluation system is adaptable due to the context it is being operated under. Context may be built differently, or operated differently, depending on service type (one or more of, for example, trading, warranty, insurance, repair, estimation), a time, aging of devices, business partners or agreements, industry standard, etc. Context permit the elaboration of more complex business rules.

In an embodiment using contexts, the evaluation system is capable of being instantiated, configured to, or operable to make evaluation decisions based on the context it is being instantiated in, configured to, or operable to, in order to generate one or a plurality of evaluations. By instantiated, it is meant that an evaluation system according to some embodiments may be built to one or more specific contexts. By configured to, it is meant that an evaluation system according to some embodiments is capable of being configured to be used in a certain context. By operable to, it is meant that the evaluation system according to some example embodiments is capable of being operated in a plurality of contexts, and is capable of detecting, or be instructed to make evaluations within a specific context from the plurality of contexts.

In an embodiment using contexts, an attribute may be replaced with a condition, so that attributes may be considered to define or describe factual, quantitative information, and conditions may be considered to define or describe observations or qualitative information about a POD. For example, while it was described above that a "broken screen" is an attribute of a POD, the more factual definition could be specified as:

"the device screen has a 10 mm length crack . . .
starting at 20 mm from the left side of the glass . . .
and 30 mm from the top, . . .
going downward at an angle of 120 degrees".

In the above example, "broken screen" may be an attribute. However, it is more precisely an attribute for partners that define a broken screen having a crack of at least, for example, 9 mm. The example embodiments therefore may use the term "conditions" for defining "attributes that are programmatic or machine learning results in a given context", and may define as "attributes" the 10 mm crack, and "sub-attributes" the position (and/or its area of interest), its length, and its direction, or preferably, a list of coordinates. For example, the following JSON may describe an irregular crack on the screen, where a region of interest may have been selected by an agent, and within the region of interest 3 (x,y) points may further describe the irregular crack:

```
{"defect":
    { "type" : "crack",
        "ROI" :{ "xy": [18,28], "xy": [28,50] },
        "points" : {
            "xy" : [20,30],
            "xy" : [25,38],
            "xy" : [26,45]
        }
    }
}
```

Structured and/or unstructured data may be used to define a POD's attributes. While structured data may be useful to facilitate search, unstructured or semi-structured on the other end provide more flexibility on how a POD can be described through attributes. As previously noted and herein further detailed, attributes is a generic term used to determine an element of a POD's physical identity, health or condition. A typical form of attribute includes groups and "name/value" or "key/value" pairing, which are commonly describable in several data formats, such as, for example, XML or JSON format. An embodiment uses JSON format for its simple approach to defining sub-attributes (attributes of attributes) as nested JSON Objects. Example attributes of a POD may include:
- information about its brand, make, model, color;
- information or data about its's uniqueness, including IMEI, MAC, UDID or other unique identifier, or combination or method to uniquely identify a POD (sometimes referred to as "uniqueness data");
- information or data about its health condition, for example "battery health: 80%", "charge cycles: 100", etc.;
- information or data about its physical condition or identified defects, for example, describing a 10 mm crack running at 120 degrees from (20 mm, 30 mm) of a device origin could be described as:

```
{"defect": "missing volume up"} or
{"defect":
    { "type" : "crack"
        "location" : {
            "x1" : 20.0
            "y1" : 30.0
            "x2" : 28.6
            "y2": 35.0
        }
    }
}.
```

Alternative methods, such as using angle and length attributes could be used to describe the above defects.

Some example embodiments enhance the conventional systems for defining, organizing and characterizing PODs and their defects in many ways. Namely, instead of defining, for example, a POD's screen as having a "broken screen" attribute, an embodiment uses more granular defects or lists of defects from which further business logic rules will be able determine through programmatically implemented business rules, machine learning or a combination thereof, a resulting "attribute" corresponding to the "broken screen" condition. By providing attributes that describe facts more than qualitative information, a new type of attribute, a "contextual attribute", may then be extracted with business logic rules, as they evolve over time, or as they may be concurrently defined differently depending on qualification of attributes or groups of such attributes, such as a third party partner's rules, or different services rules or context, as later on described. In order to do so, it is now possible to enhance the conception of attributes by adding information, metadata, lists or groups of other attributes from which contextual or evolving business logic rules will be able to determine the desired POD grading, classification, categorization, but also to determine an evolution or changes in a POD's condition.

More specifically, some of the example embodiments emphasize defect detection by providing means to associate additional information with the detected defect. The additional information may be one or more of:
- physical location information of the attribute, which preferably uses XY or XYZ coordinates defining a point, a line, a multiline or polygon or their 3D equivalents, but could also use generic zoning, areas or other ways to identify the location of the defect identified, an example of such attribute;
- digital asset(s) associated with the attribute, for example, a digital visual asset(s) being an image or video where the defect can be seen;
- timestamp information;
- condition(s) in which the defect was identified or can be seen, such as filters, lighting, brightness, sharpness, edge detection algorithms, or conditions in which the imaging was performed such as intensity of lights, which lights were turned on, etc.

As previously described, an "attribute" refers to information that can be used to describe an electronic device, including its characteristics, condition and health. Attributes can be unstructured (e.g. "The device shows a damaged screen"), structured (e.g. "Screen: Damaged"), or quasi-structured. In some embodiments, attributes are identifiable (e.g., an IMEI number attribute, {"IMEI": "3330000000001" }, or characterizable (e.g., a defect attribute, "defect": "crack" { . . . }}).

While such information for describing characteristics, condition and health can sometime be qualitative in nature, for example, the determination of a "broken screen", a particularity of some of the example embodiments is to substantially remove (e.g. minimize) qualitative attributes by associating quantitative or factual attributes in a more granular manner, and leaving qualitative attributes so that they become the result of programmatic, computed, or machine-learned algorithms based on context which can emerge from business rules, time, aging, partners arrangements, services offered, device type, deals or definitions. For example, the definition of a "good screen" is qualitative and may vary significantly depending on the context. For example, a "dead pixel" on a 50 inch monitor is much less likely to influence any decision than the same dead pixel on a 1 inch watch. What remains factual is the dead pixel and its location on the device.

FIG. 7 graphically illustrates the relationship among some example contexts according to some example embodiments. FIG. 7 shows two contexts: a first service context 701 for trading of PODs, and a second service context 702 for insuring a POD. In some example embodiments, a context corresponds to a service offering. However, embodiments are not limited to having contexts limited to service offerings.

Each context may have one or more sub-contexts, such that each partner (e.g., third party service, respective internal services) has its own context. For example, partners A, B, E and F have sub-contexts defined so that rules and the like for each of them can be defined in an individualized or customized manner within service context 701. Partners C and D have subcontexts within service context 702. Partner G provides both the first and second services, and thus, has subcontexts defined for each of service context 701 and service context 702.

Within the first service context 701, the trading rules and conditions for each type of device may have differences. Therefore, in the example context configuration shown in FIG. 7, a first device context 703 and one or more second device contexts 706 can be defined as subcontexts of the first service context 701. The first device context 703 is defined for smartphones and the one or more second device contexts 706 can be defined for other devices.

Even within a context such as the smartphone trading service context 703, there may be a need for separately defining trading rules and conditions based on various regimes of standards or guidelines. For example, smartphone trading may, in addition to common trading rules, at least in some instances have to consider CTIA guidelines. Thus, a common trade rules context 704 and a CTIA guidelines context 705 are configured as subcontexts of the smartphone trading service context 703. In the example shown, partner A is exclusively providing services related to trading under common trading rules, and partner E is providing services related to trading under CTIA guidelines. Partner B provides trading under both common rules and CTIA guidelines.

Figure 8:
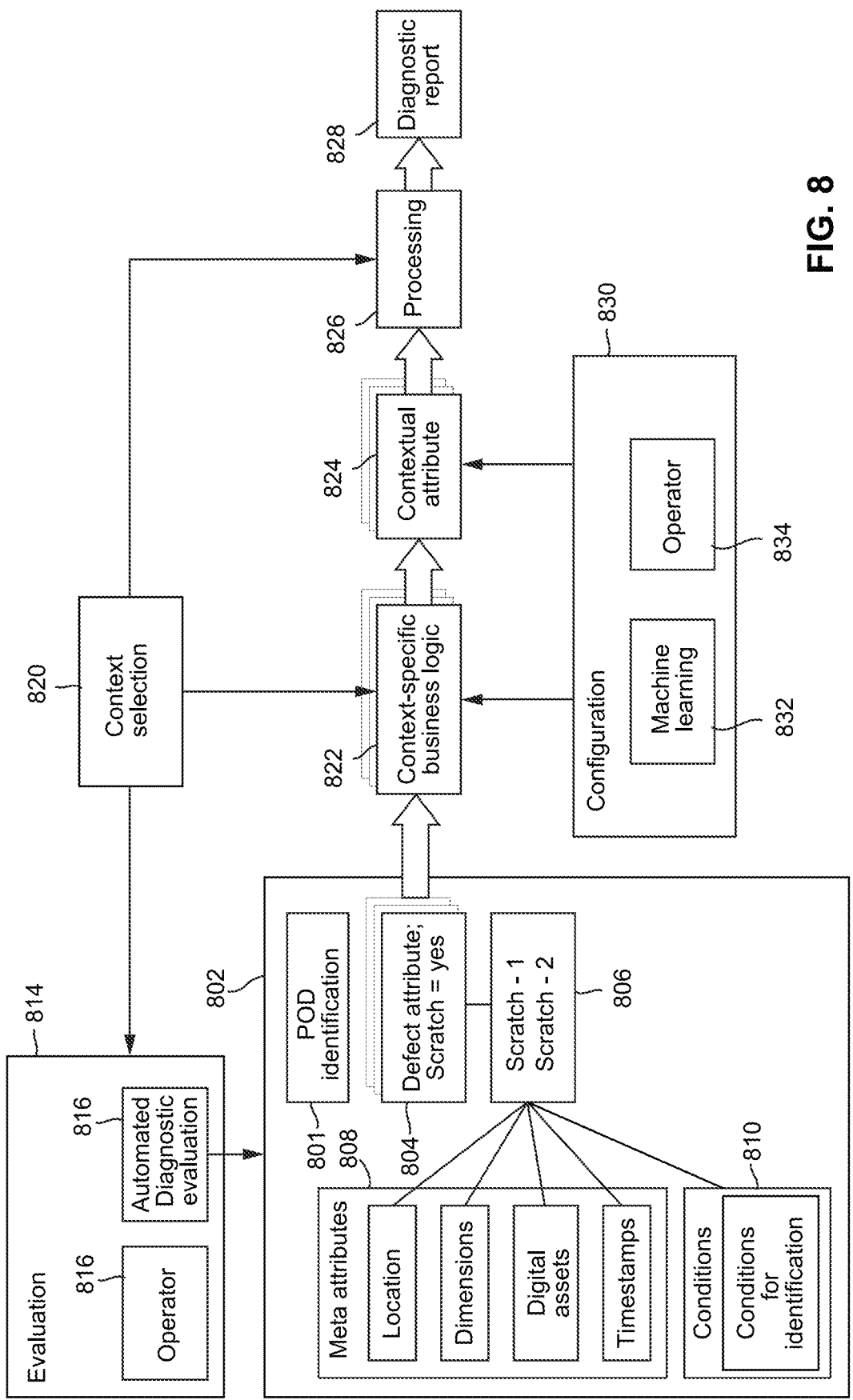
FIG. 8 is a block diagram illustration of contextual evaluation, according to some example embodiments.

FIG. 8 is a block diagram illustration of contextual evaluation, according to some example embodiments. For example, according to certain embodiments, the evaluation of a POD such as that performed in accordance with evaluation process 600 may be configured to perform contextual evaluation of the POD, as shown in FIG. 8.

FIG. 8 illustrates that a context selection operation 820 may affect the evaluation 814 of a POD, the logic 822 for processing the POD attributes, and the processing 826 of such attributes. The context selection may, for example, be caused by a POD owner selecting a particular service from a menu of services offered by an evaluation device. The context selection may include selection several levels of selection such as, for example, selecting a trading context, then selecting a smartphone trading context, and then selecting a particular partner third party service in association with the trading. As described in relation to FIG. 7, the configuration information may include the various contexts in a hierarchical relationship arranged as nested contexts. However, the selection of contexts of various levels in the hierarchy may be performed in any manner.

The evaluation 814 of the POD can be performed by automated evaluation in an evaluation device and may also include operator analysis, as described before. An example enhanced evaluation was described in relation to FIG. 6. According to some embodiments, the automated diagnostic evaluation may be performed in accordance with a set of rules selected in accordance with the context selection 820. The operator evaluation may also be based on rules selected in accordance with the context selection 820.

The evaluation 814 results in information 802 associated with the POD and the evaluation of the POD. The information 802 may include POD identification information 801, attributes 804 and conditions 810. Some attributes 804, may include lists of attributes 806. For example, a defect attribute for a scratch may include a list of two scratches. For each attribute in the list, meta-attributes 808 may be specified. For example, for each scratch attribute in a list of scratches, meta-attributes can be specified for location of scratch, dimension of scratch, image of scratch (digital assets), and timestamp of when scratch was observed.

For some attributes, a condition 810 may be associated. For example, for one or more of the scratches in the list of scratches a condition may be specified for identifying that scratch. Such conditions may, for example, be a particular lighting condition that facilitates detection of that defect.

As noted above, the context selection 820 can also select a set of context-specific business logic 822. The selection may be made from a plurality of such sets of context-specific business logic. The context-specific business logic 822 may be configured based on configuration information 830. The configuration information 830 may be based on machine learning 832 and/or operator input 834.

By subjecting the attributes in the evaluation session details 802 for the POD to context-specific business logic 822, one or more contextual attributes 824 can be formed and/or updated. The contextual attributes 824 and, at least in some embodiments, other attributes of the evaluation session detail can be processed 826 to generate a diagnostic report 828. The processing 826 may also be configured in accordance with the context selection 820.

POD grading may be performed as part of processing. POD grading, for example, in the smartphone industry, has evolved in various manners as each POD collecting entity would define their methods and rules on how to grade phones. This has created confusion, and is likely to continue to do so, despite the efforts of some associations, such as the Cellular Telecommunications Industry Association (CTIA), that proposes a framework for grading devices: that is, classifying devices into categories (A, B, C, D, etc.) based on various conditions.

Some embodiments provide means to be adaptive to context which can be created for industry standards as well as for specific partners, and as well as for specific services, devices type, or other rules.

In an embodiment, context for evaluating PODs may be dictated by internal or industry standards, such as the CTIA 1.0 Wireless Device Grading Scales Criteria and Definitions Version 1.0. In such embodiments, phone attributes may be classified in the same manner as the specified standard, for example, by classifying attributes related to condition groups:

Cosmetic condition grading,
Functional classification,
Data status,
Lock status, and
Kit configuration condition.

In such embodiments where programmatic rules are used to convert industry standard or business specific, the software will analyze defects detected during the evaluation of a device and apply the rules to select which grading best represent the state of the device. Object oriented programming may provide convenient techniques for implementing these embodiments, by using, for example by using classes, methods, inheritance, overriding, overloading, etc. For example, because an object representing a POD may have methods for determining, for example, the following methods could be used for implementation:

- POD.setContext(...) /* set the context for device condition queries */
- POD.isScreenBroken( ) /* determine if the screen is broken in current or specified context*/

```
- POD.isDeviceBroken /* determine if the device is broken in current or specified context*/
- POD.grade( ) /* determine and returns the device grading in current or specified context */,
etc.
```

For example, CTIA 1.0 defines a "Cosmetic Grade A—Like New Condition" as a device having: minimal scratches and blemishes, and external LDI (Liquid damage indicator) not triggered. Additionally, CTIA 1.0 defines "Grade B: Light wear and tear" as: More scratches and blemishes, but no lens cracks on any surface, External LDI not triggered. And, CTIA 1.0 also defines "Scratch and Dots" defects in 3 levels, measured in length and width (for example, a level 1 is x less than or equal to 0.5 mm).

According to the above specification, a pseudo-code implementation using a "downgrading" model, that would limit the maximum grade of a device cosmetic evaluation based on the number of mirror scratches could be:

```
switch (count level 1 scratches )
case <10 :
    max grade = min (max grade, "A")
    reason +="OK less than 10 level 1 (minor) scratches";
case <20:
    max grade = min (max grade, "B")
    reason +="too many level 1 (minor) scratches (%count)";
otherwise:
    max grade = min (max grade, "C")
    reason +="too many level 1 (minor) scratches (%count)".
```

Additionally, pseudo-code rules for adjusting based on LDI detection where the cosmetic condition is maximum grade D if the LDI is triggered:

```
if (external LDI detected)
    max grade = min (max grade, "D")
    reason += "Liquid damage indicator triggered".
```

The above is only a partial example, of course, as in such embodiments for grading devices with a plurality of rules, all conditions dictated by the context must be verified before issuing the final grading of a POD. For example, a "level 2" scratch may limit the maximum grade a device can be given.

In some embodiments, context-dependent evaluation can be made for grading PODs. For example, ABC Trading Company could uses the CTIA standard, but ignores the LDI detection, so, when grading PODs in such a context, the evaluation system uses adaptive rules by first identifying a grading context, or by running the rules on more than one context.

In an embodiment using multiple contexts, the POD could be evaluated against all relevant contexts in order to find the best offer, or the best partner. For example trading devices to different partners, a first partner using CTIA grading, another using CTIA with some exception rules, and a third using custom grading, it is possible for the system to retrieve 3 different grades for the PODs. However, a 4th partner used only in an "insurance" context would not be evaluated because it is not relevant in the current transaction. For example, using a model example presented in FIG. 7:

Partner E evaluates device as "Grade D" (CTIA),
Partner B evaluates device as "Grade B" (CTIA rules with a private rule for LDI exception),
Partner F evaluates device as "Good condition" (Custom rules).

In an embodiment using CTIA grading, the evaluation systems is operable to identify or extract:

the CTIA cosmetics condition grading from the visual inspection assets and attributes;
the CTIA functional classification information from a mobile application, from website browsing information, from visual inspection assets and attributes, or a combination thereof;
the CTIA Data status—(is the customer data wiped) from visual inspection of the POD display (recognizing the reinitialized/factory reset page); and
Lock status—from the mobile application or through a service interface.

With the adaptive device grading methods described herein, a best offer can be chosen by the evaluation system by querying, either using a pricing server or by using a service interface to one or more partner's pricing system to retrieve multiple different prices each based on the optimal grading system for each partner and selecting, accordingly, the best offer.

With the techniques described, it is now possible for example to have a context-dependent decision based on a context-dependent definition of the "broken screen" "meta-attribute", to grade PODs according to a third party internal business rules, to quote an insurance service according to a set of rules, to modify the understanding of a broken screen based on the model type, or its age, or anything similar to that.

As described herein, with granular attributes, condition and context, the example embodiments provide several enhancements for more accurate grading of PODs in particular contexts. For example, in the industry of smartphone trade-ins, a popular POD, phone buyers typically grade phones using AB CD notation systems. However, there is no clear agreement for defining a "grade A" phone, as some may require a mint-like, no defect phone while other buyers may have some tolerances. Because the current embodiment focuses on characterizing defects, it can represent a different grade for the same device by applying the proper gradation rules based on the various possible context. A phone can therefore be graded as an "A" device for one buying corporation and as a "B" device for a different buying corporation.

Different notation system may also emerge from these new techniques. For example, an insurance company may want to use a percentage-based grading method, applying weighting factors to attributes, meta-attributes or conditions. In this embodiment, the grading functions could return a weighted notation giving 50% to the inner-working conditions of the POD, 30% to the touch-screen conditions and 20% for the body condition.

In an embodiment, an evaluation session contains a plurality of attributes related to an evaluation performed by the evaluation system and the evaluation session is stored in a manner that it is accessible for future retrieval based on the information contained, including any attribute contained, which includes uniqueness data or identifiers, device description, health, condition, etc.

In an embodiment, a POD may have been evaluated more than once and therefore the evaluation system is capable to retrieve one or many evaluation sessions related to a unique POD, based on uniqueness data or identifiers.

In an embodiment, using the methods described herein, it is possible for the evaluation systems to support private networks for use by third party companies in the domain. For instance, a large phone repair and processor company may want to use the technology for its own purpose, improving the quality of service offered to its own customers. Using contextual grading, this embodiment would use a specific private context for a group of evaluation devices so that whenever an evaluation is made from any evaluation devices of the private group associated with the third party, specific rules based on the programmed context are used.

FIG. 9A, FIG. 9B, FIG. 9C and FIG. 9D (collectively, FIG. 9) illustrates an example evaluation report that may be generated by a contextual evaluation process, such as that shown in FIG. 8.

The evaluation report (a transaction report and/or customer report) may include transaction identifying information such as, for example, the name and contact information of the entity issuing the report, transaction details such as a unique transaction identifier, the IMEI or other reliable unique identifier for the POD, brand and model information of the POD, time and date of the diagnostic evaluation, other POD information (e.g., storage capabilities, carrier identification, etc.) evaluation device identifying information where the diagnostic evaluation was performed (e.g. kiosk id, location, address, contact phone number, email address of contact, etc.), price/cost information (e.g. for trade in, an offered process, status of acceptance, and signature of POD owner, etc.). A computer recognizable code, such as a bar or QR code may be included in the report, so that subsequent quick access to related information can be facilitated. In some embodiments, the evaluation report may also include images of an authentication document (e.g. driver's license of the POD owner) and/or a image of the POD owner captured at the evaluation device. An example image of the POD owner's authentication document and facial image is shown in FIG. 9B.

The evaluation report may include none, one or more images of the POD. For one or more images, it may be indicated (for example, using an associated checkbox) whether the image shows a defect. Attributes of the evaluation from the session details may also be used to construct visual identifier around the region of interest of the identified defects.

Figure 9A:
Figure 9B:

The defects in an image of the POD may be identified on the image using numbers as shown in FIG. 9B, and a table may be provided with description of each defect.

The evaluation report may include a table listing one or more high level tests of the POD, the techniques used, and the status detected. For example, the top table shown in FIG. 9C provides an overview of the high-level tests. The high-level tests may, at least in some embodiments, include a test to determine whether the POD is in working condition, a test to determine whether liquid damage has occurred, a test for screen condition, a test for the IMEI, a test for body condition. For each test, a table may indicate significant information, and the results.

In the top table shown in FIG. 9C, for the working device test, the high level conclusion that the device powers on and identified and that a particular app is present, and the results is shown. For the results, it shows that the test was passed, but in more detail it shows that 21 of the 22 tests to determine the working condition passed. For the liquid damage test, it is indicated that the determination that the POD passed was made by a store representative and the representative's identification is provided. For the screen condition test, it is indicated that defects were detected, and it is also indicated that the screen condition is "poor" because it has one defect for which the condition is identified as "heavy", and another defect identified as "light". With respect to the IMEI check, the IMEI information is shown in the report, and the results of several tests (e.g. test for presence on blacklist, test for financial issues, test for iCloud lock) are indicated individually. With respect to the test for body condition, it is indicated that the result is "good" but that there is a "missing tray" condition.

A second table shown in FIG. 9C lists the condition of items in several categories. For example, the status of several buttons (e.g. silent switch, volume up, volume down, home button) is individually listed as "passed". Status of several features (e.g. Wifi, Bluetooth, Gyroscope, Accelerometer, Touch screen, and vibration) are listed. The category of camera may include the statuses of the front camera and the back camera. The category of sound may include the statuses of the microphone and speaker.

Figure 9D:
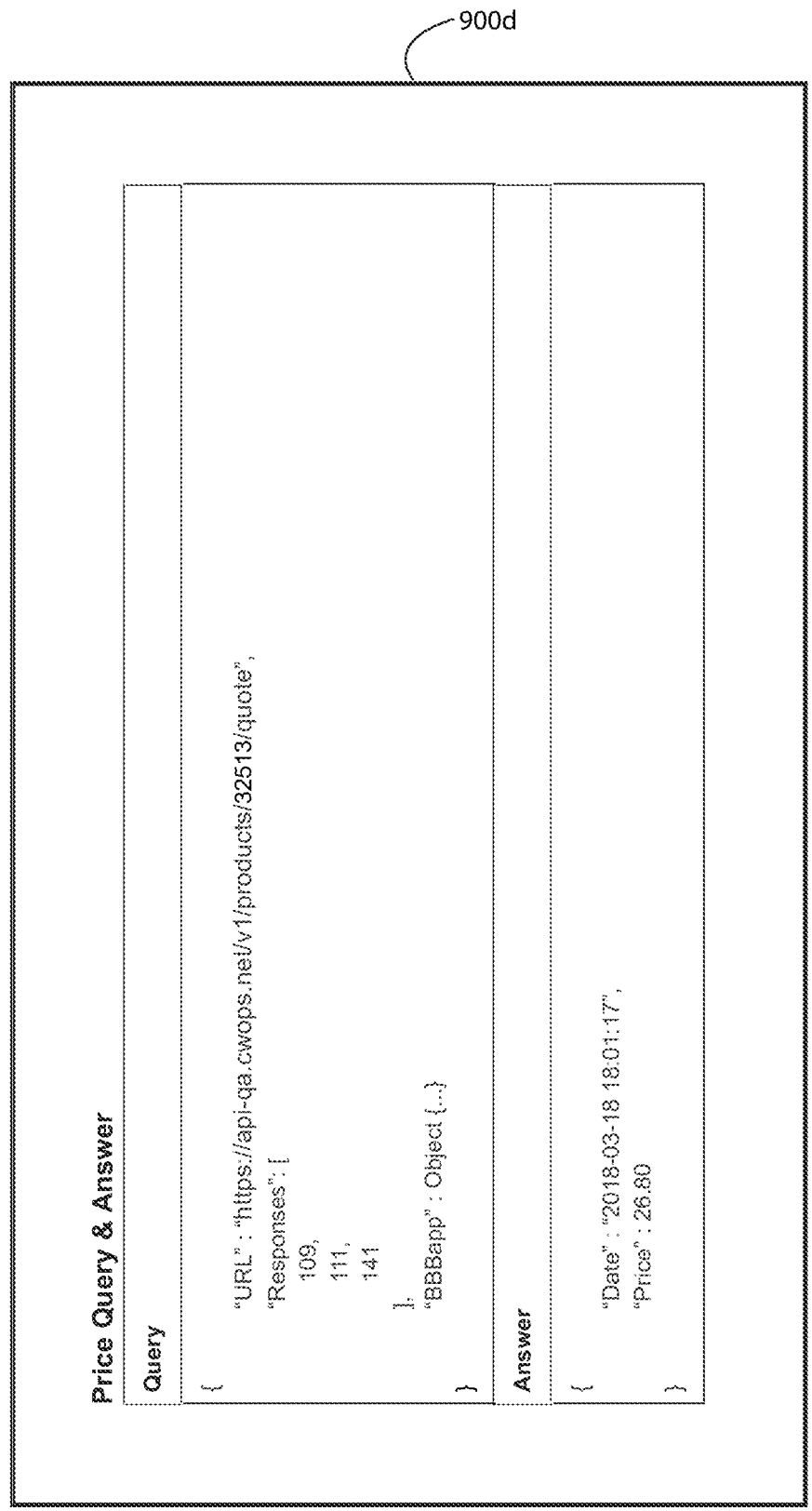

FIG. 9D shows another portion which may be optionally included in the evaluation report. The portion shown in FIG. 9D shows the query transmitted from the evaluation device to the central server to obtain pricing information and the answer to the corresponding question. This enables the person reviewing the report to be fully informed as to what information was provided to obtain the pricing that has been received.

Figure 9E:
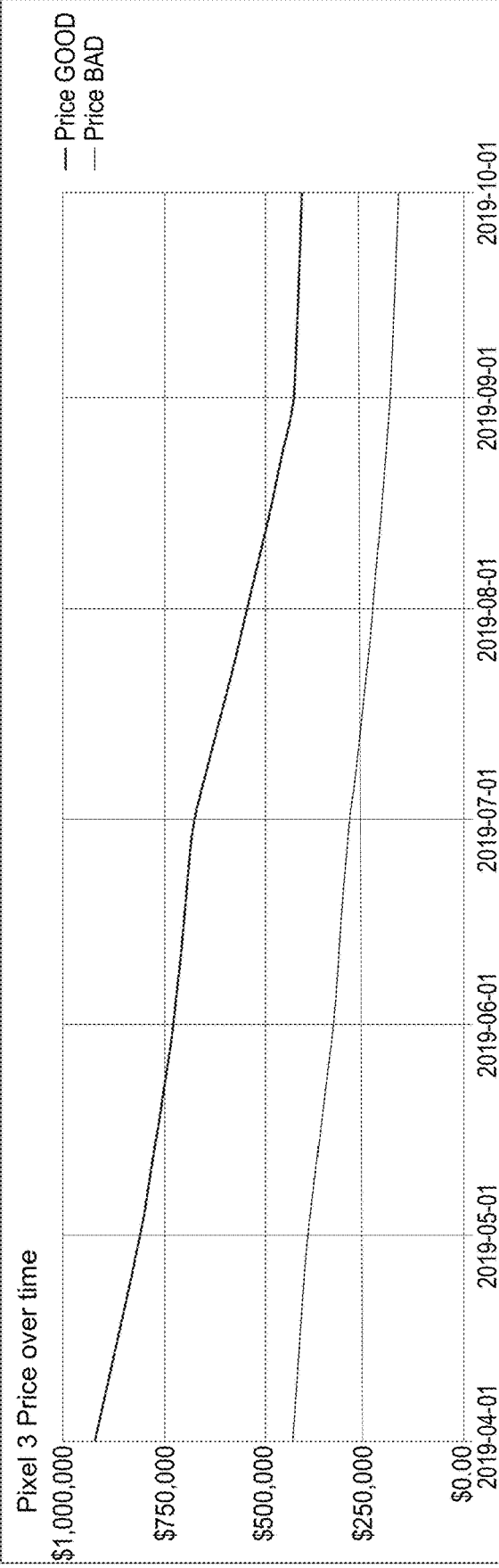

FIG. 9E shows a pricing information illustration that can be optionally included in the transaction report. The source information such as the database(s) accessed, and its version and last update information can be included to indicate how current the information is. Information about the POD such as, for example, the carrier/model information, status (locked/unlocked etc.), selected key characteristics (e.g. memory size, network compatibility), etc. may be included. A summarized condition (e.g. "Good", "Bad", etc.) of the POD may be included. A price range for the POD that accounts for the variation due to condition and/or options may be indicated, along with a final price estimate. Additionally, the variation of the price over time can be illustrated as shown for one or more condition statuses (e.g. the "Good" and "Bad" statuses are illustrated) of the POD. The condition statuses and the period over which the price information is shown may be configurable.

FIG. 9F-9H illustrate an example customer report generated according to an embodiment. The customer report may be primarily intended for the user of a POD to retain a report of the evaluation of the POD, whereas the transaction report may be directed to providing the user with an evaluated status or condition of the POD with more detailed information in a more authenticable manner than the customer report. As seen in the example shown in FIGS. 9F-9H, a customer report can include a summarized score (e.g. see "your score") for the condition of the POD, and illustrated breakdown of the quality of features, general condition, cameras (e.g. shown below "your score" in FIG. 9F) etc. The customer report may also include purchasing options (e g financing options shown in FIG. 9H), protection plan options (e.g. shown in FIG. 9H), and the like that are offered by the evaluation system based on the evaluation of the POD.

An embodiment may provide an evaluation score (e.g. "your score" in the customer report shown in FIG. 9F) that is computed using programmatic or machine-learning algorithms that provide a numerical, alphanumerical or grading score for a device which may be presented to the end user.

Such an evaluation score can, for example, be calculated using any one or more of: deterioration information; weighted physical defect information, for example, a small nick may have weight less than a crack; and/or weighted health information or defect, for example a malfunctioning, lesser used feature, such as the accelerometer, may have weight less than a malfunctioning network interface. The weights may be configured according to rules in a rules database or in context information.

The evaluation score may be complemented by evaluation summary information, such as graded information about physical and internal condition. For example, a device could have a score of 80 and a summary information stating "Good physical condition" and "Good working condition". Combined they can become an evaluation summary.

The evaluation score, information or summary may become useful for "summarizing" an evaluation report or customer report about a device, much like a credit score provides a summary information about a person's credit habits. Such evaluation score, information or summary, may provide, for example the ability for a protection company (insurance, warranty provider, manufacturer, reseller) to offer protection plans that will replace a device deemed "as good or better", and such entity could rely either on detailed evaluation information with detailed defect information, or in a preferred embodiment, on evaluation score, information or summary in order to broaden the quantity of substitute devices available. In other words, from a subset of 100 phones, perhaps only 10 would meet the exact detailed conditions to be offered as substitute, but, if using a broader approach such as an evaluation score, this number may increase to 15, 20 or more.

The evaluation score, information or summary may also become handy for "C2C" evaluation reports.

Figure 10A:
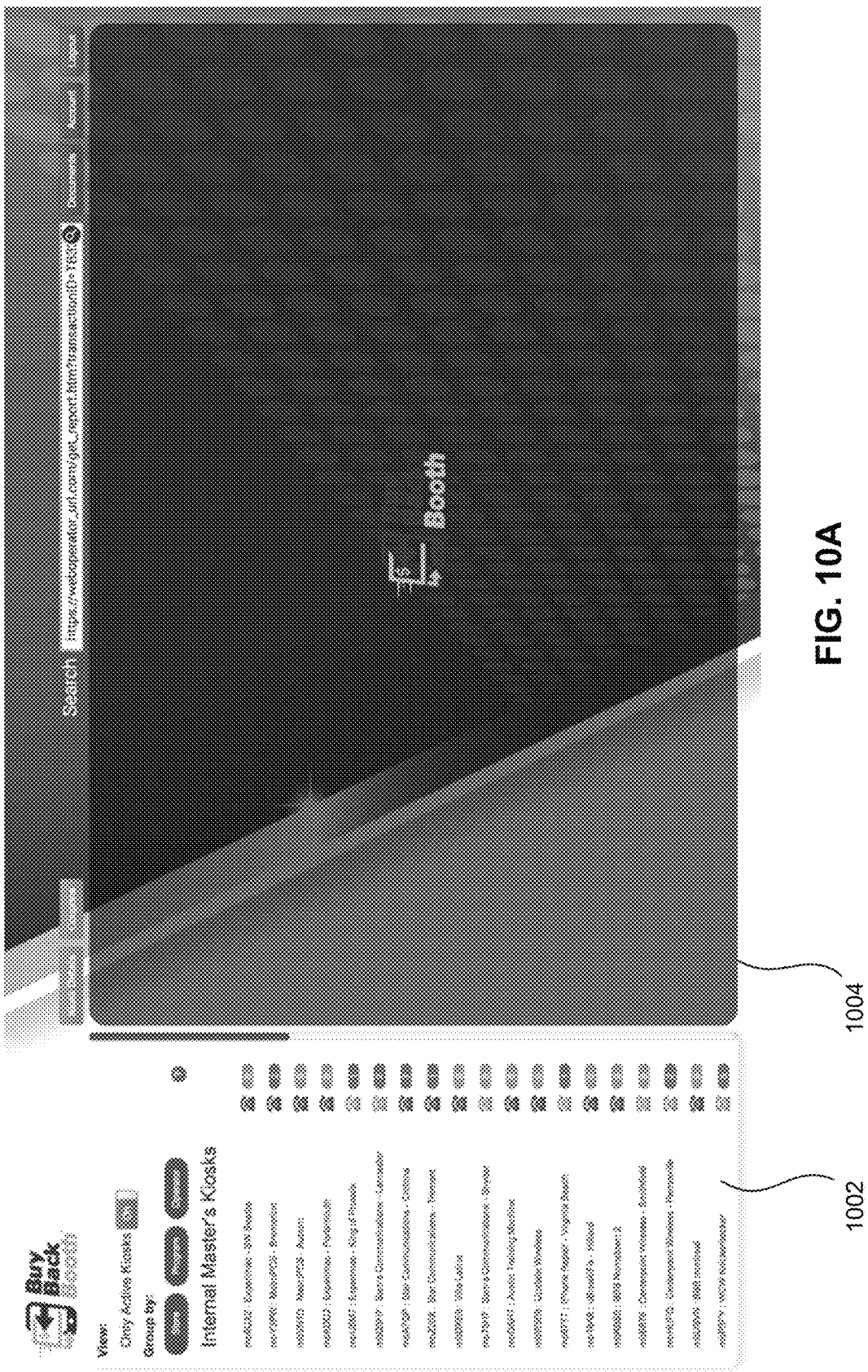
Figure 10B:
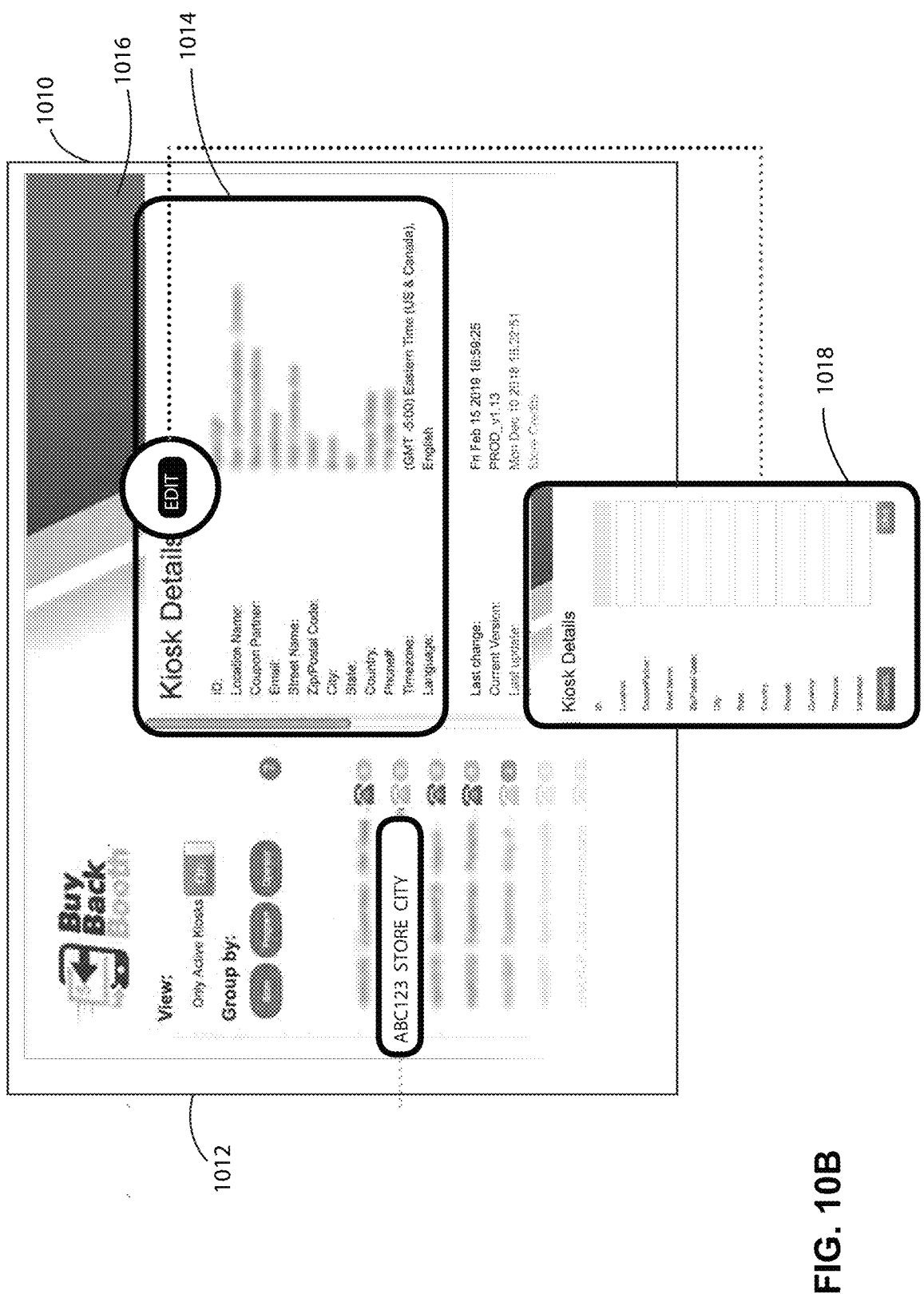
Figure 10D:
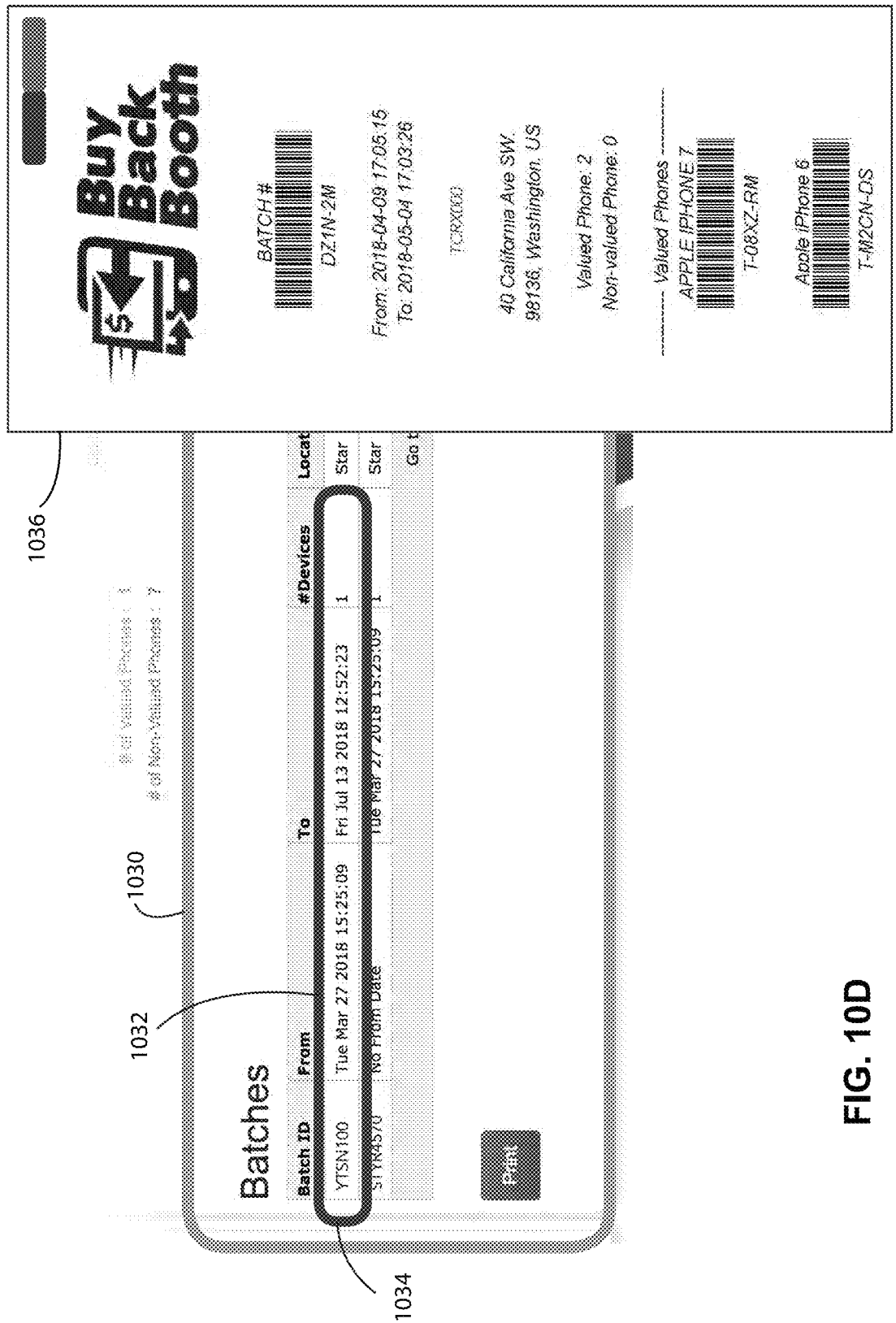

FIG. 10 (collectively FIGS. 10A, 10B, 10C and 10D) are example screens that may be available to operators, according to some example embodiments. In FIG. 10A, the screen 1000 shows, to an operator, all evaluation devices (e.g. kiosks) in one screen. The list of evaluation devices 1002 may include an identification of the evaluation device, its location and the number of POD that is currently in its bin/vault pending collection. The list can be selectably, using a selectable switch, configured to list only active evaluation devices or to list all evaluation devices. The list may be, user selectably, sorted according to evaluation device identifier, program name, evaluation device location etc. When a selection of an evaluation device is made in the list 1002, another portion 1004 of the screen can be used to display more detailed information regarding the selected evaluation device. The report may provide users with information about aging of the inventory or using algorithms to determine the importance of a POD collection, for example, visually identifying the evaluation devices which a collection should be due because the value of the inventory is significant enough, or the possible depreciation of the inventory value due to inventory aging is predictable and necessitate a POD collection. According to some embodiments, a color coding scheme may be adopted by which the number of PODs that are in its bin/vault is displayed for each evaluation device in a color indicative either of the oldest purchase date of any of the POD in the bin/vault or the total value of the POD in the bin/vault. In some embodiments, a color scheme may also be used to quickly identify FIG. 10B illustrates an annotated example of a screen display 1010 shown to the operator when the operator selects a particular point of presence 1012 from the listing of evaluation device locations (e.g. such as listing 1002). The evaluation device details may be displayed in a panel 1014. The details may include an identifier for the evaluation device, location of the evaluation device, a coupon partner, and email address, street address phone information, and configuration information such as the default language used for evaluation device display and/or configuration, etc. When the operator selects to edit the evaluation device details, for example, by selecting a button 1016, then another screen/window 1018 may popup to enable the user to edit and save the edited information.

The evaluation device identifier may identify the point of presence location. The evaluation device identifier can be character string, but the identifiers if properly used can be helpful in quickly determining the exact location of the evaluation device. For example, if the point of presence of a particular evaluation device is associated with a chain of locations, then that chain name can be part of the evaluation device identifier. Some of the evaluation device details may appear on all printed reports and/or customer receipts generated at or regarding the evaluation device.

FIG. 10C shows an example screen showing information regarding the PODs in the evaluation device (e.g. in the vault of the evaluation device), and the transactions such as for example the respective transaction associated with each of the PODs that are currently in the vault of the evaluation device. A table 1022 may show, for each POD that is currently in the vault, the session identifier associated with the transaction that resulted in the POD being received at the evaluation device, the brand of the POD, a name or description, a value associated with the POD (e.g. evaluated value, purchase price paid at the evaluation device), and the purchase date/time information. In some embodiments, information such as the type of POD, POD owner information, POD condition, etc. may also be shown in the table 1022, It will be understood that in many embodiments only a subset of the information about the POD as acquired by the evaluation device will be shown in the table 1022.

A table 1024 may show transaction information regarding the PODs that are currently in the vault of the selected evaluation device. The information displayed in the table 1024 may include for each transaction, the transaction identifier, a start date. A name of the evaluation device, a coupon partner associated with the transaction, a coupon identifier associated with the transaction, and POD information. A color coding or some other manner of distinguishing may be used in the table 1024 based on the purchase date/time information. For example, a color code may be used such that purchases that are 0-5 days old, 6-8 days old, 9-10 days old, and those that are overdue for collection can be separately identified. Such display techniques facilitates efficient collection.

FIG. 10D illustrates an annotated example of a screen display 1030 showing information regarding collected batches of PODs. A table 1032 may show, in each row 1034 corresponding to a batch, a unique identifier, the earliest purchase date of any POD in the batch, the latest purchase date of any POD in the batch, the number of PODs and location. The table 1032 therefore can be considered the history of POD collections from the evaluation device. Upon clicking on a row of table 1032, a receipt 1036 may be displayed and/or printed that shows information regarding the corresponding batch such as the batch identifier, associated dates, associated location, information regarding the total numbers of PODs collected, and information regarding each of the collected PODs. With respect to each of the PODs, a bar code may be provided to identify the POD and device type descriptor may be shown on the receipt 1036.

In some embodiments the information displayed on the display screen 1020 may include PODs that were previously traded on the evaluation device.

Figure 11:
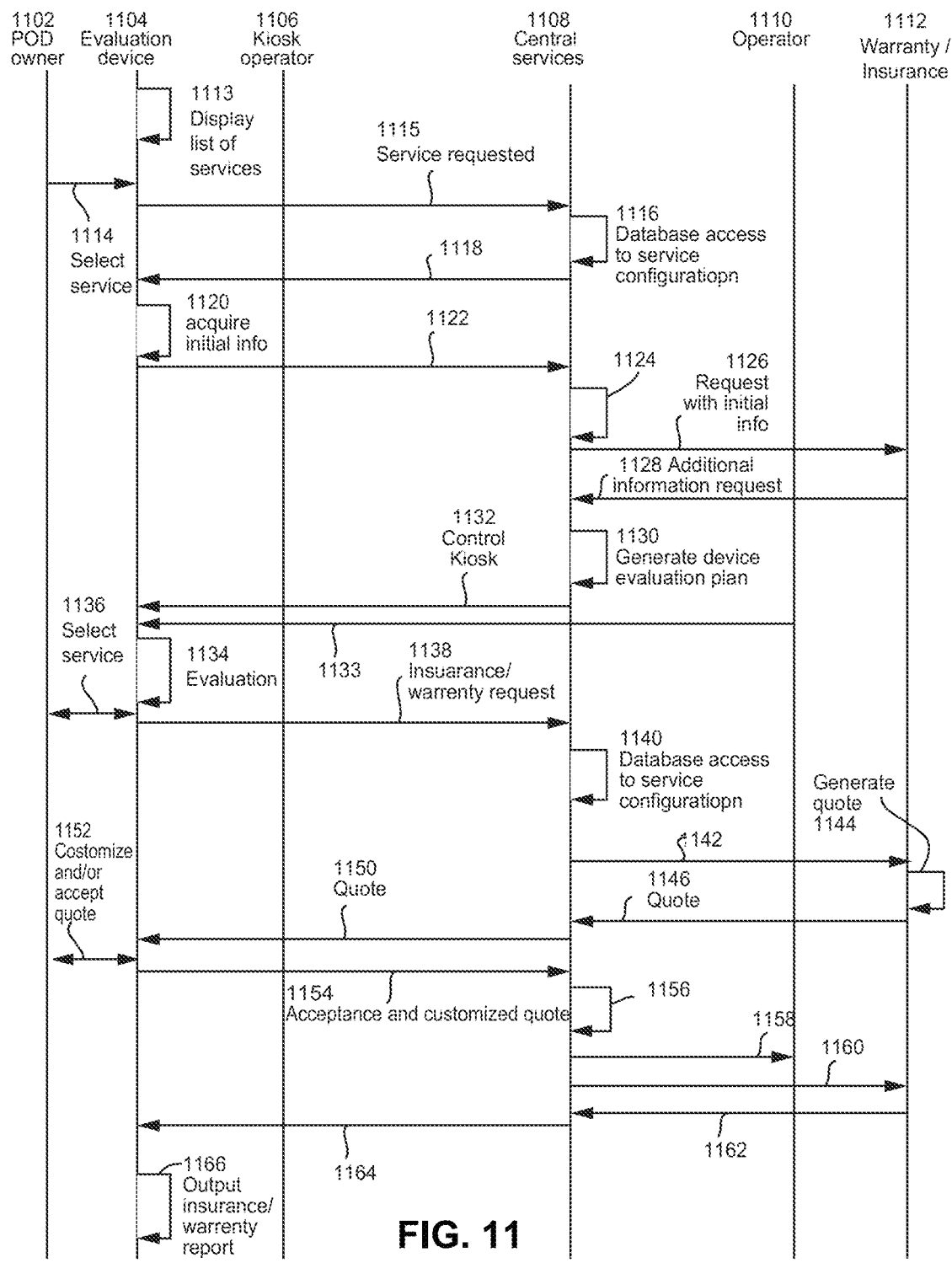
FIG. 11 is a flowchart showing operations associated with obtaining insurance and/or warranty quotes according to some example embodiments.
Figure 12:
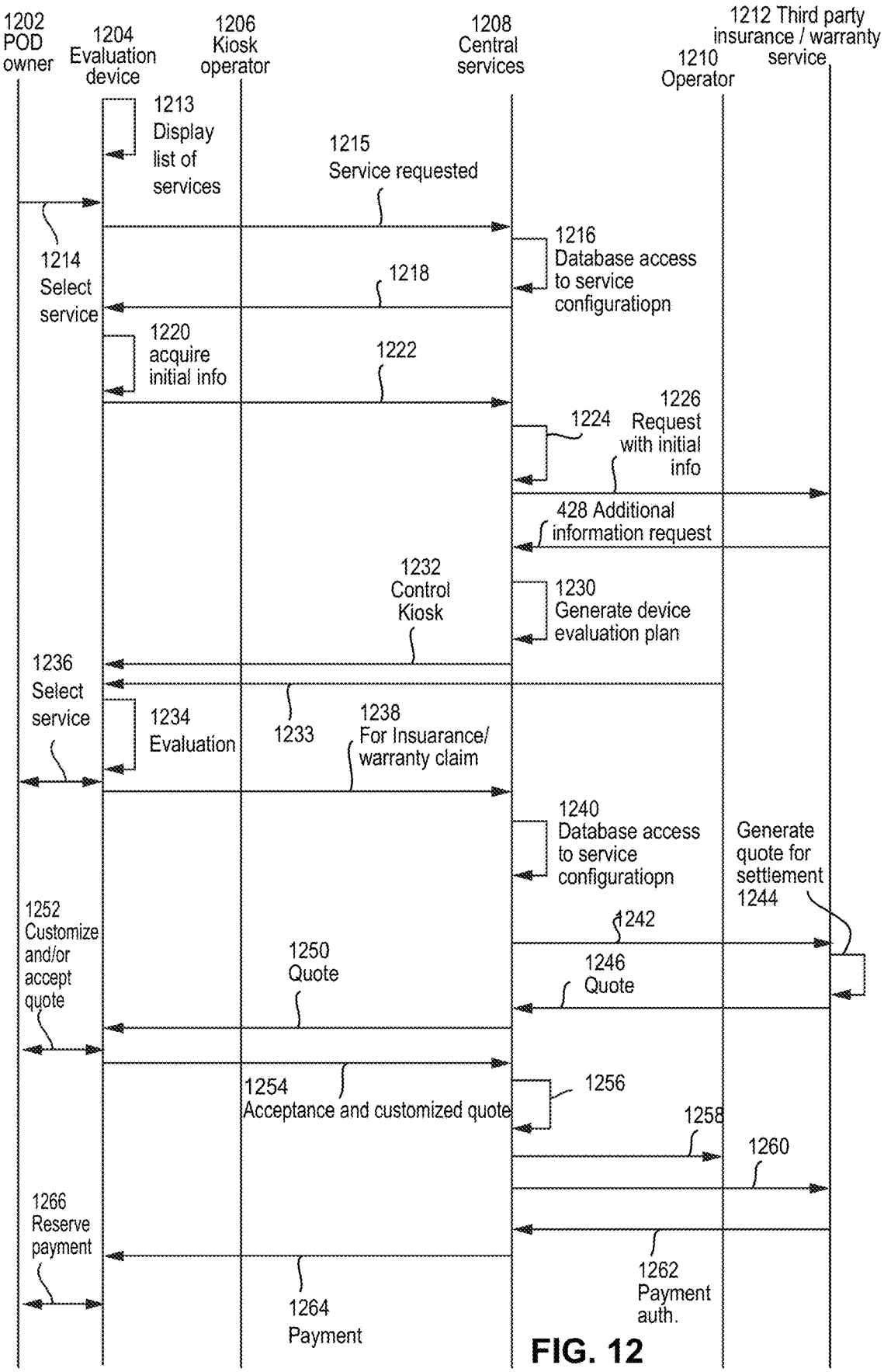
FIG. 12 is a flowchart showing operations of a process associated with obtaining insurance and/or warranty related service according to some example embodiments.

FIGS. 11 and 12 illustrate processes that enable the use of an evaluation device to obtain insurance/warranty related services according to some example embodiments.

No insurance company would want to pay for a defect that already existed or that is too likely to happen prior to insuring a specific device (pre-existing condition). This is a primary reason why it is almost impossible to insure a POD at present: while many manufacturers will offer warranty or insurances for new or almost new devices, almost no insurance company will do so for older devices. Some embodiments provide means to overcome this limitation by providing POD owners a way to get a precise and complete evaluation of their device by supplying insurance providers such evaluation and the ability to retrieve previous evaluation or comparison reports. This would allow insurers the ability to accurately validate whether or not a claimed defect or damage occurred post policy issue date and is therefore covered by the insurance.

A related problem that needs to be resolved is to disallow claims for pre-existing conditions. Providers may not have the capabilities to refuse, at the time of quote, devices, based on pre-existing damage conditions. Such pre-existing conditions may in some cases already be excluded by the plan policy even though the plan provider knew about or had unanalyzed evidences at the time the plan was purchased. The problem providers often face is that, for offering "anytime insurance" on used devices, they cannot know—without technology as that disclosed in example embodiments—what the pre-existing conditions were. One method such providers have been using to circumvent this limitation, with very limited success, is to force a waiting period (e.g. "30 day" period) where no claim will be admitted, hence, if the screen is broken, those providers will not accept a claim a few days after the protection plan was purchased/agreed.

This may cause two problems: (1) users may legitimately have their screen broken a few days after purchasing a protection plan but would not be able to benefit from the plan they legitimately purchased; and (2) users may illegitimately purchase a plan, wait out the waiting period (e.g. 30 day waiting period), and file the claim on the next day so that they illegitimately benefit from the protection plan because the problem was a pre-existing condition.

Like insurance, warranty validation also share similar challenges in that a warranty is limited in time and to a certain range of defects, problems or events. Some warranties are issued from a manufacturer and take effect upon purchase while others may be given by a device-repair entity and may begin, for example, once a repair of a device has been performed, the warranty may offer 30 days from the time of repair and be valid only for that which was repaired.

The embodiments, using evaluation points, provide means to "freeze in time" the detailed evaluation of a POD, including all physical, visual, functional and health attributes, and provides ability to compare between temporal evaluations in order to assess, or permit the assessment of the validity of an insurance or warranty. By comparing between at least 2 temporal evaluations, the evaluation system may tell which defects were pre-existing conditions, or pre-existing defects that may have led to the condition. For example, if a screen was previously damaged, even slightly, it may be taken off insurance or warranty because of the pre-existing condition that makes the screen more likely to break easily. The evaluation system may also assess information from the original evaluation determine which items are not covered. When a user attempts to claim a problem using any of the evaluation devices operable with the evaluation system, the evaluation system may use a plurality of methods for determining claim eligibility. As introduced above, it may make determination based on the existence of pre-existing conditions. One method, briefly described above, is to compare the claim of the second evaluation point with the information previously stored at the first evaluation point (the information of the first evaluation point may be fully, partially or not analyzed at all), and, if the currently claimed defect was already present at the first evaluation point, the evaluation system may decide to disallow the claim.

Another technique, for determining claim eligibility may require the evaluation system to look for the presence of a defect that was present in the data (e.g. in a stored data record) related to the first evaluation point that could be the cause of the claim alleged by the user or identified on the device. For example, a small crack on the screen may have been identified at evaluation point 1, and could be a cause for disallowing the current claim, for example, if that crack can be related to the current claim, according to the protection plan policy.

Another technique for determining claim eligibility is to ensure that the current claim was actually covered by the protection plan policy or determine if it was specifically excluded. For instance, a current claim for a cracked screen may be disallowed if the screen may have been specifically excluded during the protection plan quote process, and this is detected by referring protection plan quote information stored in association with the electronic device's information.

Upon receiving a user's acceptance of a protection plan quote, the evaluation system would store the user acceptance, for example by storing an information indicating that a user accepted the protection plan quote terms and conditions, or by recording an audio acceptance clip, or using the image of an on-screen signature from a touch capable device, etc. The evaluation system would also store the protection plan information or a relation to a previously stored quoted protection plan information. The protection plan information includes a plurality of relevant elements in relation with the quoted or accepted protection plan, possibly in a database including in one or more table or documents, which may include the elements directly or by reference, the elements can be any relevant combination permitting the rendering of the protection plan services including a policy template, a policy number, evaluation information, device information, pricing information, beneficiary, plan information, explicit inclusion information, explicit exclusion information, etc.

At a subsequent second time, a beneficiary user of a protection plan may use the evaluation system, may use embodiments of the invention to allegedly claim benefit from the protection plan, for example, if the protection plan provides coverage for repair of damages to the pre-owned electronic device, a beneficiary user may demand the protection plan provider or its assignee to repair the device. In such case, the evaluation system must first establish the plan that is in relation with the allegedly defective pre-owned electronic device and it may do so by recognizing the pre-owned electronic device, by any means, such as, for example, using the IMEI, or by recognizing the beneficiary user, by any means described but such as using a contact information element such as the beneficiary user smartphone number, a plan associable with the pre-owned electronic device.

Upon successful validation that an alleged claim is covered by at least one protection plan associable with the beneficiary user or the pre-owned electronic device, the evaluation system may notify a party, by printing a validation coupon, by displaying a message on a display connected to the evaluation system, or by electronic means such as connecting through service interfaces or messaging systems. The notification to a party that the alleged claim is valid allows, for instance a party that is a repair shop, to proceed with the repairs with the assurance that the protection plan provider will cover the damages costs. Alternatively to notifying a party, the evaluation system may proceed with a payout of a certain amount. Prior to notification and payment, some embodiments may demand a payment, or subtract from payment, an amount equivalent to the deductible information that may be associated with the protection plan policy or information.

Additionally, the evaluation system may also evaluate the deterioration rate during the various temporal evaluations by comparing each evaluation with average wear and tear, which may become indicators of the level of care an owner has exercised toward the devices, which the system may use to influence the risk level. Such wear and tear algorithm may be implemented programmatically or through machine learning. For example, if the number of scratches, dents or other defects increases at a rate above average, it may be an indicator that this user is less caring about its devices. This comparison may also be made from a single evaluation for pre-owned devices: if a 2 year old device is in excellent condition, it may be an indicator that the user takes good care of its devices and may receive a preferred pricing. Results from wear and tear assessment may be used to determine that mirror defects are not covered, or to adjust risk level.

Some embodiments may enhance the determination and/or use of the deterioration rate. Such embodiments may include, for example: an embodiment modifying a proposed protection plan price for a user in accordance with a deterioration rate determined based on another electronic device for the same user; or an embodiment of an evaluation system providing "loaner" evaluation services. An embodiment modifying a proposed protection plan price for a user in accordance with a deterioration rate determined based on another electronic device for the same user, may first determine a deterioration rate for a particular user based on the deterioration rate of that user's traded-in device or the like, and can either increase or decrease the price quoted for the protection plan based on whether the expected deterioration rate for the device to be protected as determined based on the traded-in device's deterioration rate is greater or lower. An embodiment of an evaluation system providing "loaner" evaluation services could also use a wear and tear algorithm, which may be implemented programmatically or through machine learning, in order to determine if damages that occurred during the loan period are normal wear and tear, and otherwise the evaluation system or device can initiate a return fault process to deal with the situation.

As described above, in the temporal evaluation according to some embodiments evaluations are performed at two or more evaluation time intervals. In the temporal evaluation process, given that a way to determine the level of wear and tear is available, a user and/or system can also be able to assign threshold levels (TL) to each diagnostic test. The TLs can be either manually entered or fed into our system through an insurance company's database. Then, quick markers for each of those tests may be assigned, depending on where they fall within a determined "normal wear and tear" test (e.g., red light, yellow light, green light). In this manner, and with the instructions of our protection plan backers, immediate decisions on the claim eligibility of a device can be made. Some embodiments may use a variety of data sources which may, for example, come from different protection plan providers that may apply different context and deterioration rates.

An example of a programmatic wear and tear algorithm could use data from one or many sources, and apply for example proportional rules weighting the usage of the device over time with regards to normal wear and tear averages or other statistical methods.

Risk level may also be influenced by other risk factors, such as, geographical location, type of stores, age of the POD owner. If available, the device's internal indicators such as accelerometer, battery health, CPU health, etc. may also form part of the influencing factors used to affect pricing. For example, the accelerometer's history information may be evaluated to identify recorded previous "shocks" that the POD has incurred, and, should the number or intensity of shocks be above a certain threshold, an insurer may increase the risk associated with the POD (as it is more likely to fail), or the POD's owner (as it may be considered less caring than average).

In an embodiment, an evaluation system that offers insurance services, the owner of a device will complete a device evaluation, for example using the diagnostic application and by presenting the device in the inspection area for the visual inspection, and, upon completion of the evaluation, the evaluation system calculates one or more insurance prices based on risk factors, the user may be presented with the option to buy an insurance for the device. In such embodiment, the price to insure may already have been computed by the evaluation system, or it can be computed once the user demonstrates interest. When calculating a quote for an insurance, an evaluation system may take into account a variety of parameters which in an embodiment will include one or more databases that permit the evaluation of statistically probable incidents, their probability and an estimated cost of incident. By applying standard statistical and actuarial methods, a cost for insuring the device can be established.

Some embodiments may, in addition to the capabilities described in the above paragraph, also include the use of a diagnostic application and/or the use of risk factors, such as those described above, in determining the protection plans.

In another embodiment of the evaluation system that offers insurance services, a plurality of costs may be established for a variety of duration (1, 2 or 3 years), or for a plurality of deductible or a combination thereof. In these embodiments, the cost evaluation is likely to be enhanced with the ability to apply predictions on repair costs, again by using statistical and probability and actuarial models.

Additionally, in another embodiment of the evaluation system that offers insurance services, the costs may be influenced depending on the inclusions and exclusions of certain risks (insurance options) which may be selected by the user or limited by the insurer. For example, a user may exclude insuring the glass, which would result in a lower cost to insure. Additionally, some insurer may offer coverage for loss or theft, while other may not.

In another embodiment of the evaluation system that offers insurance services, a plurality of options may also be offered in order to establish the desired coverage, for example, one may opt not to insure against screen damages. Some embodiments may also include providing one or more of durations of protection plan, a deductible option prediction of repair costs, inclusions or exclusions of certain risks (i.e. glass) coverage for loss or theft, and the like.

In another embodiment of the evaluation system providing insurance services, payment may be offered directly on the evaluation system. In such embodiment, the evaluation system may be connected to payment means such as credit card readers, NFC readers, or integrated payment terminals. In other embodiment, the evaluation system may, using cameras, be able to use its imaging system, such as a camera, take a picture of a credit card and OCR the credit card numbers or facilitating data entry. Some embodiments make use of encryption algorithms for at least certain digital assets, such as any asset that contains personal identifiable information, such as a credit card. In some embodiments, for enhanced security, certain digital asset is immediately encrypted before being transmitted, which transmission is usually encrypted too (i.e. using SSL), and such digital assets are stored on secured servers or could also be immediately deleted, for example, in order to comply with certain requirements, for example, PCI requirements.

In other embodiment of the evaluation system, payment may be offered online, using a URL. In such embodiment, the user is sent a link either through email, text message or other convenient messaging system and, using the URL provided, the user may complete the payment using any online supported mechanisms, such as PayPal, credit card, online debit, cryptocurrency, etc. Other embodiments may use the store payment facilities existing where the evaluation device is located. Such embodiments may be integrated with store POS (point of sale) systems in order to confirm that the payment has been received by the store, or may use an alternative method of confirmation, such as through a service interface which may be provided with an extranet type of website. A possible embodiment would print a voucher containing a computer readable code, which code is associable or contains a possibly unique URL, and the URL, once activated triggers some software to complete the authentication of the payment. To ensure that the authentication is made by a legitimate computer, a previous identification may have been required, and may have been stored in a cookie of the browser that is possibly installed on a store computer.

In an embodiment of the evaluation system providing validation, the evaluation system may use service interface to notify the third party, for instance the insuring corporation or the warranting corporation of the accepted or rejected claim, alternatively, the final decision may be made by the third party corporation Another embodiment may use the evaluation system in order to provide users or stores or manufacturers/distributors with warranty validation services. Such embodiment will typically use technologies and methods described herein and apply additional methods for providing the validation service. For instance, in an embodiment, a complete device evaluation is made and stored in a first evaluation session details at the time of activation of the warranty. When a claim is made toward the warranty provider, a second evaluation is made using the evaluation system, which may be a partial evaluation, in order to confirm if the claim and the warranty are valid.

In an embodiment providing warranty services, upon activation of the warranty a warranty validation notice or policy is given to the owner of the device, either using a printed coupon or through an electronic way such as email, text message or other convenient messaging method, which may include redirection to an online stored document using a URL. In such embodiment, the notice policy may describe the device and detail the warranty clauses, inclusions and exclusions and provide a duration or date limit. During activation, the evaluation system may store, in a database or data storage facility, a detailed record of the activated warranty or insurance purchased, of the warranty details, including the warranty inclusions, exclusions, dates (start, end, duration or combination) price information, cost of deductible (if any), or list of costs of deductibles per damage or per type of claim. Such record may be stored within the evaluation session of the device, or is associable with the evaluation session details, so that the evaluation system is operable to retrieve any information including POD's attributes and digital assets, using an identifier of the warranty, or an identifier of the POD, or uniqueness data designating a POD, and the system is operable to verify the validity of the warranty.

Validation may also be performed in a post repair situation. In an embodiment of the invention providing repair services, whether used in conjunction with a protection plan (confirmation of repair) or not (repair inspection, for future store repair warranty validation), for example, when an evaluation device is available at a repair store, the evaluation device may be used to take a partial or full evaluation of the repaired device and store as an evaluation point data with the methods described previously. This new evaluation point may then be used to validate future claim or, to validate a warranty on the repair, using the methods describes herein.

An example use case may be as follows: A user walks into a repair store with a broken device and, after the repair has been completed, the store employee performs a full or partial evaluation of the repaired device with the evaluation device and system which the system stores with temporal information (evaluation point data) alongside protection information, which may include, for example, the items repaired, the date and time of the repairs, the technician that performed the repair, etc. If the repaired device is covered by a protection plan, the evaluation system may notify the protection plan provider of the completed repair, for example, using a service interface. If the store provides warranty on the repair, the evaluation point data may then be used at a later time to validate if a future warranty claim is, or is not, covered. For example, if a user walks in again one month later with a device claiming it was previously repaired and under warranty, another evaluation can be performed using the evaluation device and system, and the system may, using methods described herein, do one or many of the followings: (a) identify the claimed device to ensure it is a device that received a repair, for example, by retrieving an identifier such as the IMEI, Mac address or other unique device identifier, by using visual micro-differences inspections, etc.; (b) retrieve information about any associated protection information; or (c) using protection information to determine validity of the warranty, for example, determining if the claimed defect was related to the repair and if the claim date is within a time period from the repair, for example 30 days.

In an embodiment a service interface is provided, for example through a URL or web service call for retrieving information about a warranty from a warranty identifier or a POD identifier, or an evaluation session identifier. The information returned may be used to identify whether the warranty is valid, the inclusions and exclusions of the warranty and other relevant information stored.

Some embodiments may include the ability for an evaluation system to associate or communicate information about an insurance policy related to a specific device. For example, in the case of POD, a relation may be created between a user account such as an apple ID or email account, or telephone number, an IMEI, or other user or device related identifier with a protection plan identifier, which may be an insurance policy number or warranty protection plan number. A user identifier typically relates to a physical person or corporation which has presumably purchased a protection plan. A device identifier typically relates to a device owned by such person or company, or related to, such as a plan purchased by the parent of a family. Creating a relationship between a user or device related identifier and a protection plan identifier may be helpful, for example, during a claim process so that the user does not need to remember or have access to the protection plan identifier. An evaluation system using such embodiment could offer to the user to enter any of a phone number, an email address or other commonly known user related identifier or alternatively may use communication with the device to retrieve by mean of communication or visual identification a device related identifier. Then, using any of such user or device identifier, the evaluation system may retrieve the information related to the protection plan that may exists covering the damaged device. Additionally, it is to be noted that a protection plan, such as an insurance policy, may in some embodiments cover a plurality of devices.

Communication of information about the protection plan may use any of human to machine interface (e.g., touch screen, keyboard, voice recognition, face recognition) machine to machine communication (e.g., application to server, application to device, device operating system to surrounding machines), or machine observing mechanism (e.g., computer vision reading on screen or on device serial number such as IMEI, listening to signal sent by a device, etc.).

Some embodiments may provide an evaluation system and comprising an evaluation device as described above, and including any of a human to machine interface for capturing at least one identifier or machine to machine communication to retrieve at least one identifier, or machine observing mechanism for capturing at least one identifier, wherein the evaluation system stores an accessible relationship between at least one identifier and is capable using said identifier to retrieve associated protection plan information.

For PODs equipped with accelerometers, the application may be notified, or may be in able to have access to historical data to determine excessive shocks that the POD may have been subject to.

In some embodiments providing validation services, a validation process begins when a user desires to make a claim. The process may begin by running the diagnostic application or a specific insurance or warranty validation application (the application), or the process may begin on the evaluation system by selecting the appropriate options on screen of the evaluation device. The screen may provide various options, for example, to provide information about the broken part or damages, including option for device lost or stolen. The evaluation system which may use the application, is capable by using a unique identifier to first determine whether the warranty or the insurance is still valid. Some embodiment of the evaluation system are also capable of determining the validity by using uniqueness data, for example by recognition of the device using microdefects or micro-differences, as described above.

Some embodiments provide for keeping a protection plan application which may be, or may be incorporated in, the diagnostic application on the device of a protected (insured) phone. In an exemplary embodiment, an application such as a diagnostic application or other may embed protection plan functions that the user may use from time to time, or that the system may itself automatically trigger use from time to time. Such application with protection plan functions may, for example, keep information about phone usage, monitor excessive usage, for example in devices that may provide accelerometer history or accelerometer application notification, etc.

The protection plan functions may very well be integrated into the diagnostic application, making it convenient for the user to complete timely diagnostics, or preparing for claim, or troubleshooting the device. Such application may also provide tailored notifications to the user, which may be, for example, notifications of: product recall affecting the device; news affecting the device; anticipated failure; and, in applications that are also tied-in to one or many pre-owned device trading partner, such notifications may also include price information or incentives to trade-in the device.

The above may provide for: an evaluation system offering insurance or warranty coverage for pre-owned electronic devices, the evaluation system comprising system comprising: an evaluation device; methods for identifying and capturing dated (temporal) information about defects present on the pre-owned electronic device in a first evaluation point; and/or storing the evaluation point information.

The evaluation system may be operable, by comparing temporal information from a first evaluation point with information from a second evaluation point, to validate whether a claimed defect either occurred after the policy issuance date and/or is covered by the policy.

In some embodiments, the evaluation system may further include wherein the evaluation system is operable, by comparing temporal information from a first evaluation point with information from a second evaluation point whether a claimed defect results from a pre-existing defect that led to the condition. In some embodiments, the following combinations are supported (using the app to identify defects, or using human machine interface for a user to claim): an evaluation system as described above, and wherein the claim process includes running diagnostic functions from an application software; an evaluation system as described above, and wherein the claim process includes a human to machine interface allowing a user to claim at least one defect.

It may be desirable for protection plan providers to refuse or adjust quotes depending on the pre-existing condition of the POD, which is generally characterized by pre-existing defects and/or wear and tear information. To address this situation, in some embodiments, the evaluation system may be operable, using one of its internal function or using a third party service 1144 to decide using information from an evaluation point whether a device is eligible for protection plan. For example the evaluation system could compare evaluation information with one or more insurance or warranty plans which could be stored for example in a data structure associated with the protection plan. For instance, some insurance or warranty plans may contain qualifying instructions that may render a device non eligible, require a premium or require specific exclusions to be incorporated in the proposed offer (policy). In an exemplary embodiment of the invention, a process in the context of insurance or warranty plan may, within the inspection step (reference blue box in figure) make a decision to quote, not to quote, or to adjust a quote with conditions or exclusions on a plan for an evaluated POD, for example providing protection but excluding damages to a screen, for example because it may have already be broken, or because the evaluation may have determined that the screen (or any other feature) is beyond a certain threshold of wear and tear.

In an embodiment providing validation services, once the insurance or warranty has been determined valid, the evaluation system evaluates whether the damage claimed is covered by the warranty or the insurance. In such embodiment, a complete re-evaluation of the device, or a partial evaluation that focuses the damage claim, is made using either the application, the imaging system, both or a combination thereof, accordingly to the required re-evaluation needed. Because it is considered useful data to completely re-evaluate a device, it is not necessary for the evaluation system to be configured to distinguish and may simply enforce a full re-diagnostic of the device to confirm validity of the damage claim.

If the user selects that the device was lost or stolen, a special process may begin. The special process may requires additional declaration and ownership transfer of the device, should it be ultimately found. Transfer of ownership also includes the right to blacklist the device, in order to render the device valueless. The process may also include steps to validate if the device has a balance due to a third party, for example, the store or the brand that sold the device in the first place. This or similar capability, in some embodiments, may also include the ownership transfer process. For example, an evaluation system as described above may be comprising a device ownership transfer process which comprises methods for the device owner to transfer the "operating system ownership account" (i.e. Apple ID).

In embodiments offering protection plans, authorized repair centers may have an evaluation device so that, in complement of possibly validating repairs, the evaluation system may provide payment directly to the store for example, possibly after having validated, using the evaluation device, that the repairs have been completed and the device tested. Such payments may be provided by electronic means, such as through an ACH transfer, a PayPal transfer or other payments methods, including snail mail checks, associated with the authorized repair center where the evaluation device that performed the validation is located.

In embodiments of evaluation devices associated with repair centers, human interfaces which may be provided on the evaluation device, on a mobile application or through a web portal, may allow communication of repair costs and other conditions between the protection plan provider and the store offering repairs, for example allowing confirmation of the repair costs, which in some embodiments are estimated or dictated following the evaluation session data performed on the evaluation device. For example, an evaluation session may identify that a screen is damaged, and, using tables, databases or service interfaces, is capable to estimate or dictate a cost based on the device model, cost of replacement parts, etc.

In some embodiments, the human interface may also allow the store employee to modify an order or request a modification if, for example, new damages are discovered that were not originally identified. An embodiment may provide an evaluation system as described above, and comprising an evaluation device located in a repair store, wherein a payment process is initiated following inspection of a repaired device. The evaluation system may estimate or dictate repair costs.

FIG. 11 is a flowchart showing operations associated with obtaining insurance and/or warranty quotes according to some example embodiments. For ease of description, the sequence 1100 is described in relation to an evaluation device such as the kiosk shown in FIG. 2A. However, the same sequence or similar sequences may be performed in relation to other types of evaluation devices, such as, but not limited to FIGS. 2B-2G and 3A-3D.

The illustrated sequence 1100 is shown between the POD owner 1102, evaluation device 1104, evaluation device staff 1106, central servers 1108, remote operator 1110, and third party servers 1112. In some embodiments, the POD owner 1102, evaluation device 1104, evaluation device staff 1106, central servers 1108, remote operator 1110 and third party servers 1112 may be similar to POD owner 120, evaluation device 110, evaluation device staff 122, central servers 104, remote operators 140 and third party servers 107, respectively, described in relation to FIG. 1.

The operations sequence shown in FIG. 11 may be initiated when a POD owner comes within proximity of an evaluation device, such as evaluation device 110 in FIG. 1, and the evaluation device, either automatically or upon being provided some input by the POD owner, initiates operations by some activity, such as, for example, an operation 1113 displaying a menu screen of one or more services which may be invoked by the user. In an example embodiment, the displayed menu may include options such as, for example, "Trade in Device", "Repair Services", "Warranty/Insurance Services", "Evaluation Report", and the like. It will be understood that other services may be facilitated by the evaluation device according to some embodiments, and thus the displayed menu may also include such other services.

At operation 1114, the POD owner 1102 selects "Insurance/Warranty Services" option from one or more services available on the evaluation device 1104. The POD owner may make this selection using any suitable manner of selection, for example, by clicking on a graphical user interface element with a mouse, touch command or voice command. The menu may be arranged in any of several ways so that the POD owner can select a desired service at an appropriate granularity. For example, in some embodiments, the POD owner may be guided to select "insurance/warranty service" as the desired service, "smartphone" as the type of POD for which insurance/warranty is sought, using a hierarchical menu.

At operation 1115, the evaluation device 1104 transmits a message indicating the requested service to the central server 1108. According to an embodiment, the central server 1108 to one of the servers in central servers 1104 and/or a proxy server that distributes work requests to one or more servers of the central servers 1104. The central server may be structured such that all messages are received at a central node, and then directed to separate nodes based on the type of message and/or type of service. The message may be a standard message type structure that identifies the type of requested service within the message. Optionally, if additional information such as, for example, the device type and insurance/warranty type, has been acquired by the evaluation device, that information too can be included in the message transmitted from the evaluation device to the central server.

At operation 1116, the central server 1108 accesses configuration information based upon information obtained from the message received from the evaluation device at operation 1115. Upon identifying the service or the type of service being requested by the user, the central server may access a database or separate tables in a database based upon the identified service. The accessed configuration information may identify the POD owner and/or device information to be collected from the POD owner.

The information to be collected may be organized in tiers in the databases accessible to central server 1108. For example, a first tier may include all information that is general to more than one service. Such information may include the POD owner's name, address and identifying information, POD identifying information, etc. A second tier may be specific to the requested service. Such information may include the selected insurance/warranty service information, insurance/warranty particulars, etc. By organizing and/or structuring the data to be acquired in tiers, example embodiments provide the capability to gradually acquire information from a general to specific manner, thus improving the acquisition flow and intuitive feel of the menu driven information acquisition. In some embodiments, the access to the second tier information is dependent on the acquired first tier information. For example, the second tier insurance/warranty information may be stored in the configuration database separately for each device type, and the applicable table may not be identifiable until the tier one information acquires at least basic device information to determine the type of device.

In some embodiments, at least some of the information to be acquired may be organized and/or stored in a context-specific manner. FIG. 7, for example, described the use of contexts in certain embodiments.

At operation 1118, the central server 1108 returns information to the evaluation device 1104 to enable obtaining information or additional information from the POD owner 1102. In some embodiments, this information may be transmitted in a single transmission. In some other embodiments, this information may be transmitted separately for each tier of information. At operation 1120, the evaluation device 1104 obtains additional information based on requirements received from the central server at operation 1118.

At operation 1122, the evaluation device 1104 transmits the acquired information to the central server 1108.

At operation 1124, the central server 1108 accesses its configuration information for the requested service in order to identify a third party provider for the requested service.

At operation 1126, the central server 1108 may access a service interface for the identified third party service provider and request a description of the information that is required for providing the requested service. The central server may provide the third party service provider some of the information already collected such as, for example, type and model of device, a high level description of the insurance/warranty requirements, etc.

At operation 1128, the requested information that is required for providing the requested service is indicated by the third party service provider 1112 to the central server 1108.

At operation 1130, the central server 1108 may generate a sequence of operations to obtain the information requested by the third party service provider 1112. The information requested by the third party service provider may change due to various factors such as, but not limited to, device type (e.g. smartphone or other POD, smartphone type), time duration for insurance/warranty, type of service, type of insurance/warranty (e.g. full POD, specific features, etc.) etc.

The generated sequence of operations may be a sequence of instructions for any of capturing images of the POD according to certain specifications (e.g. specific angles of view, specific lighting conditions, specific backlight conditions, specific magnification levels, specific focal point adjustments, etc.), capturing video of the POD (e.g. capture video while particular application sequence is being run on the POD displaying to the POD screen, etc.), capturing audio samples (e.g. capture audio while particular application sequence is being run on the POD outputting audio from the POD speakers, capture play back of audio output from the evaluation device and recorded by the POD, etc.), determine certain characteristics using image analysis and/or OCR (e.g. use OCR to determine model and serial number information of the POD, use image analysis detect physical device features such as buttons etc. and/or defects such as cracks/scratches/missing buttons etc.), etc. Some instructions in the sequence may provide for a remote operator to view the POD through a camera or to control/adjust some of the images being captured by moving one or more of the cameras and/or adjusting camera or lighting conditions. In some embodiments the remote operator having real-time access to the evaluation conducted by the evaluation device is via an internal service interface 106, and in some other embodiments the remote operator may be via a third party service interface 107. In the event of a remote operator via a third party service interface, the third party service interface, central server and/or evaluation device may implement security and authentication measures to restrict access by the remote operator to a particular POD and particular controls for that POD.

The sequence of instructions may be generated based on the type of insurance and/or warranty requested and/or defects identified, and also based on the configuration of the evaluation device (e.g. number and controllability of cameras, features of the evaluation chamber, lighting capabilities, etc.). Moreover, the sequence of instructions may be generated in a manner that is context-specific to the service and the third party service provider. For example, the generated rules may be derived from preconfigured rule templates stored for each context or group of contexts. As noted above, contexts are described further in relation to FIG. 7 etc. below.

At operation 1132, in accordance with the generated sequence of operations, the central server controls the evaluation device. This control may either be commanded on an instruction-by-instruction basis from the central server, or, in some embodiments, the sequence of instructions can be transmitted to evaluation device which then locally commands the progressing through the sequence.

At operation 1134, the evaluation device 1104 performs the evaluation of the POD in accordance with the instruction sequence and/or commands received at operation 430 from the central server and/or a remote operator.

At operations 1136, the user-evaluation device interactions take place as needed for obtaining the information. The interactions may enable the user to enter information regarding the POD owner, and the POD. The interactions may also enable the evaluation device to obtain POD owner's confirmation regarding automatically detected scratches/cracks and physical or functional defects of the POD. For example, during the execution of the sequence of instructions to conduct the evaluation, the evaluation system may seek confirmation from the POD owner 1102 or the evaluation device operator 1106 to confirm certain ones of its detections. For example, based on machine learning etc., the evaluation system may have configured confidence thresholds for automatically categorizing certain detected features as defects, and it may seek confirmation from the POD owner or the evaluation device operator for detections that are at or near that confidence threshold before automatically categorizing such detections.

At operation 1138, the evaluation device 1104 transmits the obtained information to the central server 1108. This may comprise the request for insurance and/or warranty accompanied by information required for the performance of the insurance/warranty service requested.

At operation 1140, the central server 1108 processes the obtained information. At operation 1142, the central server transmits information based on the obtained information to the third party service provider 1112. In some embodiments, the formats of the data and interpretations of certain data items may be different between the evaluation system as represented in the central server 408 and the selected third party service provider. Thus, in such embodiments, the central server may translate between the different formats and/or different interpretations before transmitting the information received from the evaluation device to the third party service provider.

At operation 1144, the third party service provider 1112 processes the incoming request to determine a quote. The third party may use the received information in any manner in generating the quote. In some embodiments, the service interface may specify minimum information requirements and optimal information requirements for the exchange in each direction between the third party service provider and the central server.

At operation 1146, the third party provider transmits the quote for the requested warranty/insurance to the central servers 1108. In some embodiments, the incoming request is processed to determine a quote and the proving of the quote for the requested warranty/insurance to the central servers 1108 may be performed by a service within the evaluation system instead of at a third party.

At operation 1148, the central server processes the quote and at operation 1150 transmits a modified quote for the evaluation device. The processing by the central server may include, for example, optimizing the quote. For example, based on machine learning and/or other context-specific optimization techniques, the central server (sometimes in coordination with a remote operator accessing the central server via an internal service interface or a third party service interface) may adjust the quote by suggesting elimination and/or combination of warranties/insurances for some items so that the resulting charges can be lower. The processing may also include adjusting the price of the insurance/warranty to include a facilitation fee before presentation to the POD owner. By providing timestamped history information (attributes) regarding to insure or insured POD, the evaluation system reduces risks for insurers and provide fairness controls for everyone. In some embodiments, the central server may automatically conduct multiple exchanges with the third party service provider using the corresponding service interface. At operation 1150, the central server 1108 transmits the quote information to be displayed on the evaluation device 1104.

At operation 1152, the user interacts with the evaluation device to accept the quote. The acceptance of the quote may include user specifically accepting certain portions (e.g. insurance/warranty on individual items of the POD) of the quote and/or rejecting some portions. Such acceptance and/or rejections can be performed, for example, via check boxes or the like displayed on a touchscreen display of the evaluation device. In some embodiments, the acceptance of the quote may require a signature, which the POD owner may provide using a touchscreen or a touchpad of the evaluation device.

At operation 1154, the evaluation device processes the accepted quote, optionally collects the POD, and informs the central server regarding the acceptance and any adjustments made by the POD owner during acceptance and optionally information regarding the collection of the POD. The central server may optionally communicate any relevant information to the third party service.

At operations 1156 and 1158, the central servers 1108 process the quote acceptance and communicate with the remote operator as needed.

At operation 1160, the acceptance is communicated from the central servers 1108 to the third party service 1112, and at operation 1162, confirmation is received.

At operation 1164, the central server communicates the confirmation of the insurance/warranty to the evaluation device.

At operation 1168, the evaluation device 1104 displays and/or outputs the insurance/warranty reports etc.

FIG. 12 is a flowchart showing operations of a process 1200 associated with obtaining insurance and/or warranty related service, such as reimbursement for a defect or damage, according to some example embodiments. Process 1200 can be performed in order to evaluate the current condition of a POD and to provide the POD owner with a monetary settlement in view of a previously acquired insurance and/or warranty.

For ease of description, the sequence 1200 is described in relation to an evaluation device such as the evaluation device shown in FIG. 2A. However, the same sequence or similar sequences may be performed in relation to other types of evaluation devices, such as, but not limited to FIGS. 2B-2G and 3A-3D.

The illustrated sequence 1200 is shown between the POD owner 1202, evaluation device 1204, evaluation device staff 1206, central servers 1208, remote operator 1210 and third party servers 1212. In some embodiments, the POD owner 1202, evaluation device 1204, evaluation device staff 1206, central servers 1208, remote operator 1210 and third party servers 1212 may be similar to POD owner 120, evaluation device 110, evaluation device staff 122, central servers 104, remote operators 140 and third party servers 107, respectively, described in relation to FIG. 1.

The operations sequence shown in FIG. 12 may be initiated when a POD owner comes within proximity of an evaluation device, such as evaluation device 110 in FIG. 1, and the evaluation device, either automatically or upon being provided some input by the POD owner, initiates operations by some activity, such as, for example, an operation 1213 displaying a menu screen of one or more services which may be invoked by the user. In an example embodiment, the displayed menu may include options such as, for example, "Trade in Device", "Repair Services", "Warranty/Insurance Services", "Evaluation Report", and the like. It will be understood that other services may be facilitated by the evaluation device according to some embodiments, and thus the displayed menu may also include such other services.

At operation 1214, the POD owner 1202 selects "Insurance/Warranty Services" option, and "Insurance/Warranty Claim", from one or more services available on the evaluation device 1204. The POD owner may make this selection using any suitable manner of selection, for example, by clicking on a graphical user interface element with a mouse, touch command or voice command. The menu may be arranged in any of several ways so that the POD owner can select a desired service at an appropriate granularity.

At operation 1215, the evaluation device 1204 transmits a message indicating the requested service to the central server 1208. According to an embodiment, the central server 1208 to one of the servers in central servers 1204 and/or a proxy server that distributes work requests to one or more servers of the central servers 1204. The central server may be structured such that all messages are received at a central node, and then directed to separate nodes based on the type of message and/or type of service. The message may be a standard message type structure that identifies the type of requested service within the message. Optionally, if additional information such as, for example, the device type and insurance/warranty type, has been acquired by the evaluation device, that information too can be included in the message transmitted from the evaluation device to the central server.

At operation 1216, the central server 1208 accesses configuration information based upon information obtained from the message received from the evaluation device at operation 1215. Upon identifying the service or the type of service being requested by the user, the central server may access a database or separate tables in a database based upon the identified service. The accessed configuration information may identify the user and/or device information to be collected from the user and/or POD information to be collected in accordance with the requested service.

The information to be collected may be organized in tiers in the databases accessible to central server 1208. For example, a first tier may include all information that is general to more than one service. Such information may include the user's name, address and identifying information, device identifying information, etc. A second tier may be specific to the requested service. Such information may include the selected insurance/warranty service information, insurance/warranty particulars, etc. By organizing and/or structuring the data to be acquired in tiers, example embodiments provide the capability to gradually acquire information from a general to specific manner, thus improving the acquisition flow and intuitive feel of the menu driven information acquisition. In some embodiments, the access to the second tier information is dependent on the acquired first tier information. For example, the second tier insurance/warranty information may be stored in the configuration database separately for each device type, and the applicable table may not be identifiable until the tier one information acquires at least basic device information to determine the type of device.

In some embodiments, at least some of the information to be acquired may be organized and/or stored in a context-specific manner. FIG. 7, for example, describes the use of contexts in certain embodiments.

At operation 1218, the central server 1208 returns information to the evaluation device 1204 to enable obtaining information or additional information from the POD owner 1202. At operation 1220, the evaluation device 1204 obtains additional information based on requirements received from the central server at operation 1218. The information to be acquired may include information for uniquely identifying the POD. At operation 1222, the evaluation device 1204 transmits the acquired information to the central server 1208. In some embodiments, this information may be transmitted in a single transmission. In some other embodiments, this information may be transmitted separately for each tier of information.

At operation 1224, the central server 1208 accesses its configuration information for the requested service in order to identify a third party provider for the requested service. The central server 1208 may also use the unique identification information to access previously configured insurance/warranty information for the POD.

At operation 1226, the central server 1208 may access an application programming interface for the identified third party provider and request a description of the information that is required for providing the requested service. The central server may provide the third party service provider some of the information already collected such as, for example, type and model of device, a high level description of the insurance/warranty claim, etc.

At operation 1228, the requested information that is required for providing the requested service is indicated by the third party service provider 1212 to the central server 1208.

At operation 1230, the central server 1208 may generate a sequence of operations to obtain the information requested by the third party service provider 1212. The information requested by the third party service provider may change due to various factors such as, but not limited to, device type (e.g. smartphone or other POD, smartphone type, etc.), type of service (e.g. insurance, warranty, extended warranty, etc.), type of defect or damage cause for claim (e.g. screen damage, water damage, button damage, etc.), third party service provider capabilities, etc.

The generated sequence of operations may be a sequence of instructions for any of capturing images of the POD according to certain specifications (e.g. specific angles of view, specific lighting conditions, specific backlight conditions, specific magnification levels, specific focal point adjustments, etc.), capturing video of the POD (e.g. capture video while particular application sequence is being run on the POD displaying to the POD screen, etc.), capturing audio samples (e.g. capture audio while particular application sequence is being run on the POD outputting audio from the POD speakers, capture play back of audio output from the evaluation device and recorded by the POD, etc.), determine certain characteristics using image analysis and/or OCR (e.g. use OCR to determine model and serial number information of the POD, use image analysis detect physical device features such as buttons etc. and/or defects such as cracks/scratches/missing buttons etc.), etc. Some instructions in the sequence may provide for a remote operator to view the POD through a camera or to control/adjust some of the images being captured by moving one or more of the cameras and/or adjusting camera or lighting conditions. In some embodiments the remote operator having real-time access to the evaluation conducted by the evaluation device is via an internal service interface 106, and in some other embodiments the remote operator may be via a third party service interface 107. In the event of a remote operator via a third party service interface, the third party service interface, central server and/or evaluation device may implement security and authentication measures to restrict access by the remote operator to a particular POD and particular controls for that POD.

The sequence of instructions may be generated based on the type of insurance/warranty requested and/or defects identified, and also based on the configuration of the evaluation device (e.g. number and controllability of cameras, features of the evaluation chamber, lighting capabilities, etc.). Moreover, the sequence of instructions may be generated in a manner that is context-specific to the service and the third party service provider. For example, the generated rules may be derived from preconfigured rule templates stored for each context or group of contexts. As noted above, contexts are described further in relation to FIG. 7 etc. below.

At operation 1232, in accordance with the generated sequence of operations, the central server controls the evaluation device. This control may either be commanded on an instruction-by-instruction basis from the central server, or, in some embodiments, the sequence of instructions can be transmitted to the evaluation device which then locally commands the progressing through the sequence.

At operation 1234, the evaluation device 1204 performs the evaluation of the POD in accordance with the instruction sequence and/or commands received at operation 1230 from the central server and/or a remote operator.

At operations 1236, the user-evaluation device interactions take place as needed for obtaining the information. The interactions may enable the user to enter information regarding the POD owner, and the POD. The interactions may also enable the evaluation device to obtain POD owner's confirmation regarding automatically detected scratches/cracks and physical or functional defects of the POD. For example, during the execution of the sequence of instructions to conduct the evaluation, the evaluation system may seek confirmation from the POD owner 1202 or the evaluation device operator 1206 to confirm certain ones of its detections. For example, based on machine learning etc., the evaluation system may have configured confidence thresholds for automatically categorizing certain detected features as defects, and it may seek confirmation from the POD owner or the evaluation device operator for detections that are at or near that confidence threshold before automatically categorizing such detections.

At operation 1238, the evaluation device 1204 transmits the obtained information to the central server 1208. This may constitute the insurance/warranty claim request accompanied by information required for the settlement of the claim.

At operation 1240, the central server 1208 processes the obtained information. At operation 1242, the central server transmits information based on the obtained information to the third party server 1212. In some embodiments, the formats of the data and interpretations of certain data items may be different between the evaluation system as represented in the central server 1208 and the selected third party service provider. Thus, in such embodiments, the central server may translate between the different formats and/or different interpretations before transmitting the information received from the evaluation device to the third party service provider.

At operation 1244, the third party service provider 1212 processes the incoming request to determine a quote. The third party may use the received information in any manner in generating the quote. In some embodiments, the service interface may specify minimum information requirements and optimal information requirements for the exchange in each direction between the third party service provider and the central server.

At operation 1246, the third part provider transmits the quote to the central servers 1208.

At operation 1248, the central server processes the quote and at operation 1250 transmits a modified quote for the evaluation device. The processing by the central server may include, for example, optimizing the quote. For example, based on machine learning and/or other context-specific optimization techniques, the central server (sometimes in coordination with a remote operator accessing the central server via an internal service interface or a third party service interface) may adjust the quote by suggesting elimination, addition and/or combination of some insurance/warranty items so that related claim can be higher. The processing may also include adjusting the price of the insurance/warranty claim to include a facilitation fee before presentation to the POD owner. By providing standardized diagnostics, possibly using machine learning/AI functions, it is possible for the evaluations systems to be more precise in the diagnostic of the failing components. Also, the diagnostic information may be used to order in advance parts, or provide repair tips or other similar benefits. In some embodiments, the central server may automatically conduct multiple exchanges with the third party service provider using the corresponding service interface.

At operation 1252, the user interacts with the evaluation device to accept the quote. The acceptance of the quote may include user specifically accepting certain portions of the quote and/or rejecting some portions. Such acceptance and/or rejections can be performed, for example, via check boxes or the like displayed on a touchscreen display of the evaluation device. In some embodiments, the acceptance of the quote may require a signature, which the POD owner may provide using a touchscreen or a touchpad of the evaluation device.

At operation 1254, the evaluation device processes the accepted quote, optionally collects the POD, and informs the central server regarding the acceptance and any adjustments made by the POD owner during acceptance and optionally information regarding the collection of the POD. The central server may optionally communicate any relevant information to the third party repair service.

At operations 1256 and 1258, the central servers 1208 process the quote acceptance and communicate with the remote operator as needed.

At operation 1260, the acceptance is communicated from the central servers 1208 to the third party service 1212, and at operation 1262, confirmation and authorization to convey the monetary settlement of the claim is provided by the third party service 1212.

At operation 1264, the central server 1208 communicates payment instructions to the evaluation device 1204. At operation 1266 the evaluation device 1204 interacts with the user to provide the authorized payment.

Figure 13:
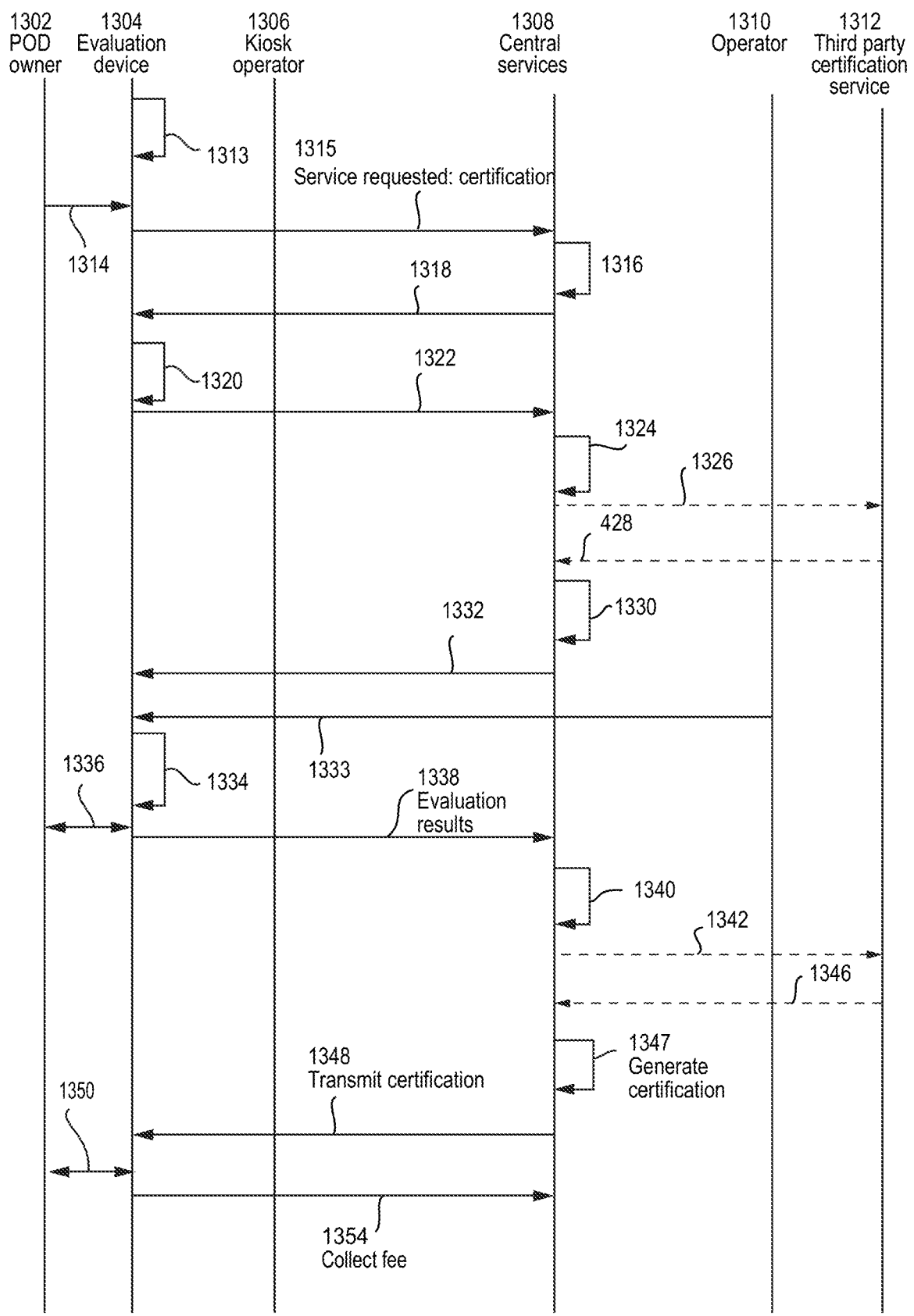
FIG. 13 is a flowchart showing operations associated with obtaining a certification of a POD, according to some example embodiments.

FIG. 13 is a flowchart showing operations associated with obtaining a certification of a POD, according to some example embodiments.

For ease of description, the sequence 1300 is described in relation to an evaluation device such as the kiosk shown in FIG. 2A. However, the same sequence or similar sequences may be performed in relation to other types of evaluation devices, such as, but not limited to FIGS. 2B-2G and 3A-3D.

The illustrated sequence 1300 is shown between the POD owner 1302, evaluation device 1304, evaluation device staff 1306, central servers 1308, remote operator 1310 and third party servers 1312. In some embodiments, the POD owner 1302, evaluation device 1304, evaluation device staff 1306, central servers 1308, remote operator 1310 and third party servers 1312 may be similar to POD owner 120, evaluation device 110, evaluation device staff 122, central servers 104, remote operators 140 and third party servers 107, respectively, described in relation to FIG. 1.

The operations sequence shown in FIG. 13 may be initiated when a POD owner comes within proximity of an evaluation device, such as kiosk 110 in FIG. 1, and the evaluation device, either automatically or upon being provided some input by the POD owner, initiates operations by some activity, such as, for example, an operation 1313 displaying a menu screen of one or more services which may be invoked by the user. In an example embodiment, the displayed menu may include options such as, for example, "Trade in Device", "Repair Services", "Warranty/Insurance Services", "Evaluation Report", and the like. It will be understood that other services may be facilitated by the evaluation device according to some embodiments, and thus the displayed menu may also include such other services.

At operation 1314, the POD owner 1302 selects "Evaluation Report" option from one or more services available on the evaluation device 1304. The POD owner may make this selection using any suitable manner of selection, for example, by clicking on a graphical user interface element with a mouse, touch command or voice command. The menu may be arranged in any of several ways so that the POD owner can select a desired service at an appropriate granularity.

At operation 1315, the evaluation device 1304 transmits a message indicating the requested service (e.g. evaluation report/certification service) to the central server 1308. According to an embodiment, the central server 1308 to one of the servers in central servers 1304 and/or a proxy server that distributes work requests to one or more servers of the central servers 1304. The central server may be structured such that all messages are received at a central node, and then directed to separate nodes based on the type of message and/or type of service. The message may be a standard message type structure that identifies the type of requested service within the message. Optionally, if additional information such as, for example, the device type, has been acquired by the evaluation device, that information too can be included in the message transmitted from the evaluation device to the central server.

At operation 1316, the central server 1308 accesses configuration information based upon information obtained from the message received from the evaluation device at operation 1315. Upon identifying the service or the type of service being requested by the user, the central server may access a database or separate tables in a database based upon the identified service. The accessed configuration information may identify the user and/or device information to be collected from the user.

In some embodiments, at least some of the information to be acquired may be organized and/or stored in a context-specific manner. FIG. 7, for example, describes the use of contexts in certain embodiments.

At operation 1318, the central server 1308 returns information to the evaluation device 1304 to enable obtaining information or additional information from the POD owner 1302. In some embodiments, this information may be transmitted in a single transmission. In some other embodiments, this information may be transmitted separately for each tier of information. At operation 1320, the evaluation device 1304 obtains additional information based on requirements received from the central server at operation 1318. The information to be acquired may include information for uniquely identifying the POD. At operation 1322, the evaluation device 1304 transmits the acquired information to the central server 1308.

At operation 1324, the central server 1308 accesses its configuration information for the requested service to determine an action or, optionally, in order to identify a third party provider for the requested service. The central server 1308 may also use the unique identification information to access previously configured and/or acquired information for the POD.

At operation 1326, the central server 1308 may access an application programming interface for the identified third party provider and request a description of the information that is required for providing the requested service. The central server may provide the third party service provider some of the information already collected such as, for example, type and model of device, a high level description of features/defects, etc.

At optional operation 1328, the requested information that is required for providing the requested service is indicated by the third party service provider 1312 to the central server 1308.

At operation 1330, the central server 1308 may generate a sequence of operations to obtain the information requested by the third party service provider 1312. The information requested by the third party service provider may change due to various factors such as, but not limited to, device type (e.g. smartphone or other POD, smartphone type, etc.), etc. For example, certain service providers may specialize in certain brands or device type or require certain details from evaluation session that may not be relevant to others.

The generated sequence of operations may be a sequence of instructions for any of capturing images of the POD according to certain specifications (e.g. specific angles of view, specific lighting conditions, specific backlight conditions, specific magnification levels, specific focal point adjustments, etc.), capturing video of the POD (e.g. capture video while particular application sequence is being run on the POD displaying to the POD screen, etc.), capturing audio samples (e.g. capture audio while particular application sequence is being run on the POD outputting audio from the POD speakers, capture play back of audio output from the evaluation device and recorded by the POD, etc.), determine certain characteristics using image analysis and/or OCR (e.g. use OCR to determine model and serial number information of the POD, use image analysis detect physical device features such as buttons etc. and/or defects such as cracks/scratches/missing buttons etc.), etc. Some instructions in the sequence may provide for a remote operator to view the POD through a camera or to control/adjust some of the images being captured by moving one or more of the cameras and/or adjusting camera or lighting conditions. In some embodiments the remote operator having real-time access to the evaluation conducted by the evaluation device is via an internal service interface 106, and in some other embodiments the remote operator may be via a third party service interface 107. In the event of a remote operator via a third party service interface, the third party service interface, central server and/or evaluation device may implement security and authentication measures to restrict access by the remote operator to a particular POD and particular controls for that POD.

The sequence of instructions may be generated based on the type of insurance/warranty requested and/or defects identified, and also based on the configuration of the evaluation device (e.g. number and controllability of cameras, features of the evaluation chamber, lighting capabilities, etc.). Moreover, the sequence of instructions may be generated in a manner that is context-specific to the service and the third party service provider. For example, the generated rules may be derived from preconfigured rule templates stored for each context or group of contexts. As noted above, contexts are described further in relation to FIG. 7 etc. below.

At operation 1332, in accordance with the generated sequence of operations, the central server controls the evaluation device. This control may either be commanded on an instruction-by-instruction basis from the central server, or, in some embodiments, the sequence of instructions can be transmitted to the evaluation device which then locally commands the progressing through the sequence.

At operation 1334, the evaluation device 1304 performs the evaluation of the POD in accordance with the instruction sequence and/or commands received at operation 1330 from the central server and/or a remote operator.

At operations 1336, the user-evaluation device interactions take place as needed for obtaining the information. The interactions may enable the user to enter information regarding the POD owner, and the POD. The interactions may also enable the evaluation device to obtain POD owner's confirmation regarding automatically detected scratches/cracks and physical or functional defects of the POD. For example, during the execution of the sequence of instructions to conduct the evaluation, the evaluation system may seek confirmation from the POD owner 1302 or the evaluation device operator 1306 to confirm certain ones of its detections. For example, based on machine learning etc., the evaluation system may have configured confidence thresholds for automatically categorizing certain detected features as defects, and it may seek confirmation from the POD owner or the evaluation device operator for detections that are at or near that confidence threshold before automatically categorizing such detections.

At operation 1338, the evaluation device 1304 transmits the obtained information to the central server 1308. This may constitute the insurance/warranty claim request accompanied by information required for the settlement of the claim.

At operation 1340, the central server 1308 processes the obtained information. At operation 1342, the central server transmits information based on the obtained information to the third party server 1312. In some embodiments, the formats of the data and interpretations of certain data items may be different between the evaluation system as represented in the central server 1308 and the selected third party service provider. Thus, in such embodiments, the central server may translate between the different formats and/or different interpretations before transmitting the information received from the evaluation device to the third party service provider.

At operation 1346, optionally, the third party provider transmits the quote to the central servers 1308.

At operation 1347, the central server generates the evaluation report and/or certification. For example, based on machine learning and/or other context-specific optimization techniques, the central server (sometimes in coordination with a remote operator accessing the central server via an internal service interface or a third party service interface) may adjust the quote by suggesting elimination, addition and/or combination of some insurance/warranty items so that related claim can be higher. The processing may also include adjusting the price of the insurance/warranty claim to include a facilitation fee before presentation to the POD owner. In some embodiments, the central server may automatically conduct multiple exchanges with the third party service provider using the corresponding service interface.

At operation 1348, the evaluation report and/or certification information and payment requirements are communicated to the evaluation device 1304.

At operation 1350, interaction between the evaluation device and the user occurs to communicate the evaluation report and/or certification and to receive the associated payment. At operation 1352, the user interacts with the evaluation device to accept the quote. The acceptance of the quote may include user specifically accepting certain portions of the evaluation report and/or rejecting some portions. Such acceptance and/or rejections can be performed, for example, via check boxes or the like displayed on a touchscreen display of the evaluation device. In some embodiments, the acceptance of the report/certification may require a signature, which the POD owner may provide using a touchscreen or a touchpad of the evaluation device. Acceptance of the report may also include the POD owner submitting payment. Payment may be made by any mechanism such as by a credit card reader incorporated into the evaluation device 1304. At operation 1354, the evaluation device 1304 communicates information regarding the payment received to the central server 1308.

The certification service provided by evaluation devices in accordance with certain embodiments can be used in various use cases. In a first use case, a POD owner desires to sell his smartphone and places an advertisement on an online marketplace. A buyer locates the POD owner via the advertisement, and agree on a price. The POD owner and buyer then meet at a point of presence with an evaluation device, in order to have a full diagnostic performed on the POD. The POD owner gets the POD evaluated/certified for a fee by a process such as process 1300. After the certification, the buyer takes possession of the POD. At this point, the buyer may be offered insurance by the evaluation device for the POD using a process such as process 1100.

In a second use case, a POD owner walks into a point of presence having an evaluation device, and gets the POD certified by the evaluation device for a fee using a process such as process 1300. The evaluation device may then offer, for an additional fee, either a link to a microsite or an advertisement placement in an online marketplace to publicize the POD being for sale. Alternatively, the POD owner may place such an advertisement himself. In either case, on the merits of the evaluation device's certification, the POD can be advertised as being certified by a recognized certifying entity. The buyer purchases the POD through the advertisement. The buyer may be offered insurance by the evaluation device for the POD using a process such as process 1100.

Figure 14:
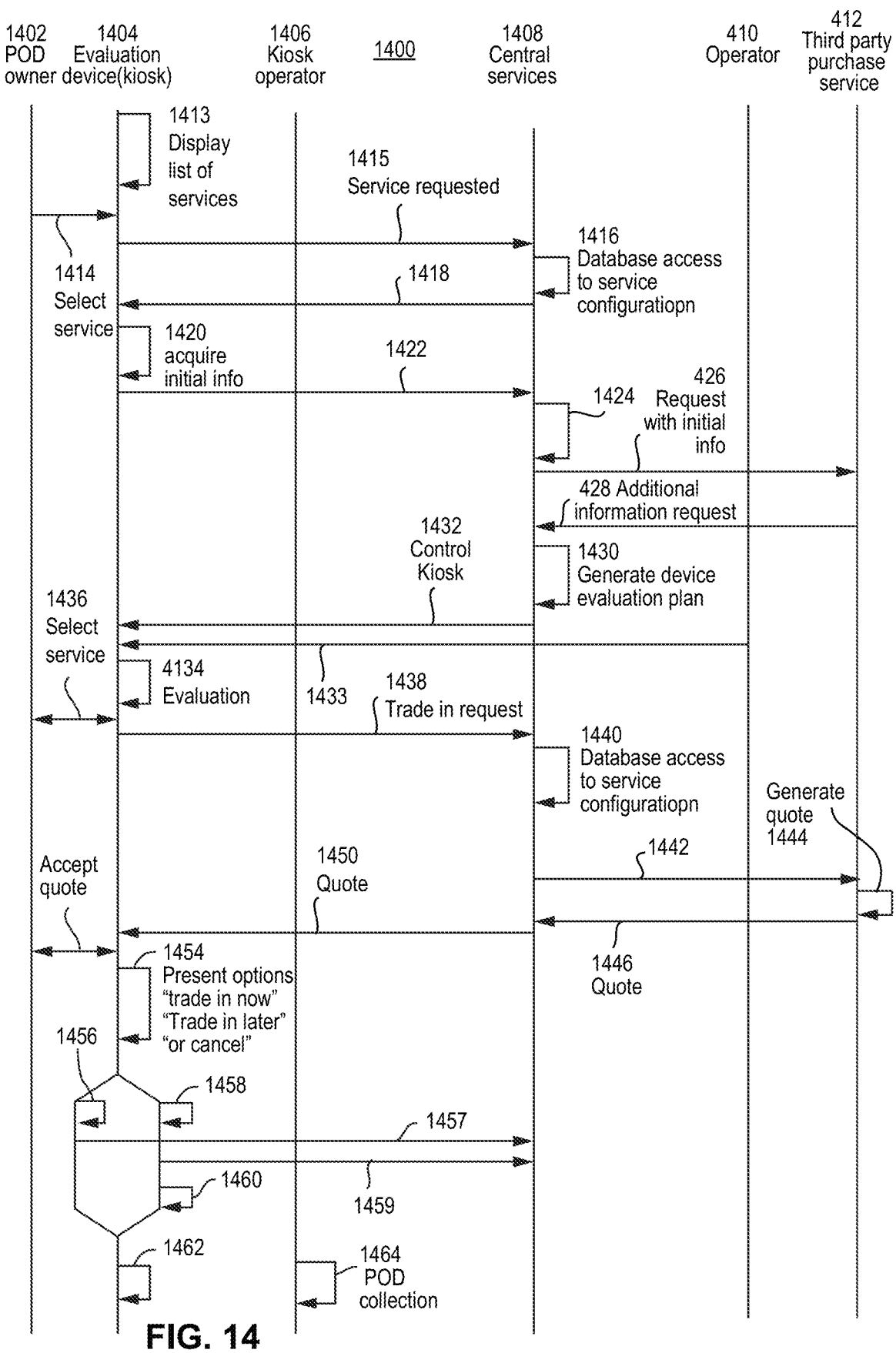
FIG. 14 is a flowchart showing operations associated with providing an option to obtain an evaluation of a POD, and at a later time to provide the POD for collection, according to some example embodiments.

FIG. 14 illustrates a flowchart of a sequence 1400 of interactions and operations associated in using an evaluation device in a system such as that shown in FIG. 1, according to some embodiments. The sequence 1400 of interactions illustrate an example use of an evaluation device by a user of a POD to obtain purchase quotes for the POD and, optionally, to submit the POD for collection in association with the same or different evaluation device.

According to some embodiments, sequence 1400 may be used to provide an estimated purchase price and/or promise of a future purchase for a POD. Evaluation devices 110 of the system 100 can be used to provide such estimated purchase prices and/or promise of future purchase. After a POD is evaluated and a purchase price determined, the POD owner can be provided with the opportunity to either immediately submit that POD for collection, or to retrieve the POD from the evaluation device and to submit it for collection to the same or different evaluation device at a subsequent time.

In example embodiments, the evaluation system is capable of determining a purchase price of POD based on evaluation data taken by one or more of a diagnostic application executing on the POD, evaluation in the evaluation device, and/or visual inspection by a remote operator and/or evaluation device local staff. In some embodiments, the evaluation data from a POD's evaluation is stored as attributes in the POD's evaluation session and a purchase pricing function or agent is enabled, by associating market prices and attribute information and/or applying pricing rules to determine a purchase price with high accuracy.

In an embodiment, the evaluation system may, after the evaluation, offer the POD owner the option to either elect for the POD to be collected as is, or to retrieve it and have the option to subsequently submit it for collection for the currently determined price. In some embodiments after the evaluation system has determined a purchase price, an offer to purchase may be presented on screen and upon accepting of the offer by the POD owner, the POD may be secured in a vault until picked up for eventual collection. Alternatively, after accepting the purchase price offered on the screen, the POD owner may elect to retrieve the POD from the evaluation device and have the option to subsequently submit it for collection for the currently determined price. If this option is selected, the evaluation system may print a receipt/coupon that the POD owner can submit subsequently either to the same or different evaluation device along with the POD for collection.

Moreover, for ease of description, the sequence 1400 is described in relation to an evaluation device such as the evaluation device shown in FIG. 2A. However, the same sequence or similar sequences may be performed in relation to other types of evaluation devices, such as, but not limited to FIGS. 2B-2G and 3A-3D.

The illustrated sequence 1400 is shown between the POD owner 1402, evaluation device 1404, evaluation device staff 1406, central servers 1408, remote operator 1410, and third party servers 1412. In some embodiments, the POD owner 1402, evaluation device 1404, evaluation device staff 1406, central servers 1408, remote operators 1410 and third party servers 1412 may be similar to POD owner 120, evaluation device 110, evaluation device staff 122, central servers 104, remote operators 140 and third party servers 107, respectively.

The operations sequence shown in FIG. 14 may be initiated when a POD owner comes within proximity of an evaluation device, such as evaluation device 110 in FIG. 1, and the evaluation device, either automatically or upon being provided some input by the POD owner, initiates operations by some activity, such as, for example, an operation 1413 displaying a menu screen of one or more services which may be invoked by the user. Operations 1413-1414 may be similar to operations 413-414 described in relation to FIG. 4, with the POD owner selecting the option to "Trade in Device" in option 1414.

Operations 1415, 1416, 1418, 1420 and 1420 may be similar to operations 415, 416, 418, 420 and 420, respectively, described in relation to FIG. 4, with the evaluation device informing the central server 1408 that a POD is submitted for possible trade in (instead of request for repair described in relation to FIG. 4), and the server requesting additional information as needed.

At operation 1424, if a third party service has not been identified already, the central server 1408 accesses its configuration information for the requested service in order to identify a third party provider for the requested service.

At operation 1426, the central server 1408 may access a service interface for the identified third party service provider and request a description of the information that is required for providing the requested service. The central server may provide the third party service provider some of the information already collected such as, for example, type and model of device, a high level description of the repair requirements, etc.

At operation 1428, the requested information that is required for providing the requested service is indicated by the third party service provider 1412 to the central server 1408.

At operation 1430, the central server 1408 may generate a sequence of operations to obtain the information requested by the third party service provider 1412. The information requested by the third party service provider may change due to various factors such as, but not limited to, device type (e.g. smartphone or other POD, smartphone type, etc.), purchase time requirements, type of damage (e.g. screen damage, water damage, button damage, etc.), third party service provider categorization of defects (e.g. major screen cracks, mirror screen cracks, etc.), etc. For example, a first service provider may purchase only a subset of make/models, for example Apple™ branded phones. As another example, a second service provider may only purchase phones not older than 24 months from manufacturing date. As a further example, a third service provider, might only purchase smartphones with no screen damage and/or without any defects categorized as major defects.

The generated sequence of operations may be a sequence of instructions for any of capturing images of the POD according to certain specifications (e.g. specific angles of view, specific lighting conditions, specific backlight conditions, specific magnification levels, specific focal point adjustments, etc.), capturing video of the POD (e.g. capture video while particular application sequence is being run on the POD displaying to the POD screen, etc.), capturing audio samples (e.g. capture audio while particular application sequence is being run on the POD outputting audio from the POD speakers, capture play back of audio output from the evaluation device and recorded by the POD, etc.), determine certain characteristics using image analysis and/or OCR (e.g. use OCR to determine model and serial number information of the POD, use image analysis detect physical device features such as buttons etc. and/or defects such as cracks/scratches/missing buttons etc.), etc. Some instructions in the sequence may provide for a remote operator to view the POD through a camera or to control/adjust some of the images being captured by moving one or more of the cameras and/or adjusting camera or lighting conditions. In some embodiments the remote operator having real-time access to the evaluation conducted by the evaluation device is via an internal service interface 106, and in some other embodiments the remote operator may be via a third party service interface 107. In the event of a remote operator via a third party service interface, the third party service interface, central server and/or evaluation device may implement security and authentication measures to restrict access by the remote operator to a particular POD and particular controls for that POD. Another sequence of instruction may create a visual challenge-response, to authenticate that the device being inspected is the device associated with the other evaluation information that have been communicated or that will be communicated by the diagnostic application. Such visual challenge-response may be necessary to avoid fraud where, for example, a simple QR identification is not sufficient because it could be easily reproduced (e.g. by taking a screen shot) and transmitted to another device, possibly with internal malfunctions or other problems. By using a visual-response challenge when the POD is within the inspection area, the evaluation system ensures the authenticity of the device as well as the integrity of the corresponding retrieved attributes.

The sequence of instructions may be generated based on the already known information regarding the POD, third party service provider, and/or type of defects identified, and also based on the configuration of the evaluation device (e.g. number and controllability of cameras, features of the evaluation chamber, lighting capabilities, etc.). Moreover, the sequence of instructions may be generated in a manner that is context-specific to the service and the third party service provider. For example, the generated rules may be derived from preconfigured rule templates stored for each context or group of contexts. As noted above, contexts are described further in relation to FIG. 7 etc. below. The evaluation system may behave differently depending on the context of the service selected or device being inspected.

Operations 1432, 1434, 1436, 1438, 1440 and 1442 may be similar to operations 432, 434, 436, 438, 440 and 442 of FIG. 4, with the operations in this process being directed to purchase of the POD instead of repair as in FIG. 4.

At operation 1444, the third party service provider 1412 processes the incoming request to determine a quote for purchase price. The third party may use the received information in any manner in generating the quote. Several third party services may be solicited by the evaluation device to receive a multiplicity of quotations. In some embodiments, the service interface may specify minimum information requirements and optimal information requirements for the exchange in each direction between the third party service provider and the central server.

At operation 1446, the third party server transmits the third party service provider's generated quote for the requested repair.

At operation 1448, the central server processes the quote and at operation 450 transmits a modified quote for the evaluation device. The processing by the central server may include, for example, optimizing the quote. For example, based on machine learning and/or other context-specific optimization techniques, the central server (sometimes in coordination with a remote operator accessing the central server via an internal service interface or a third party service interface) may adjust the quote. The processing may also include adjusting the price of the purchase to include a facilitation fee before presentation to the POD owner. The evaluation devices provide value to consumers and third party services by facilitating them access to each other and standardizing the information communicated, and storing such information for later retrieval or analysis. In some embodiments, the central server may automatically conduct multiple exchanges with the third party service provider using the corresponding service interface.

At operation 1452, the user interacts with the evaluation device to accept the quote. The acceptance of the quote may include user specifically accepting certain portions of the quote and/or rejecting some portions. Such acceptance and/or rejections can be performed, for example, via check boxes or the like displayed on a touchscreen display of the evaluation device. In some embodiments, the acceptance of the quote may require a signature, which the POD owner may provide using a touchscreen or a touchpad of the evaluation device.

At operation 1454, the evaluation device processes the accepted quote, and at operation 1455 informs the central server regarding the acceptance and any adjustments made by the POD owner during acceptance and optionally information regarding the collection of the POD. The central server may optionally communicate any relevant information to the third party purchase service.

At operation 1454, the evaluation device presents the POD owner with the choice to either cancel the evaluation, submit the evaluated PPOD for collection now, or to retrieve the POD from the evaluation device to subsequently submit it for collection for the same quoted price.

Operation 1456 may include, upon receiving consent from the POD owner via a user interface of the evaluation device at operation 1454, collecting the POD at the evaluation device. In some embodiments, the POD may be attached with a label associating the POD with the information regarding it stored in the evaluation system. The label may be generated by the evaluation device based on collected information and may be either automatically attached or manually attached by the POD owner or evaluation device operator. The POD is then deposited in a bin or vault of the evaluation device (as noted above in relation to FIGS. 2 and 3, the vault configurations and the manner of securing collected PODs may be different for the various types of evaluation devices used in embodiments). The evaluation device or the central server may notify the evaluation device operator regarding the collected POD. The evaluation device may also notify the central server, so that the central server may update its information regarding the PODs collected throughout its network of evaluation devices. For example, FIG. 10 illustrates a view displaying information regarding collected PODs at respective evaluation devices in the network of evaluation devices of the evaluation system. At operation 1457, the evaluation device and central servers synchronize and coordinate regarding the collected POD. The payment for the evaluated POD may be made to the POD owner through the evaluation device (e.g. a printed or electronically transmitted coupon or gift card etc.) or any other technique.

If at operation 1454 the POD owner selected to submit the evaluated POD for collection later, then at operation 1458, the evaluation device saves the evaluation information and other information acquired and/or determined regarding the POD or POD owner. The saved information may be saved to the evaluation device and/or to the central server(s). The evaluation device and/or evaluation system may also provide the POD owner a promise to purchase the POD at a later time.

The evaluation device may allow the POD owner to retrieve the POD in order to transfer data and possibly wipe its personal data, for example by resetting to factory defaults or using a function or device to ensure that no personal data remains on the device. In such embodiment, the promise to buy the POD in the evaluated condition can have a time limit. The evaluation device may, after having completed the evaluation (or in some instances a pre-evaluation), issues a coupon containing a redeemable amount equal to the promise so that it can be scanned by a point of sale device, for example for reducing the purchase price of a new device. After the POD data has been transferred or wiped, the evaluation device expects the POD to be reinserted in its evaluation area or vault for secure storing. The period where the coupon has been issued and the period where the device is returned to the vault poses a risk to the evaluation system that the device never gets deposited back and conflicts may arise. A variant of this embodiment uses an identifier of a sales person associatable with the transaction and may automatically or by using human agents reach out to the sales person after a certain time delay to ensure the promised phone is returned. For example, the evaluation system may send a text message to the salesperson reminding that the evaluation device is still waiting to receive the POD Apple iPhone X having the IMEI 1234567890. If the POD is never received, the system may generate an exception report for example by emailing a manager associated with the location to notify of the situation. In some embodiments, the POD owner might not resubmit the POD for collection at the save evaluation device. Some embodiments provide a returning phone process which may be applicable, and adaptable, to cover: loaner phone; and return the covered POD after receiving the replacement. At operation 1459, the evaluation device and the central servers synchronize/coordinate regarding the POD and the promise to purchase for the POD.

In the loaner phone process according to an embodiment, an example journey goes as follow: the owner of a protected device goes to a store with an evaluation system after some damaged has been observed. In this instance, the damage may prevent usage of the device (broken). The store, which may provide repair services or use a third company for repairs, may provide the owner with a "loaner phone". In such embodiments, the evaluation system is used not only to validate the claim validity as described herein, but also to evaluate the condition of the loaner phone. By taking an evaluation point at the beginning of the loan process, the evaluation system can memorize by storing the evaluation point information in what precise state and what precise defects the loaner phone contains at the point. At a later moment, once a replacement device is ready or the insured device is repaired, the loaner phone is returned and the evaluation system is used again, this time to ensure that no damage occurred during the loan process and that the returned POD (e.g. the loaner phone) is indeed the same device originally borrowed, ensuring, for example, it has not been swapped by a lower value device. Again by using the techniques described herein, comparing temporal information taken from two evaluation points, the evaluation system is able to determine a fault and initiate a return fault process, for example, by providing information to the store, to the insurance, to a call center, or make decision, for example by charging additional fees should the loaner phone be damaged, swapped or not returned.

Accordingly, in an embodiment, returning a phone process for loaner could be protected by an evaluation system as described above and comprising a first evaluation point, an interface guiding a user (owner) returning a device, and wherein the evaluation device performs a second evaluation point at the time of return of the loaner device and performs a temporal verification of the two evaluation points to validate if the loaner device was damaged or suffered excessive wear and tear. In a further embodiment, wherein in reaction to a detected new damage or excessive wear and tear, the evaluation system initiate a return fault process;

In a process for returning a covered device after receiving the replacement, and example sequence of operations may be as follows. The owner of a protected POD has new claimable damages. In this instance, the damage may not prevent usage of the device but the protection plan includes advanced replacement, which is, a substitute POD will be given to the owner at the store or mailed to. The owner is allowed to keep the first POD for some time, for example during the time the device arrives, or simply giving the owner sufficient time to drop the POD at a known drop-off point that has an evaluation device with a secured vault. The evaluation system can therefore be used once the owner is ready to return the originally protected POD (damaged POD). Depending on the results of the temporal comparison of the 2 evaluation points, the evaluation system may react accordingly. For example, if the first evaluation point is the purchase of an insurance policy and the second evaluation point is the return of the POD, because the claim process has been possibly performed online or through a call center, the evaluation system may validate that the claimed damage was covered. Should the damage not be covered, for example due to excessive wear and tear, a pre-existing condition or the presence of other conditions, the evaluation system will initiate a return fault process, which may for example ask for additional fees, or notify the user that additional fees will be charged, or connect the user to a call-center operator, or do anything deemed appropriate.

Accordingly, in an embodiment, returning a phone process for loaner could be protected by an evaluation system as described above, and comprising an interface guiding a user (owner) returning a device wherein the evaluation device performs an evaluation of the returned device and validate against the previous evaluation point information whether the claimed damaged was covered and initiate a return fault process.

At operation 1460, the evaluation device receives the POD in its evaluation area. Operation 1460 may not occurs immediately following the time at which this particular POD was evaluated and issued a coupon as described in relation to operation 1454. The receiving of the POD in the evaluation area may be facilitated by the evaluation device after the POD owner indicates that the POD is being resubmitted. Alternatively or additionally, the evaluation device might itself identify the POD as being resubmitted for collection upon associating the POD with a unique identifier during evaluation of it, and retrieving the information previously stored in relation to that unique identifier.

It should be noted that the POD owner can, alternatively, do the resubmission of the POD at an evaluation device other than the evaluation device, and the other evaluation device can retrieve the evaluation information previously stored when the POD was evaluated/pre-evaluated.

The information that is associated with the resubmitted POD can be used to obtain the promised purchase price, the condition and/or defects associated with the POD at the time of the evaluation/pre-evaluation, etc. from the central servers where were saved upon the first evaluation (e.g. at operations 1434). At operation 1461, the evaluation device and the central servers synchronize/coordinate regarding the reevaluated POD and the promise to purchase for the POD.

At operation 1462, a reevaluation of the POD may be performed in a manner similar to or in a less rigorous manner to confirm that the POD is the same POD that was evaluated, and the POD is indeed in the same or substantially similar condition as it was when the promise to purchase was made. In some embodiments, the evaluation system may dynamically determine a sequence of actions to be performed in the reevaluation to identify the resubmitted POD as the same POD as the one on which the evaluation/pre-evaluation was performed, and that the resubmitted POD is in the same or substantially the same condition as it was at the time of the evaluation/pre-evaluation. If any of the information such the identity of the POD, the identity of the POD owner, the condition of the POD etc., cannot be verified to a high level (e.g. a configured threshold) of confidence, then the transaction may be cancelled and the POD returned from the evaluation device to the POD owner. Otherwise, the POD is accepted for collection and is stored in the bin/vault of the evaluation device in a manner similar to that described in relation to operation 1456 above. At operation 1459, the evaluation device and the central servers synchronize/coordinate regarding the reevaluation POD and the promise to purchase for the POD. The payment for the revaluated POD may be made to the POD owner through the evaluation device (e.g. a printed or electronically transmitted coupon or gift card etc.) or any other technique.

Subsequently, at operation 1464, the evaluation device operator 1406 (or other authorized collector) may securely access the vault of the evaluation device and send the POD for repair. In some embodiments, information about the POD collected during the evaluation, information regarding the POD owner etc., may be included with the POD sent for repair. In some embodiments, a diagnostic report, such as, for example, the report shown in FIG. 9 may be included with the POD (or electronically transmitted) to the repair entity.

Figure 15A:
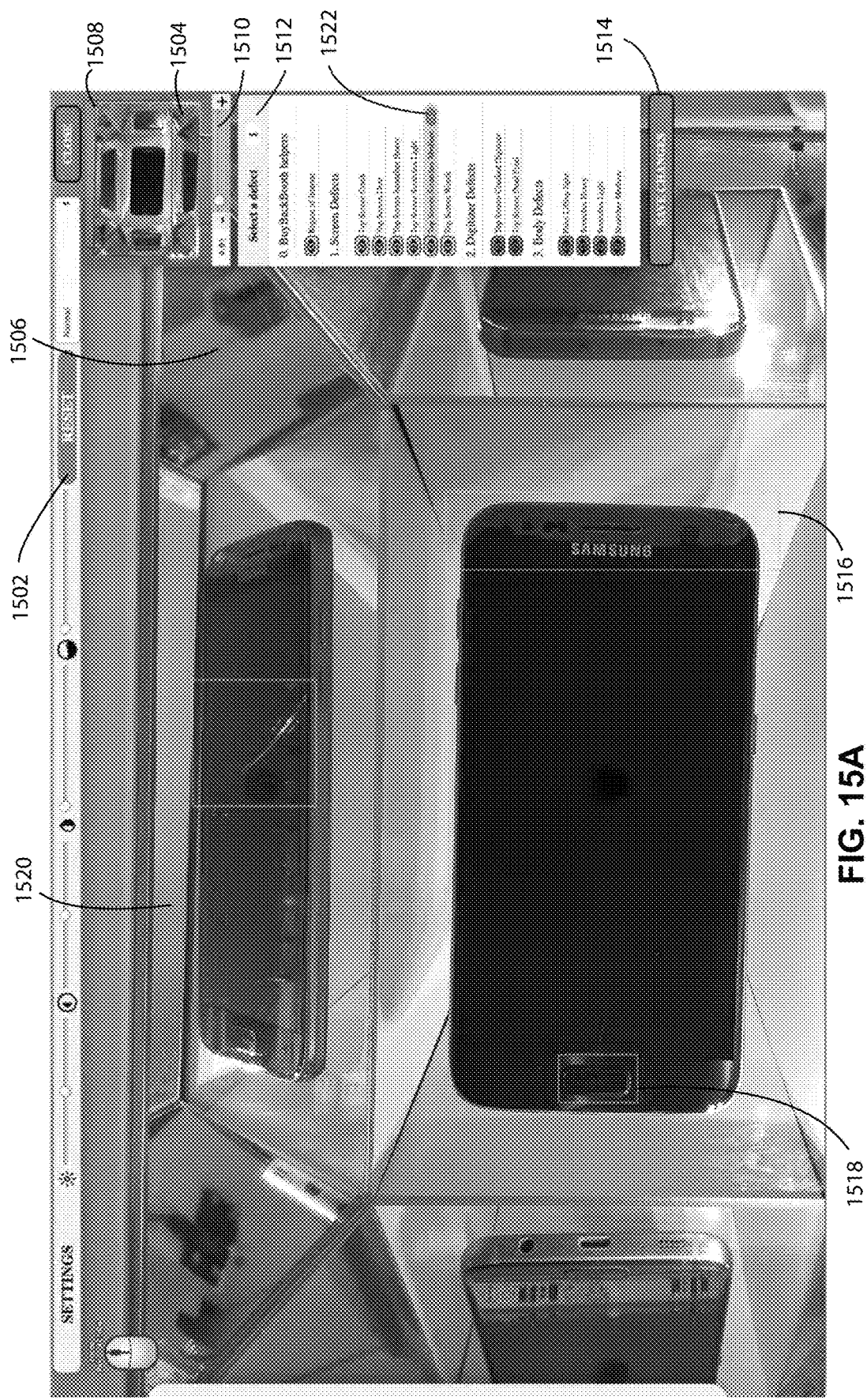
FIGS. 15A and 15B (collectively FIG. 15) show example evaluation images that are available for operator viewing, according to some example embodiments.
Figure 15B:

FIGS. 15A and 15B (collectively FIG. 15) show example evaluation images that are available for operator viewing, according to some example embodiments. The screen displays 1502 and 1522 show images of a POD that is viewed through a camera of an evaluation device and includes the POD as directly viewed by the camera, and also the reflected images of the POD from the mirrors arranged in the evaluation area. A thumbnail image 1508 on the screen may show which portion 1508 of a view is being zoomed in and shown in the main area 1508 of the display. One or more controls 1410 may allow for controlling zoom levels and the like. A scrollable list 1512 may descriptively identify the defects currently associated with the POD. The list may identify the defects in categories such as for example screen defects, digitizer defects, body defects, etc. Some of the defects may be identified on the images such as that shown with defects 1516, 1518 and 1520.

The defects identified on the main display area may be responsive to a selection of a list item 1522 from the list 1512. For example, screen display 1502 shows medium level top screen scratches as selected in the list. In the screen display 1522 shown in FIG. 15B, cracks on the top screen are shown identified in the main display area in response to the selection in the list 1512.

Figure 16A:
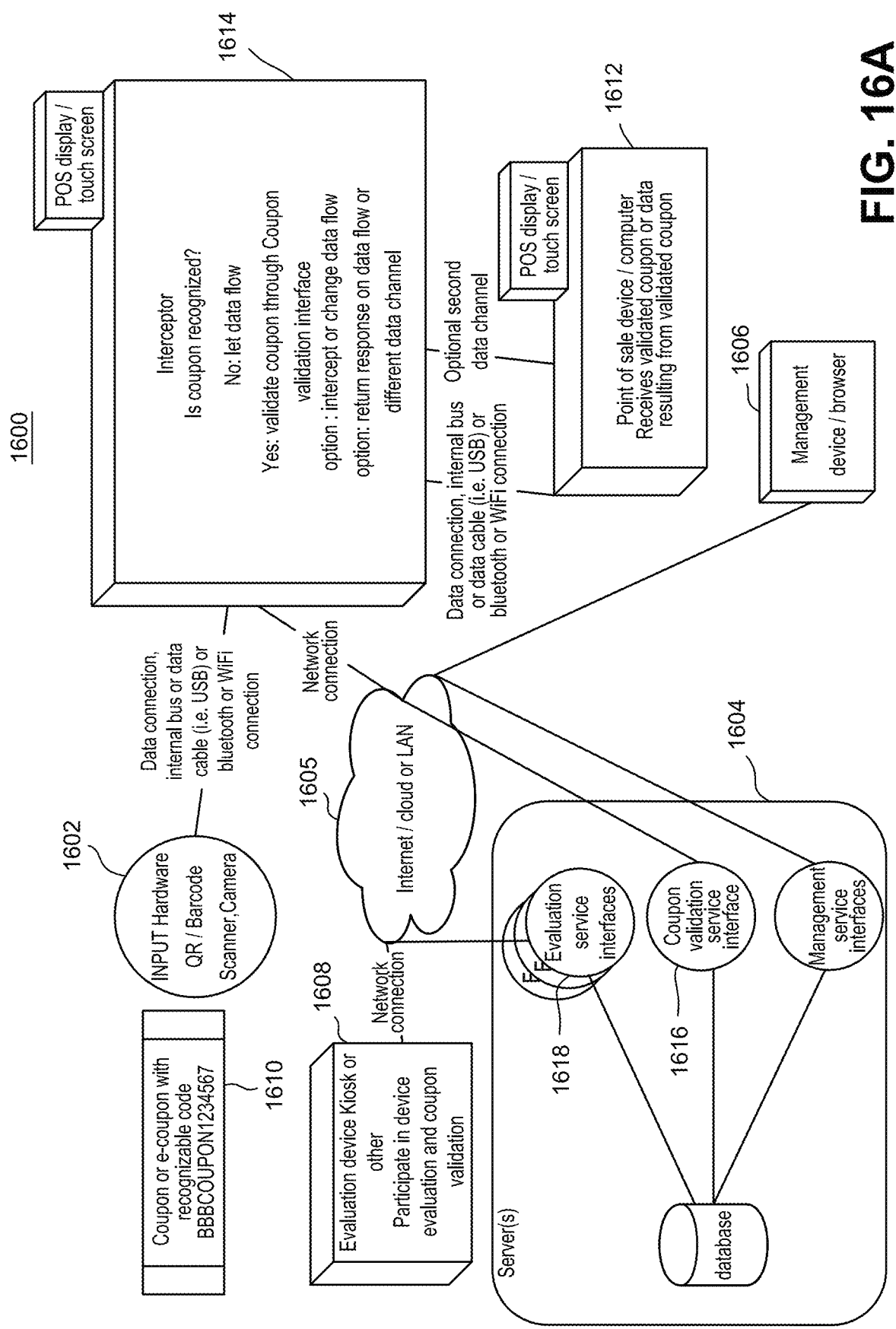
FIG. 16A, FIG. 16B and FIG. 16C (collectively FIG. 16) illustrate coupon validation according to some example embodiments.
Figure 16B:
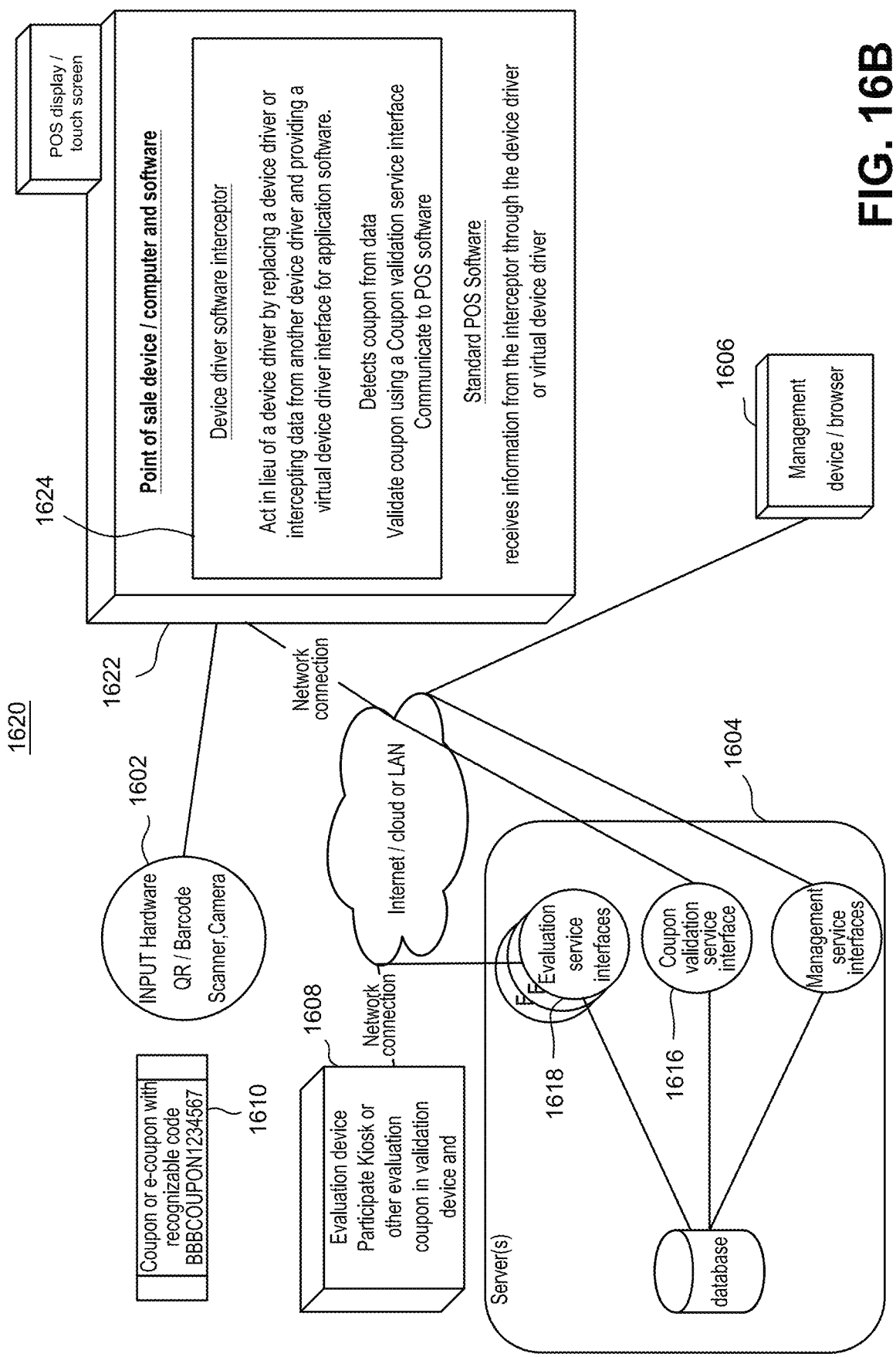
Figure 16C:
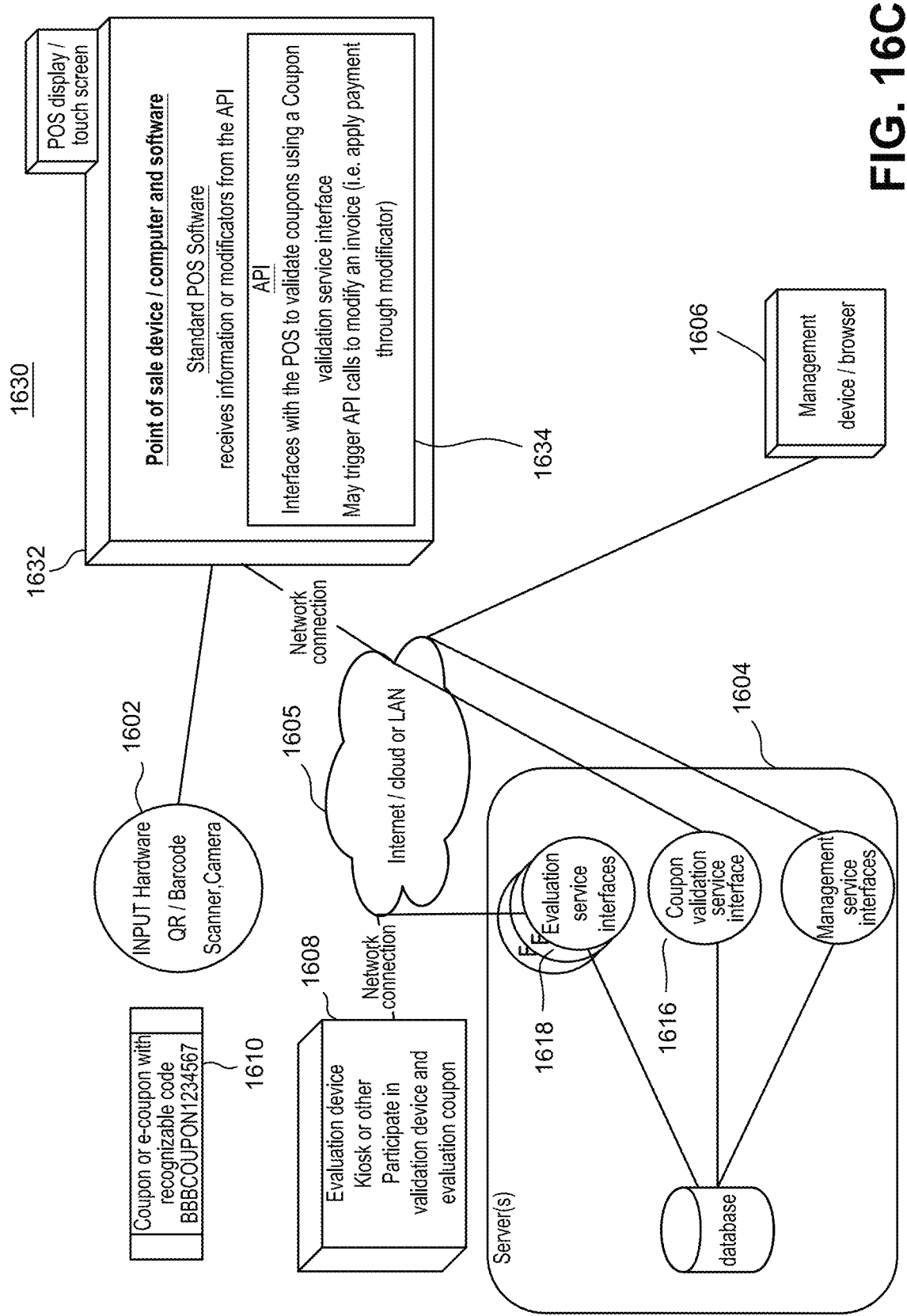

FIGS. 16A-C illustrate coupon validation according to some example embodiments. FIG. 16A illustrates a system 1600 in which coupon validation is performed using a hardware interceptor. FIG. 16B illustrates a system 1620 in which coupon validation is performed using a software interceptor. FIG. 16C illustrates a system 1630 in which coupon validation is performed using an API-based validator.

Systems emitting coupons, e-coupons, vouchers, gifts cards and the like (collectively referred to as "coupons" 1610) typically have a unique code to validate their authenticity for example using a remote server API request to validate that the coupon has not been previously redeemed, or that a balance exists or not, or that a coupon/card has sufficient funds. Such systems are widely described. In the case where a coupon is printed for example using an embodiment described in this document, the coupon will contain such code, preferably in the form of a barcode, RFID code, QR code or optically recognizable code. This code is preferably unique and may contain a monetary value that is interpretable by the POS (point of sale) system of the location, so that it is applicable against a purchase. The POS system may use this code to validate using a service interface of the evaluation system the validity and/or the sufficient fundings associated with the coupon. Alternatively, the coupon code does not contain a monetary value in itself and such value is returned as a response to a call to the service interface of the evaluation system.

In an example embodiment used in conjunction with a POS system, the POS system may not have the programmed functionalities to recognize the evaluation system's coupons, in other words, it may not be integrated with the evaluation system and has no knowledge about the evaluation system or its service interface capable of validating a coupon code. However, the POS may have "Payment methods" configurable as a built-in function, for example used to configure the various payments methods made available to location staff, such as cash, credit card, debit card, etc. These configuration options may allow a location (e.g. POS location) to configure its own gift-card or similar payment methods. By leveraging this functionality, some embodiments, circumvent the lack of built-in integration at the POS. The POS may be configured in a way to accept a "Payment Method", similar to a "gift card" configuration, and that configuration may preferably be named with a name associatable with the evaluation system's program, for example, using its trademark (i.e. BuyBack Booth trade-in payment method). The payment methods of a POS facilitates all invoices to be fully paid, or paid using various methods (even partial payments) and allow for detailed accounting. However, such systems may not be capable to validate the authenticity of the coupon's unique code, query a balance or value.

Typical payments of protection plans may be envisioned as monthly recurring payments. One would rarely "pay up front" a 99$ protection fee for a 200$ phone. With respect to the payment process, embodiments may provide for recurring payments and/or payment process completed on the insured phone.

An example embodiment may facilitate the payment of a protection plan (for insurance, warranty or other) by providing recurring payment options, such as, for example, monthly payments, that can be taken automatically on a payment method associated or associable with the owner, such as a credit or debit card, bank account, paypal account, account ID (such as Apple ID), mobile methods embedded or not in the application (such as Apple wallet, etc.), bitcoin or other recognized payment methods having the ability, through services interfaces, to be used as subscription based models or recurring payments.

In an example embodiment providing monthly payment options, a typical process may include a first fee occurring for an owner performing an evaluation of a POD/device on an evaluation device or system. Embodiments may also include, additionally or alternatively, any of: selection of an insurance plan and possibly insurance options or coverage, for example using an evaluation device or on one of the POD/device human interface, such as, for example, the touch screen, or online using any connected device; selection of payment information, which may include payment method, card or account number, email, or any combination of information sufficient to conclude or authorize a payment process or, ideally recurring payment processes; use of service interface to authorize or conclude such payment; and in some embodiments, either the storage of sufficient information or associated information (such as a token from a payment entity, such as a payment system, provider or processor) so that the evaluation system is capable to conclude, or demand frequent recurring payments, such as monthly; or, alternatively, using a managed recurring payment service, relying on the payment entity (system, provider or processor) to continue the recurring payment plan by providing the necessary information typically through service interfaces.

Payment methods may also be offered for deductible fees during claim process. In an embodiment providing a claim process service for protection plans, a deductible fee may be required to proceed with the claim, as dictated by information related to the protection plan covering the device. Such fees may vary depending on the claimed defects and can be paid in a variety of ways as described above, including directly on the associated account (credit card, bank, PayPal, etc.), by mobile payments, by other on location payment means, including through payment means independent of the evaluation device, such as the store's payment means.

An example evaluation system offering monthly protection plans (e.g. insurance/warranty), may include wherein the evaluation system can capture using any human interface connected directly or in communication with it, payment information from the (user/owner) and, transmitting using a service interface at least a partial subset of the payment information to a payment entity, for establishing a managed recurring payment request or several recurring payment requests.

In an example embodiment used in conjunction with a POS system, an integration mechanism is a software or hardware component (the "POS integration component") that is connected at some location between ("in between") the physical coupon reader (which can be a bar code scanner, a QR code capable scanner, an RFID scanner or a camera for optical recognition) and the higher level software providing the processing/display capabilities of the POS. The POS integration component "listens" by means of being physically or logically connected to, or intercepting the data being exchanged or transmitted from the physical coupon reader to the higher level POS software, and, when a computer recognizable subset of the listened data is identified as a code from the evaluation system, the POS integration component is capable to use a service interface which may be located on the evaluation device itself or elsewhere the evaluation system (e.g. in a server of the control system), through the use of network communication, and can, using the software interface, validate the authenticity, query a balance, redeem a balance associated with the coupon code.

The example embodiments may use, for example, as means to distinguish and recognize the presence of a coupon from the listened or observed data, a series of characters from a data stream. For example, the system may be configured with one or more such unique or substantially unique series of characters to be detected in the data stream when the data is read from a hardware barcode, QR code scanner or RFID scanner, or computer vision. The system may be configured to detect one or more unique or substantially unique optically recognizable patterns or characters, when the data is an image or video data taken from a digital camera.

Some embodiments that intercept data may prevent the code from being transmitted to the higher level POS software until and if the validation process is successful. For example with an embodiment using BBBCoupon #123456789, upon recognizing part of the data (BBBCoupon) as an evaluation system coupon, stop the transmission to the higher level POS software, initiates the validation sequence with the service interface and, if the validation sequence was successful, sends information to the higher-level POS software which maybe the coupon, or for enhanced security an alternate coupon demonstrating that the coupon was redeemed.

In a typical embodiments using hardware integration component, the hardware component will be connected, for example using USB connectors, to the POS hardware on one end, and to the hardware scanner, such as the barcode reader, on the other end, and the component will be programmed to act as a communication relay capable of intercepting, blocking, reacting to or changing part of the data in response to the detection of a coupon.

In some example embodiments using software integration component, the software component may be for example a device driver, or pseudo-device driver, acting in lieu of the driver controlling the hardware scanner, such as a barcode reader or camera, and may act either as a logical communication relay capable of intercepting, blocking, reacting to or changing part of the data in response to the detection of a coupon.

FIGS. 16A-C each shows a system in which a coupon reader device 1602 is configured to read a coupon 1610. The coupon reader device 1602 may be any of a barcode/QR code scanner, camera or other input device capable of reading a code and/or other information that is/are shown and/or encoded on the coupon 1610. The code and/or other information read from the coupon is then sent from the POS, over a network 1605 to a server system 1604. The server system 1604 may provide a coupon validation service interface 1616, and the POS may use an published API to access that coupon validation service interface in order to validate the coupon. A management device/browser 1606 may provide a means by which an operator or other administrator can configured the server system in relation to coupons and coupon validation information. An evaluation device (e.g. kiosk) 1608, connected via an evaluation service interface 1618 to the server system 1604, may participate in device evaluation and coupon validation.

In the system 1600 shown in FIG. 16A, the POS is equipped with a hardware interceptor 1614 for coupon validation. The hardware interceptor 1614 can be located anywhere between the coupon reader device 1602 and the POS computer and display 1612 and is capable of communicating with the server system, coupon reader device and the POS computer. The interceptor 1614 may operate by monitoring the data flow for a recognizable pattern of characters and/or other unique pattern identifying a coupon as described above. If such an identifiable pattern is detected, the coupon code and/or coupon information is transmitted to the server system through the coupon validation service interface, and receives validation information back from the server system. The validation information and the coupon information may be then provided to the POS 1612, for reimbursement or the like.

In the system 1620 shown in FIG. 16B, a software interceptor 1624 executing in the POS 1622 is located between the coupon reader 1602 and the higher level software 1634 of the POS 1622. The software interceptor 1624 may be a device driver software interceptor. The device driver software interceptor may act in lieu of a device driver by replacing a device driver or intercepting data from another device driver and providing a virtual device driver interface for application software. The device driver software interceptor may detect a coupon generated by an evaluation device from data captured from the coupon reader, validate coupon using a coupon validation service interface, and communicate validation information regarding the coupon to the POS software. The higher level POS software receives information from the interceptor through the device driver or virtual driver.

In the system 1630 shown in FIG. 16C, an API-based validator 1634 in the POS 1632. The API-based validator 1634 interfaces with the POS to validate coupons using a coupon validation service interface. The validator 1634 may trigger API calls to modify an invoice (e.g. apply payment through modification).

Figure 17A:
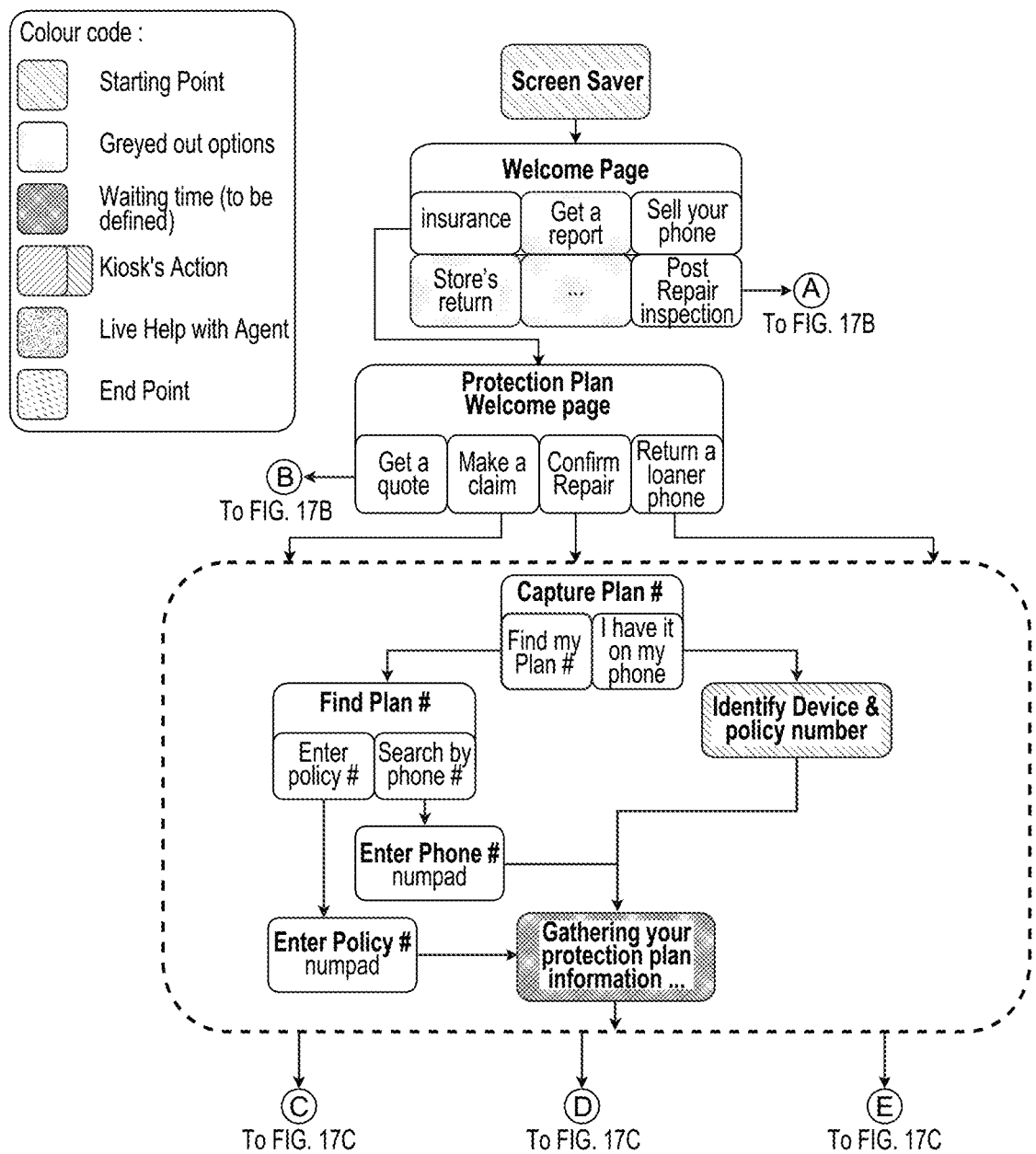
Figure 17B:
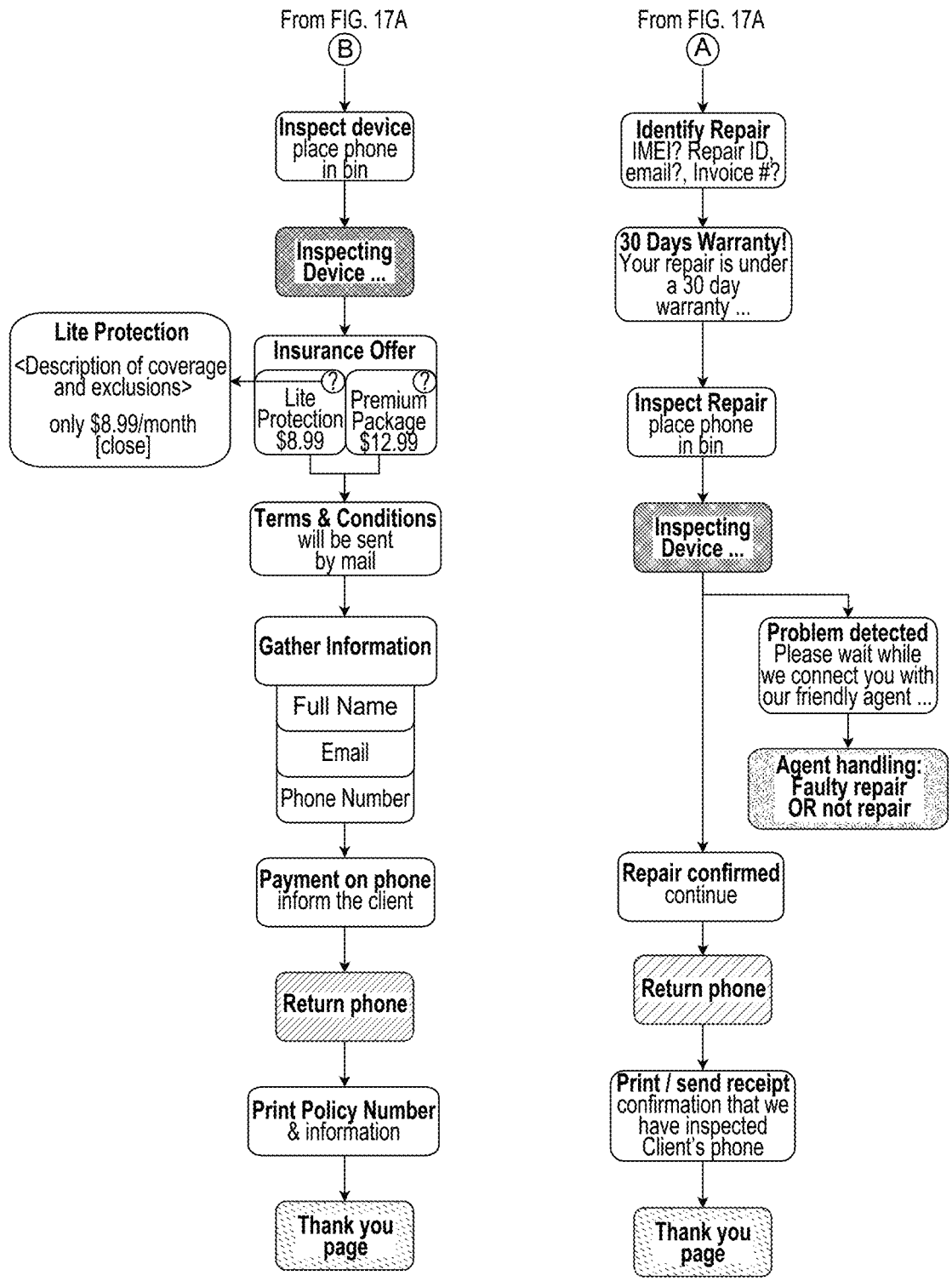
Figure 17C:
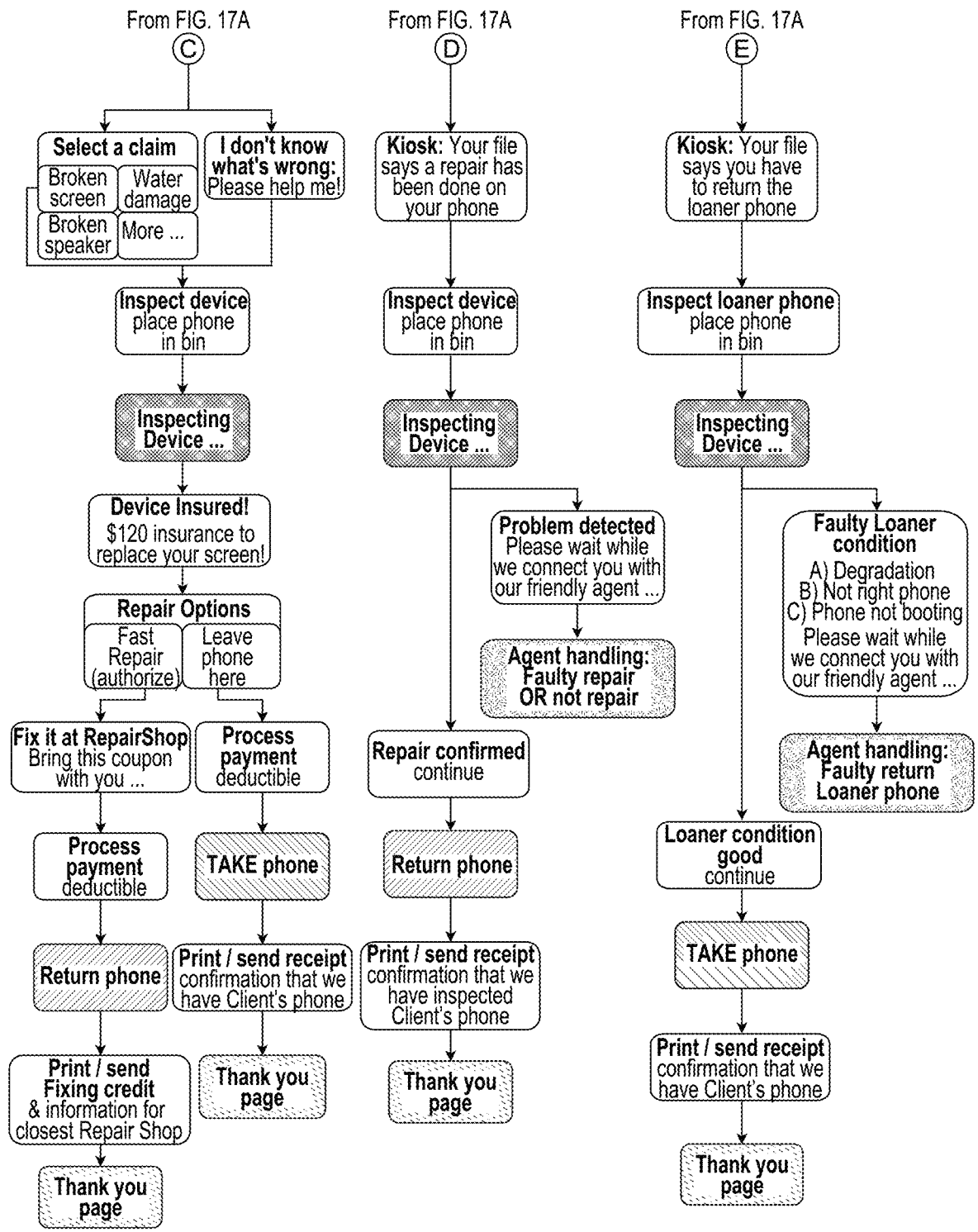

FIG. 17 shows example protection plan, loaner phone and post repair inspection workflows on an evaluation system according to some embodiments. A main menu screen on the evaluation device may enable a selecting from menu choices for purchasing a protection plan for a POD, a service to sell a POD, a post repair inspection service, obtain a report of the POD, a return POD to store service, etc. A protection plan welcome screen may display options for getting a quote for a protect plan, making a claim on a protection plan, confirm a repair of the POD, and returning a loaner phone, etc.

Upon selection of the option to obtain a quote for a protection plan, the evaluation system may receive the POD within an evaluation area associated with the evaluation device, and proceed to perform evaluation of the device automatically and/or with operator control. Subsequent to the evaluation, applicable protection plans and pricing is determined and presented to the user. Upon selection of a plan, additional information (e.g. terms and conditions) may be conveyed to the user via the evaluation device and/or email, and the user's information can be gathered. Payment for the selected plan may be received via the evaluation device, or by enabling the user to make the payment using the POD (e.g. by sending a payment link to the POD).

When the user selects, on the main screen for protection plans, to make a claim, to confirm a repair, or to return a loaner phone, the protection plan identifier associated with the POD may be obtained and the plan located on the evaluation system.

For making a claim, various claim options may be presented (e.g. broken screen, broken speaker, water damage, etc.). When a claim option is selected, the POD may be received in an evaluation area and evaluated. Based on the evaluation results, one or more protection plan based remedies can be presented and an indication can be presented as to whether the POD is covered by the protection plan. The user may be presented with repair options based on the damages identified and the identified/selected protection plan information. Repair options such as a fast repair and standard (e.g. leave POD for repair) repair options can be available. If the fast repair option is selected, a coupon (optionally including discounts etc.) or the like can be printed and/or otherwise associated with the POD before the POD is released from the evaluation area. A deductible may be collected via payment from the POD or by other means. The user may then take the POD to a nearby repair shop and presented with the coupon or the like. The closest available repair shop can be selected by the evaluation system based on the proximity to the evaluation system, times available, repair capabilities in association with the identified repair requirements, etc. If the standards repair option is selected, then a deductible may be collected as in the other repair options, and the POD secured for processing.

When the user selects to confirm a repair, after the protection plan information is identified, the POD can be evaluated after receiving it in the evaluation area. Based on the evaluation the repair is either confirmed or a deficiency is detected. If confirmed, then a confirmation can be sent to the user. If a problem with the repair is detected, then the user may be out in contact with an operator.

When the user selects to return a loaner phone, after the relevant protection plan is identified, the loaner phone is evaluated in the evaluation area. If the evaluation determines that the loaner phone is in good condition, then the loaner is taken possession of by the evaluation system. If the evaluation determines that the loaner phone has an issue (e.g., excessive depreciation, returned phone is different from the loaned phone, inoperative phone, etc.), the user is connected to an operator.

When the user selects chooses (e.g. in the main menu) to perform a post repair inspection, the processing may proceed by identifying the repair (e.g. based on IMEI, repair id, email, invoice, etc.) and determine whether the repair is under a protection plan. The POD then may be evaluated while placed in the evaluation area, and is either confirmed or a problem is detected.

In some embodiments, the evaluation device and the evaluation area can be separate. For example, the evaluation device may be a smartphone, tablet, or computer with software instructions and one or more cameras for taking images of a POD that is placed on a temporary evaluation area, ideally creating a uniform background, such as a white piece of paper, cardboard, table surface, etc. In such embodiments, the evaluation device and its embodied software application may make use of a specific user interface for guiding the user in positioning the evaluation device at the appropriate location(s) in space for it to be able to take usable pictures of the POD. In some embodiments, the evaluation device and its image capture and/or evaluation processes use computer vision and/or augmented reality methods and sensors, for example the gyroscope and/or the accelerometer. In such embodiments using computer vision and/or augmented reality methods and sensors, the evaluation device through the help of the embodied software application in the evaluation device may provide on screen instructions on how to best position the evaluation device so that it can take proper image, for instance, by indicating the user to move the device at a certain angle, at a certain distance and/or at a certain position.

Although particular embodiments have been described above, a person of skill in the art having been provided with this disclosure, would appreciate aspects of the different embodiments may be used in various combinations to realize still other embodiments of the POD evaluation system and enhanced services.

While the embodiments presented herein have been described in detail, the foregoing description is in all aspects illustrative and not restrictive. It is understood that numerous other modifications and variations can be devised without departing from the scope of the disclosed embodiments.

What is claimed is:

1. A system for evaluating previously-owned electronic devices, comprising:
  a database;
  a central server computer comprising a first processor; and
  an evaluation apparatus comprising:
    an evaluation area configured to temporarily include within it a previously-owned electronic device (POD);
    one or more cameras arranged to capture images of the POD within the evaluation area;
    a plurality of lights configured to, when activated, illuminate the evaluation area; and
    a second processor configured to:
      capture one or more first images of the POD in the evaluation area while activating respective lights of the plurality of lights in accordance with a sequence of operations; and
      transmit the one or more first images to at least one of the database, the central server, or a remote operator;
  wherein one or both the first processor and the second processor are configured to:
    uniquely identify the POD;
    determine the sequence of operations;
    capture, using the one or more cameras and while controlling the plurality of lights according to the sequence of operations to illuminate the evaluation area, at respective times a first set of one or more images of the POD during a first evaluation point and a second set of one or more images of the POD during a second evaluation point;

perform, for each of the evaluation points, respective evaluations of the POD based on the respective corresponding set of one or more images; and store in the database, following the first evaluation point, a first evaluation dataset from the evaluation of the first set of one or more images in association with a first timestamp, and, following the second evaluation point, a second evaluation dataset based on the evaluation of the second set of one or more images in association with a second timestamp.

2. The system according to claim 1, wherein the uniquely identify the POD comprises:

capturing, by the second processor and using the one or more cameras, a second image of a content displayed on a screen of the POD in the evaluation area; and detecting a unique identifier of the POD from the second image.

3. The system according to claim 2, wherein the uniquely identify the POD further comprises:

providing for instructing a user of the POD to cause the POD to display its IMEI on the screen of the POD and to insert the POD with the IMEI displayed into the evaluation area; and controlling the one or more cameras to capture the second image, when the POD is in the evaluation area and the IMEI is displayed on the screen of the POD.

4. The system according to claim 2, wherein the determine the sequence of operations is based on a selected service and the unique identifier.

5. The system according to claim 4, wherein the determine the sequence of operations, comprises:

determining the selected service based on a user input on an interaction control device; and determining the sequence of operations by accessing the database in accordance with a context associated with the selected service.

6. The system according to claim 1, wherein the controlling the plurality of lights according to the sequence of operations to illuminate the evaluation area, comprises controlling, for respective operations of the sequence of operations, which of the plurality of lights are turned on and/or intensity of light.

7. The system according to claim 1, wherein the one or more of the first processor and the second processor are configured to:

select a context from a plurality of preconfigured contexts in accordance with a user-selected service;

configure the sequence of operations based on the selected context; and control at least the one or more cameras and/or the plurality of lights in accordance with the configured sequence of operations to determine an evaluation of the POD.

8. The system according to claim 1, wherein the first timestamp corresponds to a time before a repair of the POD and the second timestamp corresponds to a time after the repair, and wherein the one or more of the first processor and the second processor are configured to:

compare respective condition of the POD based on the respective evaluations;

validate a repair based on the compare, wherein the repair is effected at a time between the first evaluation time and the second evaluation time.

9. The system according to claim 1, wherein the one or more of the first processor and the second processor are further configured to provide a protection plan quote or a protection plan claim for the POD, and wherein one or more of the first processor and the second processor are configured to:

detect one or more pre-existing defects on the POD based on the first evaluation;

determine, in accordance with a context information stored in a database and based on the identified defect information, whether or not to provide a protection plan quote; and when it is determined to provide the protection plan quote, communicate information regarding the protection plan quote to a user of the POD.

10. The system according to claim 9, wherein the one or more of the first processor and the second processor are further configured to: identify one or more exclusions for the POD; adjust the protection plan quote according to the identified exclusions; and communicating the adjusted protection plan quote to the user.

11. The system according to claim 10, wherein the determining, in accordance with the context information stored in the database and based on the identified defect information, whether or not to provide a protection plan quote includes: accessing a context stored in the database; and making the decision based on at least one of a match for the POD or a match for the identified defect information in the accessed context.

12. The system according to claim 10, wherein the one or more of first processor and the second processor are further configured to, when it is determined to provide the protection plan quote, providing for payment for the protection plan to be received via the apparatus or via the POD.

13. The system according to claim 1, wherein the one or more of the first processor and the second processor are configured to:

detect one or more defects on the POD based on the first evaluation dataset and the second evaluation dataset;

determine, in accordance with a context information stored in a database and based on the identified defect information, whether to approve or deny the protection plan claim; and communicate information regarding the determined approval or denial of the protection plan claim.

14. The system according to claim 1, wherein the one or more of the first processor and the second processor are configured to:

generate a protection plan quote based on the first evaluation dataset;

storing the protection plan quote in the database in association with information of the evaluation of the POD at the first evaluation point, after obtaining user acceptance of the protection plan quote;

subsequent to the evaluation of the POD at the second evaluation point, identifying, based on information received from a user or information obtained during the evaluation of the POD at the second evaluation point, the stored protection plan quote in the database;

determining a validity of the protection plan claim based on the evaluation at the second evaluation point, the evaluation at the first evaluation point and the identified stored protection plan quote; and responsive to said determining the validity, communicating with the user of the POD and/or a third party.

15. The system according to claim 1, wherein the one or more of the first processor and the second processor are configured to:

determine, based on the first evaluation and the second evaluation, a deterioration rate associated with the POD.

16. The system according to claim 15, wherein the one or more of the first processor and the second processor are configured to:

calculate an offer associated with at least one of the protection plan quote for, the promise to purchase for, or a provision of a loaner device in lieu of the POD; and communicate at least the calculated offer.

17. The system according to claim 15, wherein the one or more of the first processor and the second processor are configured to:

perform, based on one or more first images of a second electronic device at one or more respective times, one or more evaluation of the second electronic device;

determining that the POD and the second electronic device are associated with a same user; and calculating an offer associated with the second electronic device using at least the deterioration rate of the POD.

18. The system according to claim 17, wherein the second electronic device is a new electronic device, and wherein the calculating the offer associated with the second electronic device comprises modifying a price of a protection plan for the second electronic device in accordance with the deterioration rate, and setting the modified price as the offer.

19. The system according to claim 17, wherein the second electronic device is a loaner electronic device, and wherein the one or more of the first processor and the second processor are further configured to:

determine a second deterioration rate for the second electronic device based on the evaluations of the second electronic device, and wherein the calculating the offer associated with the second electronic device comprises modifying an initial amount associated with the second electronic device in accordance with the second deterioration rate, and setting the modified amount as the offer.

20. The system according to claim 19, wherein the determining the second deterioration rate comprises: accessing stored context information associated with one or more attributes of the second electronic device; and identifying an expected deterioration rate from the stored context information.

21. The system according to claim 19, wherein the determining the deterioration rate associated with the POD comprises: accessing stored context information associated with one or more attributes of the POD; and identifying an expected deterioration rate from the stored context information.

22. The system according to claim 19, wherein determining the deterioration rate associated with the POD comprises: accessing stored context information associated with one or more attributes of the POD; identifying, in the accessed context information, one or more thresholds associated with one or more diagnostic tests; identifying differences in the evaluation of the POD and the identified one or more thresholds; and identifying a deviation from an expected wear and tear based on the identified differences.

23. The system according to claim 1, wherein said one or more of the first processor and the second processor are further configured to:

comparing the stored first evaluation dataset and the second evaluation dataset; and based on the comparing, provide at least one of a repair quote, a protection plan quote, a protection plan claim, a certification, or a promise to purchase for the POD.

24. The system according to claim 1, wherein the one or more of the first processor and the second processor are configured to:

select, for each of the evaluations, a context from the database storing a plurality of contexts, the captured images, and evaluation session attributes determined from the evaluation;

process the evaluation session attributes based on the selected context, the processing resulting in at least one contextual attribute corresponding to one of the evaluation session attributes; and generate an evaluation report for the evaluation, the generated evaluation report including a description of the at least one contextual attribute.

25. The system according to claim 24, wherein the one or more of the first processor and the second processor are configured to:

calculate an evaluation score based on the evaluation and include the evaluation score in the evaluation report.

26. The system according to claim 25, wherein the one or more of the first processor and the second processor are configured to:

prior to the storing the second evaluation dataset, retrieve the stored first evaluation dataset from the database based on the unique identification.

27. The system according to claim 25, wherein the one or more of the first processor and the second processor are configured to:

accept a payment via a payment device associated with the evaluation apparatus;

analyze the first images;

generate an evaluation report based upon the analysis of the captured first images; and responsive to the evaluation report, displaying, on a user interface, an offer to advertise the POD for sale.

28. The system according to claim 27, wherein the one or more of the first processor and the second processor are configured to:

cause a diagnostic application to be run on the POD; and perform said generating of the evaluation report based further on results received from the diagnostic application.

29. The system according to claim 28, wherein the one or more of the first processor and the second processor are configured to:

identify adjustments including inclusions of risks, exclusions of risks, duration options, deductible options, and/or coverage of loss or theft associated with a protection plan; and provide the protection plan quote or the protection plan claim in accordance with the identified adjustments associated with a protection plan.

30. The system according to claim 28, wherein the one or more of the first processor and the second processor are configured to:

provide for enabling a user to submit a payment associated with the repair quote, the protection plan quote, the protection plan claim, the certification, or the promise to purchase, using the POD.

31. The system according to claim 30, wherein the one or more of the first processor and the second processor are configured to:
- determine a deductible applicable to the repair quote, the protection plan quote, or the protection plan claim; and
- adjust a payment amount for the payment in accordance with the deductible.

32. The system according to claim 1, wherein the one or more of the first processor and the second processor are configured to:
- use microdefects and/or micro-differences detected in the first images at least in part as the unique identification.

33. The system according to claim 1, wherein the one or more of the first processor and the second processor are configured to:
- compare respective conditions of the POD based on the respective evaluations; and
- validate the POD based on the compare.

34. The system according to claim 33, wherein the validating comprises validating a repair based on the compare, wherein the repair is effected at a time between the first evaluation time and the second evaluation time.

35. The system according to claim 34, wherein the validating comprises validating a loaner electronic device based on the compare, wherein the POD is the loaner electronic device.

36. The system according to claim 1, wherein the one or more of the first processor and the second processor are configured to communicate with a diagnostic and/or protection plan application on the POD.

37. A method for evaluating previously-owned electronic devices performed by a first processor of a central server and a second processor of an evaluation apparatus, the method comprising:
- uniquely identify a previously owned electronic device (POD) provided to an evaluation area of the evaluation apparatus, wherein the evaluation apparatus comprises one or more cameras arranged to capture images of the POD within the evaluation area, and a plurality of lights configured to, when activated, illuminate the evaluation area;
- determine the sequence of operations;
- capture, using the one or more cameras and while controlling the plurality of lights according to the sequence of operations to illuminate the evaluation area, at respective times, a first set of one or more images of the POD during a first evaluation point and a second set of one or more images of the POD during a second evaluation point;
- perform, for each of the evaluation points, respective evaluations of the POD based on the respective corresponding set of one or more images; and
- store in a database, following the first evaluation point, a first evaluation dataset from the evaluation of the first set of one or more images in association with a first timestamp, and, following the second evaluation point, a second evaluation dataset based on the evaluation of the second set of one or more images in association with a second timestamp.

38. A non-transitory computer readable medium storing instructions that, when executed by a first processor of a central server or a second processor of an evaluation apparatus, causes to perform operations comprising:
- uniquely identify a previously owned electronic device (POD) provided to an evaluation area of the evaluation apparatus, wherein the evaluation apparatus comprises one or more cameras arranged to capture images of the POD within the evaluation area, and a plurality of lights configured to, when activated, illuminate the evaluation area;
- determine a sequence of operations;
- capture, using the one or more cameras and while controlling the plurality of lights according to the sequence of operations to illuminate the evaluation area, at respective times, a first set of one or more images of the POD during a first evaluation point and a second set of one or more images of the POD during a second evaluation point;
- perform, for each of the evaluation points, respective evaluations of the POD based on the respective corresponding set of one or more images; and
- store in a database, following the first evaluation point, a first evaluation dataset from the evaluation of the first set of one or more images in association with a first timestamp, and, following the second evaluation point, a second evaluation dataset based on the evaluation of the second set of one or more images in association with a second timestamp.

* * * * *